United States Patent
Kim et al.

(10) Patent No.: US 11,360,728 B2
(45) Date of Patent: Jun. 14, 2022

(54) HEAD MOUNTED DISPLAY APPARATUS AND METHOD FOR DISPLAYING A CONTENT

(71) Applicant: Samsung Electronics Co., Ltd, Suwon-si (KR)

(72) Inventors: Dae-myung Kim, Hwaseong-si (KR); Ji-yeon Kwak, Seoul (KR); Yang-wook Kim, Hwaseong-si (KR); Jae-ho Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/389,422

(22) Filed: Apr. 19, 2019

(65) Prior Publication Data
US 2019/0243598 A1    Aug. 8, 2019

Related U.S. Application Data

(63) Continuation of application No. 14/683,517, filed on Apr. 10, 2015, now abandoned, which is a (Continued)

(30) Foreign Application Priority Data

Oct. 10, 2012   (KR) .................. 10-2012-0112638
Apr. 8, 2015    (KR) .................. 10-2015-0049704

(51) Int. Cl.
*G06F 3/14*      (2006.01)
*G02B 27/01*     (2006.01)
(Continued)

(52) U.S. Cl.
CPC .......... *G06F 3/1423* (2013.01); *G02B 27/017* (2013.01); *G06F 1/1616* (2013.01); (Continued)

(58) Field of Classification Search
CPC .......... A65F 2300/6045; A65F 13/2145; A65F 13/26; G06F 3/017; G06F 1/1641; (Continued)

(56) References Cited

U.S. PATENT DOCUMENTS 5,862,251 A    1/1999  Al-Karmi et al.
5,977,935 A    11/1999 Yasukawa
(Continued)

FOREIGN PATENT DOCUMENTS

CN    102221974    10/2011
EP      2237138    10/2010
(Continued)

OTHER PUBLICATIONS

US 7,092,574 B2, 08/2006, Suzuki et al. (withdrawn)
(Continued)

*Primary Examiner* — Andrew L Tank
(74) *Attorney, Agent, or Firm* — Staas & Halsey LLP

(57) ABSTRACT

A head mounted display apparatus and a method for displaying a content are provided. More particularly, a head mounted display apparatus which changes an operation of a virtual character in a content displayed on a display in accordance with a plurality of touches and a method for displaying a content are provided. One of the exemplary embodiments include a head mounted display apparatus which changes an operation of a virtual character in a content displayed on a display corresponding to combination of a first touch detected from a touch pad of the head mounted display apparatus and a second touch detected from a peripheral portable apparatus and a method for displaying a content.

20 Claims, 60 Drawing Sheets

Related U.S. Application Data continuation-in-part of application No. 14/050,936, filed on Oct. 10, 2013, now Pat. No. 9,696,899.

(60) Provisional application No. 61/978,262, filed on Apr. 11, 2014.

(51) Int. Cl.
*G06T 1/20* (2006.01)
*G06F 1/16* (2006.01)
*G06F 3/04883* (2022.01)

(52) U.S. Cl.
CPC .......... *G06F 1/1618* (2013.01); *G06F 1/1643* (2013.01); *G06F 3/04883* (2013.01); *G06T 1/20* (2013.01); *G06F 2203/04808* (2013.01)

(58) Field of Classification Search
CPC .... G06F 1/1647; G06F 1/1698; G06F 3/1423; G06F 3/04883; G06F 1/1616; G06F 1/1618; G06F 1/1643; G06F 2203/04808; G02B 27/017; H04N 13/344; H04M 1/72427; A63F 2300/6045; A63F 13/2145; A63F 13/26; G06T 1/20
See application file for complete search history.

(56) References Cited

U.S. PATENT DOCUMENTS

| | | | |
|---|---|---|---|
| 6,518,939 B1* | 2/2003 | Kikuchi | G06F 3/147 345/8 |
| 6,545,669 B1 | 4/2003 | Kinawi et al. | |
| 6,750,858 B1 | 6/2004 | Rosenstein | |
| 6,819,939 B2 | 11/2004 | Masamura | |
| 7,006,134 B1 | 2/2006 | Arai et al. | |
| 7,120,317 B1 | 10/2006 | Wu et al. | |
| 8,049,737 B2 | 11/2011 | Cho et al. | |
| 8,217,856 B1 | 7/2012 | Petrou | |
| 8,219,152 B2 | 7/2012 | Oh et al. | |
| 8,330,733 B2 | 12/2012 | Petschnigg | |
| 8,473,870 B2 | 6/2013 | Hinckley et al. | |
| 8,539,384 B2 | 9/2013 | Hinckley et al. | |
| 8,638,303 B2 | 1/2014 | Harris et al. | |
| 8,665,177 B2* | 3/2014 | Herrmann | H04N 13/398 345/8 |
| 8,707,174 B2 | 4/2014 | Hinckley et al. | |
| 8,751,970 B2 | 6/2014 | Hinckley et al. | |
| 8,754,931 B2 | 6/2014 | Gassel et al. | |
| 8,762,197 B2* | 6/2014 | Dhillon | A63F 13/335 705/14.12 |
| 8,806,382 B2 | 8/2014 | Matsuda | |
| 8,810,533 B2 | 8/2014 | Chen | |
| 8,873,147 B1 | 10/2014 | Rhodes | |
| 8,894,486 B2 | 11/2014 | Konno et al. | |
| 8,907,982 B2* | 12/2014 | Zontrop | A63F 13/573 345/633 |
| 8,922,494 B2 | 12/2014 | Min et al. | |
| 9,016,857 B2* | 4/2015 | Benko | G06F 3/012 351/158 |
| 9,122,307 B2* | 9/2015 | Jacobsen | G06F 3/013 |
| 9,217,867 B2 | 12/2015 | Nakada | |
| 9,316,830 B1* | 4/2016 | Costa | G06F 3/167 |
| 9,360,933 B2 | 6/2016 | Anderson et al. | |
| 9,551,873 B2* | 1/2017 | Zalewski | G02B 27/017 |
| 9,693,039 B2* | 6/2017 | Umezu | H04N 13/398 |
| 9,727,149 B2 | 8/2017 | Harris et al. | |
| 9,860,200 B1 | 1/2018 | Braun | H04L 51/046 |
| 10,838,485 B2* | 11/2020 | Mullen | A63F 13/212 |
| 10,860,100 B2* | 12/2020 | Osterhout | G06F 1/163 |
| 2003/0179422 A1 | 9/2003 | Liu | |
| 2004/0020941 A1 | 2/2004 | Engesser et al. | |
| 2004/0150671 A1 | 8/2004 | Kamiwada et al. | |
| 2005/0030282 A1 | 2/2005 | Lee et al. | |
| 2005/0195277 A1 | 9/2005 | Yamasaki | |
| 2006/0052146 A1* | 3/2006 | Ou | H04N 7/185 455/575.2 |
| 2006/0062466 A1 | 3/2006 | Zou et al. | |
| 2006/0161870 A1 | 7/2006 | Hotelling et al. | |
| 2006/0284791 A1* | 12/2006 | Chen | G06F 3/011 345/8 |
| 2007/0035616 A1 | 2/2007 | Lee et al. | |
| 2007/0072662 A1 | 3/2007 | Templeman | |
| 2007/0220108 A1 | 9/2007 | Whitaker | |
| 2007/0242056 A1 | 10/2007 | Engelhardt et al. | |
| 2008/0126955 A1 | 5/2008 | Takatoshi | |
| 2008/0148165 A1 | 6/2008 | Zalewski | |
| 2008/0148184 A1 | 6/2008 | Davis | |
| 2008/0244468 A1 | 10/2008 | Nishihara et al. | |
| 2009/0254861 A1 | 10/2009 | Seetharamakrishnan et al. | |
| 2010/0007608 A1 | 1/2010 | Otsuki | |
| 2010/0045619 A1 | 2/2010 | Birnbaum et al. | |
| 2010/0056220 A1 | 3/2010 | Oh et al. | |
| 2010/0060664 A1 | 3/2010 | Kilpatrick, II et al. | |
| 2010/0064244 A1 | 3/2010 | Kilpatrick, II et al. | |
| 2010/0073306 A1 | 3/2010 | Hickerson | |
| 2010/0079355 A1 | 4/2010 | Kilpatrick, II et al. | |
| 2010/0079356 A1* | 4/2010 | Hoellwarth | G06F 3/041 345/8 |
| 2010/0079392 A1 | 4/2010 | Chiang et al. | |
| 2010/0085382 A1 | 4/2010 | Lundqvist et al. | |
| 2010/0103099 A1 | 4/2010 | Lee | |
| 2010/0175018 A1 | 7/2010 | Petschnigg et al. | |
| 2010/0180254 A1 | 7/2010 | Petschnigg et al. | |
| 2010/0182247 A1 | 7/2010 | Petschnigg et al. | |
| 2010/0182265 A1 | 7/2010 | Kim et al. | |
| 2010/0188353 A1 | 7/2010 | Yoon et al. | |
| 2010/0194703 A1 | 8/2010 | Fedor et al. | |
| 2010/0199232 A1* | 8/2010 | Mistry | G06F 3/0425 715/863 |
| 2010/0245256 A1 | 9/2010 | Estrada et al. | |
| 2010/0245267 A1 | 9/2010 | Min et al. | |
| 2010/0251112 A1 | 9/2010 | Hinckley et al. | |
| 2010/0255862 A1 | 10/2010 | Mitsunaga et al. | |
| 2010/0275159 A1 | 10/2010 | Matsubara et al. | |
| 2011/0001699 A1* | 1/2011 | Jacobsen | G06F 3/017 345/157 |
| 2011/0090155 A1 | 4/2011 | Caskey et al. | |
| 2011/0102314 A1 | 5/2011 | Roux | |
| 2011/0107226 A1 | 5/2011 | Heo | |
| 2011/0185300 A1 | 7/2011 | Hinckley | |
| 2011/0187646 A1 | 8/2011 | Mahmoud | |
| 2011/0191704 A1 | 8/2011 | Hinckley et al. | |
| 2011/0209039 A1 | 8/2011 | Hinckley | |
| 2011/0209100 A1* | 8/2011 | Hinckley | G06F 3/04883 715/863 |
| 2011/0209102 A1 | 8/2011 | Hinckley et al. | |
| 2011/0216064 A1 | 9/2011 | Dahl et al. | |
| 2011/0221669 A1* | 9/2011 | Shams | G06F 3/017 345/156 |
| 2011/0237303 A1 | 9/2011 | Matsuda | |
| 2011/0291988 A1 | 12/2011 | Bamji et al. | |
| 2011/0310031 A1 | 12/2011 | Harris et al. | |
| 2012/0002025 A1 | 1/2012 | Bedingfield, Sr. | |
| 2012/0015694 A1 | 1/2012 | Han | |
| 2012/0042246 A1 | 2/2012 | Schwesinger et al. | |
| 2012/0064947 A1 | 3/2012 | Yi et al. | |
| 2012/0081302 A1 | 4/2012 | Gimpl | |
| 2012/0084710 A1 | 4/2012 | Sirpal et al. | |
| 2012/0105363 A1 | 5/2012 | Sirpal et al. | |
| 2012/0144323 A1* | 6/2012 | Sirpal | G06F 3/1431 715/761 |
| 2012/0154295 A1 | 6/2012 | Hinckley | |
| 2012/0236025 A1* | 9/2012 | Jacobsen | G06F 3/011 345/629 |
| 2012/0249587 A1* | 10/2012 | Anderson | G02B 27/017 345/633 |
| 2012/0293506 A1 | 11/2012 | Vertucci | |
| 2012/0293935 A1 | 11/2012 | Sherlock | |
| 2012/0302289 A1* | 11/2012 | Kang | G06F 3/017 455/557 |
| 2012/0327106 A1* | 12/2012 | Won | A63F 13/2145 345/619 |

(56) References Cited

U.S. PATENT DOCUMENTS

| | | | |
|---|---|---|---|
| 2013/0027404 A1 | 1/2013 | Sarnoff | |
| 2013/0027572 A1* | 1/2013 | Petrou | G02B 27/017 348/220.1 |
| 2013/0050260 A1 | 2/2013 | Reitan | |
| 2013/0093670 A1 | 4/2013 | Iwai | |
| 2013/0147686 A1 | 6/2013 | Clavin et al. | |
| 2013/0241846 A1 | 9/2013 | Wang et al. | |
| 2013/0335573 A1 | 12/2013 | Forutanpour | |
| 2014/0028578 A1 | 1/2014 | Dihn et al. | |
| 2014/0181700 A1 | 2/2014 | Kim | |
| 2014/0101584 A1 | 4/2014 | Harris et al. | |
| 2014/0101608 A1* | 4/2014 | Ryskamp | G06F 3/0483 715/810 |
| 2014/0361956 A1* | 12/2014 | Mikhailov | A63F 13/42 345/8 |
| 2014/0364209 A1 | 12/2014 | Perry | |
| 2015/0085171 A1* | 3/2015 | Kim | H04N 1/00493 348/333.04 |
| 2015/0193098 A1 | 7/2015 | Kauffmann | |
| 2015/0220152 A1* | 8/2015 | Tait | G02B 27/017 345/156 |
| 2015/0293644 A1* | 10/2015 | Watanabe | G06F 3/0426 345/168 |
| 2016/0085366 A1* | 3/2016 | Chi | G06F 3/0488 345/173 |
| 2016/0124499 A1 | 5/2016 | Shiu | |
| 2017/0308258 A1* | 10/2017 | Xu | G06F 3/0488 |

FOREIGN PATENT DOCUMENTS

| | | |
|---|---|---|
| EP | 2241963 | 10/2010 |
| EP | 2244166 | 10/2010 |
| EP | 2347317 | 7/2011 |
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011-198316 | 10/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 10-2010-0027866 | 3/2010 |
| KR | 1020100053597 | 5/2010 |
| KR | 10-0960577 | 6/2010 |
| KR | 1020100086639 | 8/2010 |
| KR | 1020100105005 | 9/2010 |
| KR | 10-2010-0109274 | 10/2010 |
| KR | 1020100115547 | 10/2010 |
| KR | 1020100121880 | 11/2010 |
| KR | 1020100132772 | 12/2010 |
| KR | 10-2011-0002729 | 1/2011 |
| KR | 10-1021857 | 3/2011 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110110208 | 10/2011 |
| KR | 1020110116699 | 10/2011 |
| KR | 10-1094769 | 12/2011 |
| KR | 20110139697 | 12/2011 |
| KR | 20120006674 | 1/2012 |
| KR | 1020120001944 | 1/2012 |
| KR | 1020120026395 | 3/2012 |
| KR | 1020120038692 | 4/2012 |
| KR | 10-2012-0080210 | 7/2012 |
| KR | 1020130113997 | 10/2013 |
| KR | 1020140046319 | 4/2014 |
| WO | 2006086508 | 8/2006 |
| WO | 2010/111053 | 9/2010 |
| WO | WO 2011/047338 A1 | 4/2011 |
| WO | 2012044545 | 4/2012 |
| WO | 2012/108723 | 8/2012 |

OTHER PUBLICATIONS

European Office Action dated Oct. 2, 2019 in corresponding European Patent Application No. 13188166.6.
Final Office Action dated Aug. 7, 2019 in co-pending U.S. Appl. No. 15/622,782.
Office Action dated Jul. 17, 2015 in U.S. Appl. No. 14/193,398.
Office Action dated Aug. 15, 2015 in U.S. Appl. No. 14/050,936.
U.S. Final Office Action dated Jan. 21, 2016 in U.S. Appl. No. 14/050,936.
U.S. Office Action dated Jun. 7, 2016 in U.S. Appl. No. 14/050,936.
U.S. Final Office Action dated Sep. 22, 2016 in U.S. Appl. No. 14/050,936.
U.S. Office Action dated Feb. 24, 2017 in U.S. Appl. No. 14/683,517.
Extended European Search Report dated Feb. 24, 2017 in European Patent Application No. 13188166.6.
U.S. Notice of Allowance dated Aug. 17, 2017 in U.S. Appl. No. 14/683,517.
U.S. Notice of Allowability dated Sep. 27, 2017 in U.S. Appl. No. 14/683,517.
Chinese Office Action dated Sep. 1, 2017 in Chinese Patent Application No. 201310470324.7.
European Communication dated Dec. 12, 2017 in European Patent Application No. 13188166.6.
Notice of Allowance dated Dec. 14, 2016 in corresponding U.S. Appl. No. 14/050,936 (12 pages).
Office Action dated Aug. 5, 2015 in corresponding U.S. Appl. No. 14/050,936 (36 pages).
Office Action dated Jun. 28, 2018 in European Patent Application No. 13 188 166.6, 7 pgs.
Office Action dated Jun. 22, 2018 in Chinese Patent Application No. 201310470324.7, 13 pgs.
European Office Action dated Feb. 20, 2019 in European Patent Application No. 13 188 166.6.
U.S. Notice of Allowance dated Jun. 20, 2018 in U.S. Appl. No. 14/683,517.
U.S. Notice of Allowance dated Jan. 3, 2019 in U.S. Appl. No. 14/683,517.
Korean Office Action dated Apr. 12, 2019 in Korean Patent Application No. 10-2012-0112638.
Office Action dated Apr. 2, 2019 in U.S. Appl. No. 15/622,782.
U.S. Appl. No. 14/193,398, filed Feb. 28, 2014, Dae-myung Kim, Samsung Electronics Co., Ltd.
U.S. Appl. No. 14/050,936, filed Oct. 10, 2013, Dae-myung Kim, Samsung Electronics Co., Ltd.
U.S. Appl. No. 15/622,782, filed Jun. 14, 2017, Dae-myung Kim, Samsung Electronics Co., Ltd.
U.S. Appl. No. 14/683,517, filed Apr. 10, 2015, Dae-myung Kim, Samsung Electronics Co., Ltd.

(56) References Cited

OTHER PUBLICATIONS

Final Office Action dated Apr. 6, 2020 in co-pending U.S. Appl. No. 14/683,517.
European Patent Office Examination Report dated Mar. 5, 2020, in corresponding European Patent Application No. 13188166.6.
Office Action issued by the Korean Patent Office dated Oct. 6, 2021 in Korean Patent Application No. 10-2015-0049704.
Office Action dated Sep. 19, 2019 in co-pending U.S. Appl. No. 14/683,517.
Office Action dated Dec. 10, 2019 in co-pending U.S. Appl. No. 15/622,782.
Notice of Decision of Rejection dated Apr. 25, 2022, issued in Korean Patent Application No. 10-2015-0049704.

* cited by examiner

FIG. 5
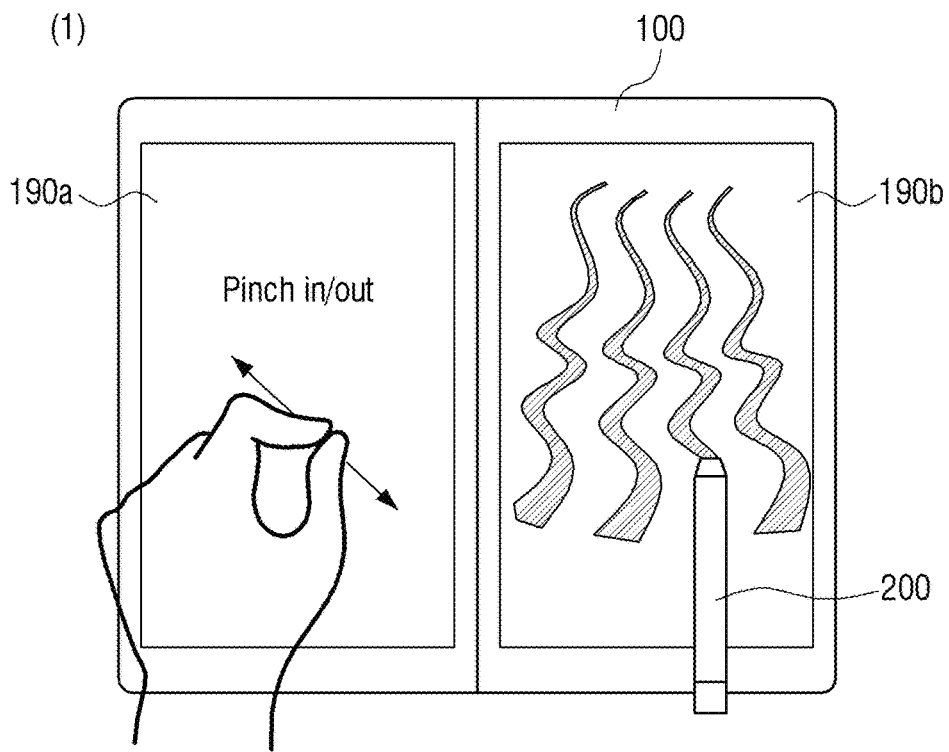
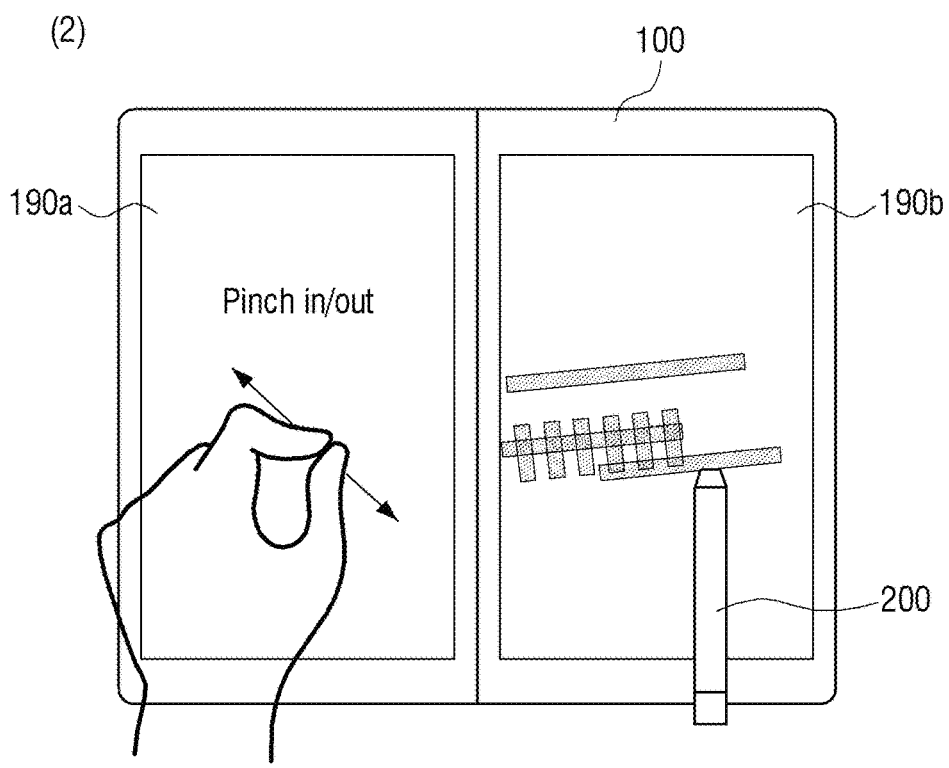

FIG. 11
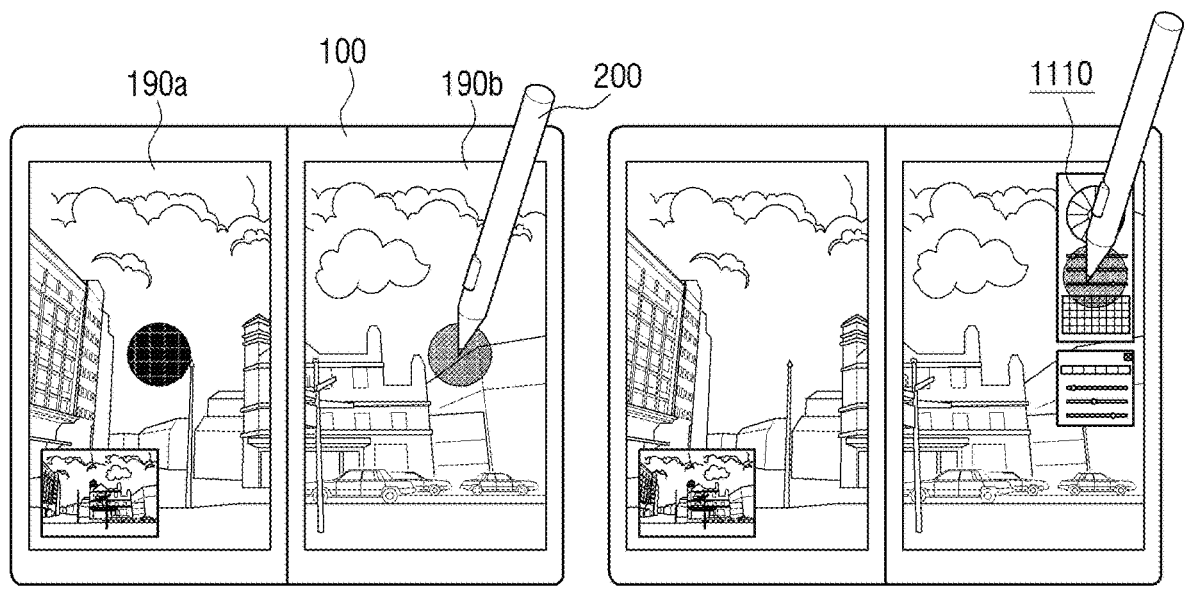
(1) (2)
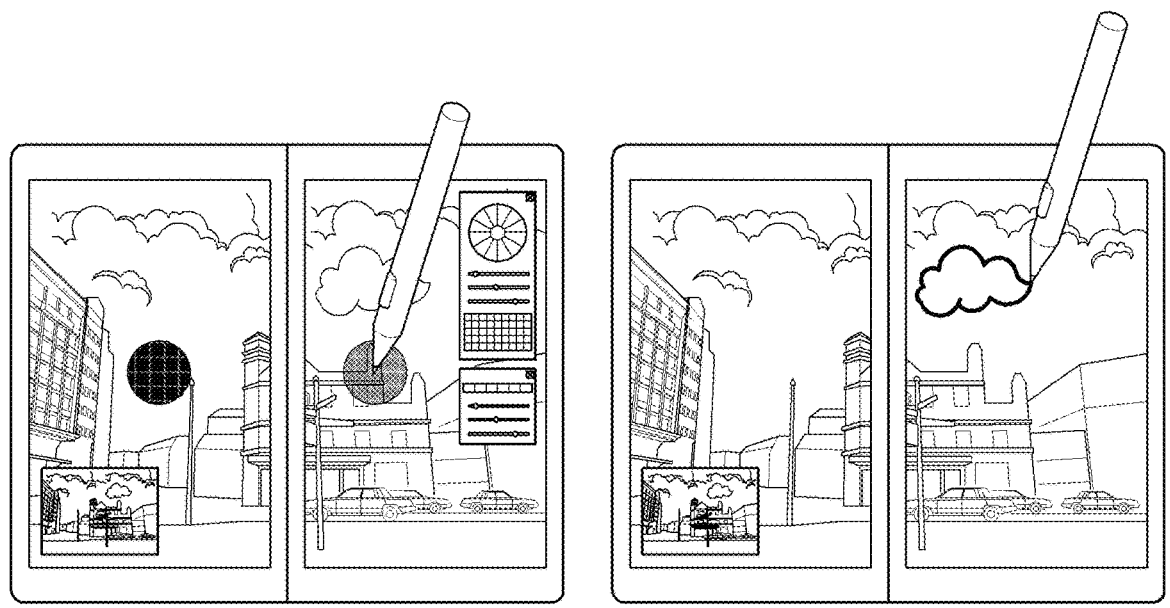
(3) (4)

FIG. 18
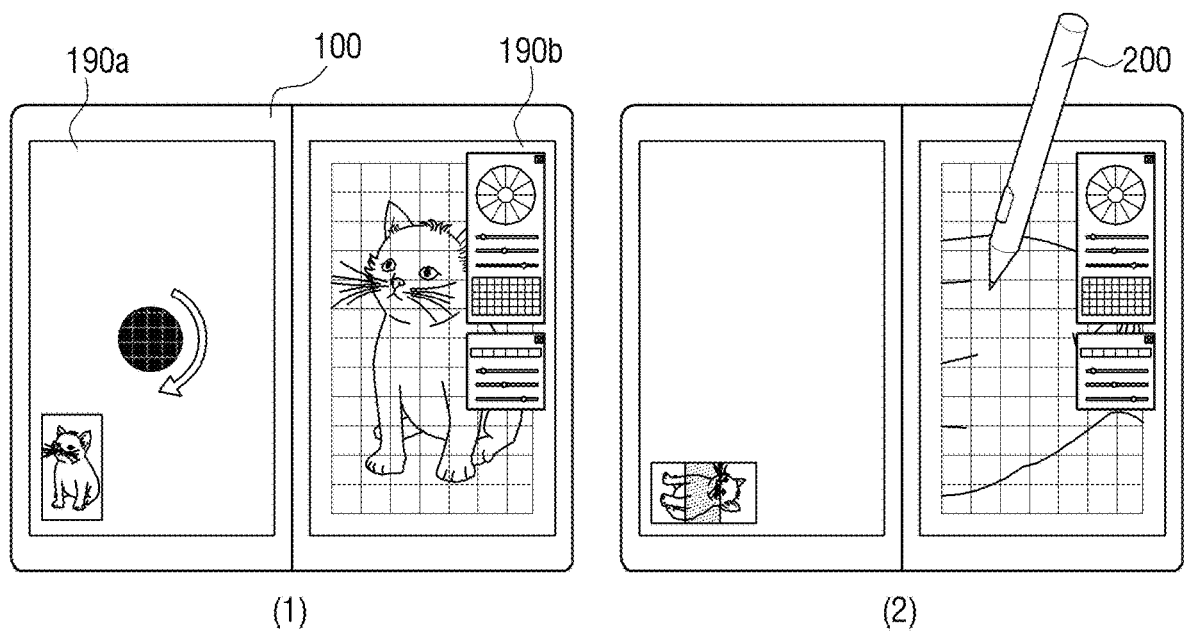
(1)                                    (2)
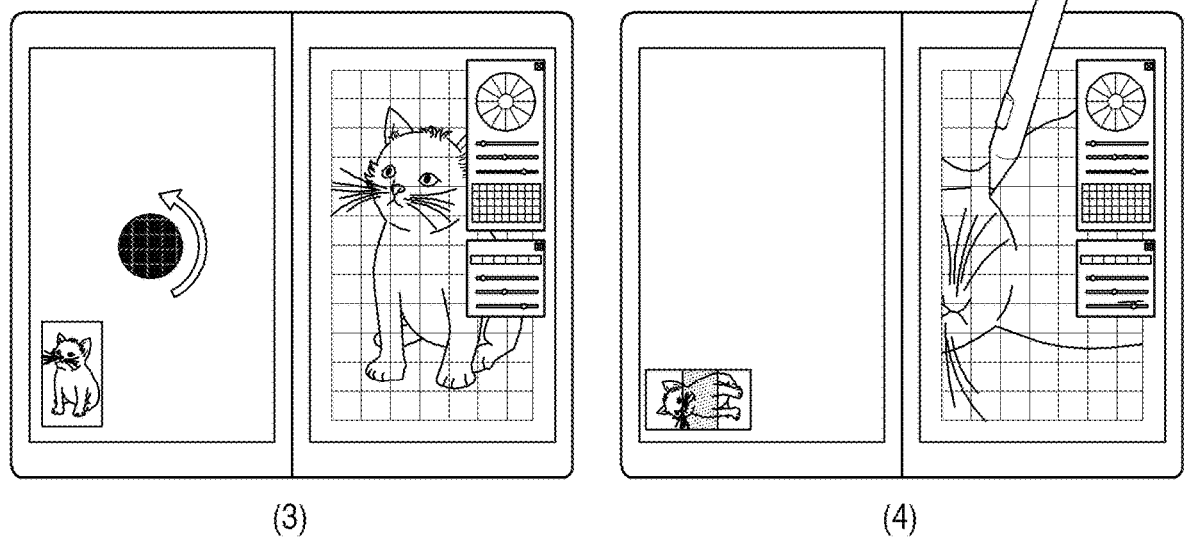
(3)                                    (4)

FIG. 48
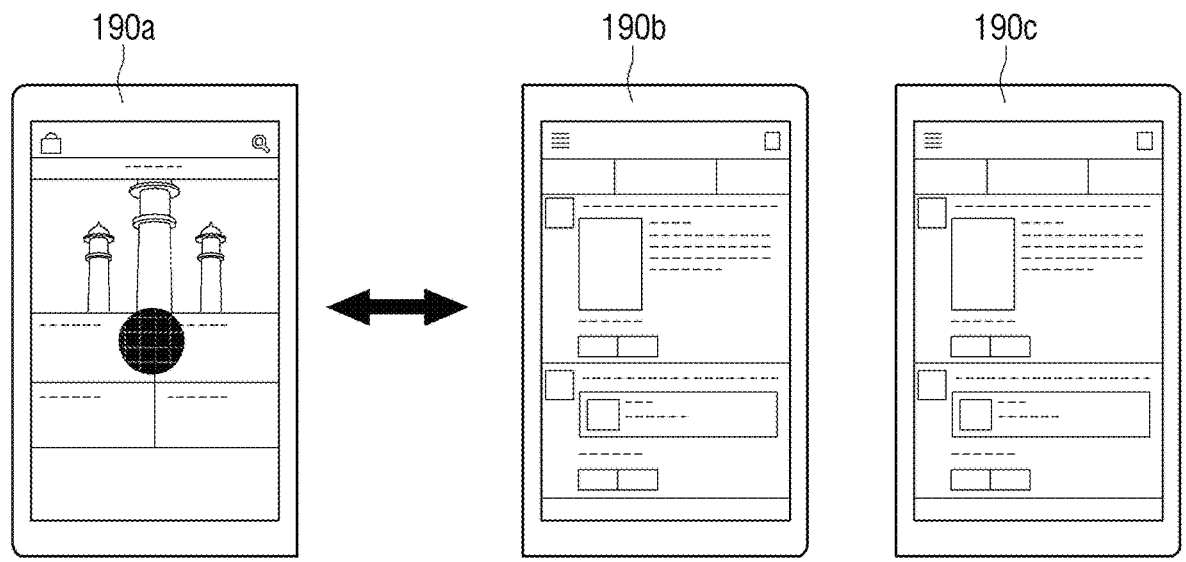
(1)
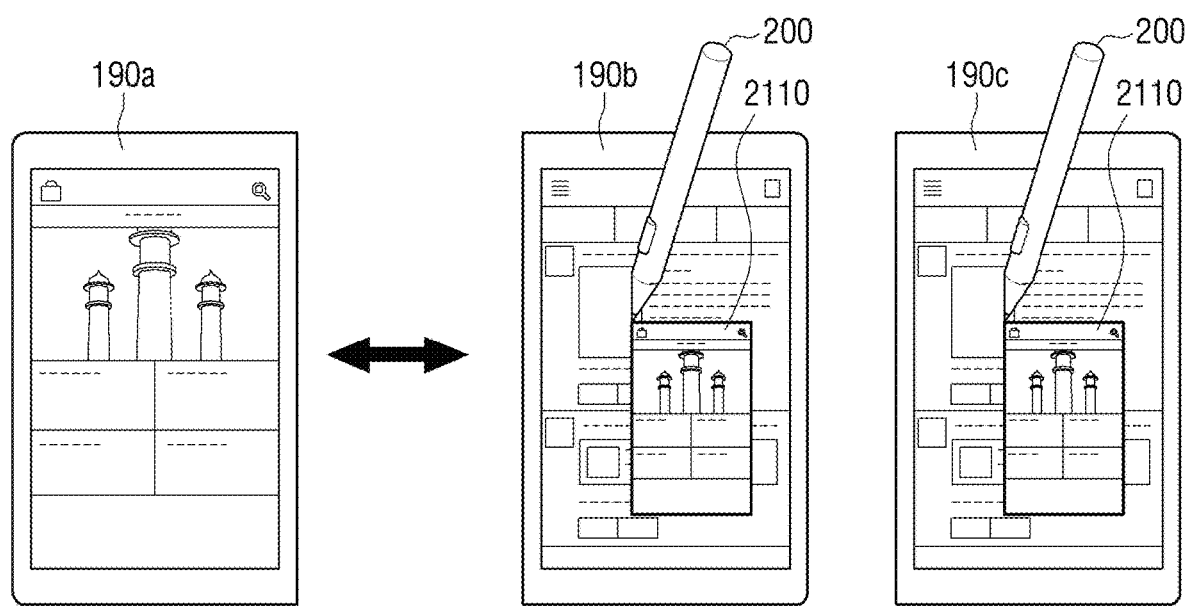
(2)

FIG. 53A
| EXAMPLE OF TOUCH GESTURE OF TOUCH PAD OF HEAD MOUNTED DISPLAY APPARATUS | EXAMPLE OF OPERATION OF VIRTUAL CHARACTER |
|---|---|
|  5301 | VIRTUAL CHARACTER MOVING FORWARD |
|  5302 | VIRTUAL CHARACTER MOVING BACKWARD |
|  5303 | VIRTUAL CHARACTER JUMPING |
|  5304 | ENLARGE SCREEN |
| 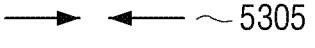 5305 | REDUCE SCREEN |
5300

FIG. 53B

| EXAMPLE OF TOUCH GESTURE OF PORTABLE APPARATUS | EXAMPLE OF TOUCH GESTURE OF TOUCH PAD OF HEAD MOUNTED DISPLAY APPARATUS | EXAMPLE OF OPERATION OF VIRTUAL CHARACTER |
|---|---|---|
| 5311 ● | 5301 | VIRTUAL CHARACTER FAST MOVING FORWARD |
| 5312 | 5302 | VIRTUAL CHARACTER FAST MOVING BACKWARD |
| 5313 ○○ | 5303 ○○ | VIRTUAL CHARACTER JUMPING HIGHER |
| 5314 | 5304 ←→ | ENLARGE SCREEN FAST |
| 5315 | 5305 →← | REDUCE SCREEN FAST |
| 5316 | | |

Table 1

| Type | | Mark |
|---|---|---|
| Single Finger Gesture | Tap | |
| | Touch & Hold | |
| | Double Tap | |
| | Drag | |
| | Drag & Drop | |
| | Flick | |

FIG. 55

Table 2

| Type | | Mark |
|---|---|---|
| Two Finger Gesture | Two finger Tap | |
| | Touch & Spread | |
| | Pinch Out | |
| | Pinch In | |
| | Two finger Drag | |
| | Cross Two Finger | |
| | Touch & Rotate | |

FIG. 56

Table 3

| Type | | Mark |
|---|---|---|
| Multi Finger Gesture | Three Finger Touch | ●●● |
| | Four Finger Touch | ●●●● |
| | Five Finger Touch | ●●●●● |
| Palm | Palm | 🖐 |

HEAD MOUNTED DISPLAY APPARATUS AND METHOD FOR DISPLAYING A CONTENT

CROSS-REFERENCE TO RELATED APPLICATIONS

This application is a Continuation of U.S. patent application Ser. No. 14/683,517, filed Apr. 10, 2015, which is a Continuation-In-Part of U.S. patent application Ser. No. 14/050,936 filed Oct. 10, 2013, and also claims the benefit of U.S. Provisional Application No. 61/978,262, filed Apr. 11, 2014, and priority under 35 U.S.C. § 119(a) from Korean Patent Application No. 10-2015-0049704, filed Apr. 8, 2015, and Korean Patent Application No. 10-2012-0112638, filed Oct. 10, 2012, the disclosures of all of which are incorporated herein by reference.

BACKGROUND

1. Field

Methods and apparatuses consistent with the exemplary embodiments of the present general concept relate to a head mounted display apparatus and a method for displaying a content.

In addition, methods and apparatuses consistent with the exemplary embodiments of the present general concept relate to a multi display apparatus, and more particularly to a multi display apparatus configured to receive inputs through each display thereof and to perform outputting accordingly, and a multi display method thereof.

2. Description of the Related Art

A portable electronic apparatus in recent use such as a smart phone generally has one display.

However, as the performance of a Central Processing Unit (CPU) mounted in a portable electronic apparatus increases and multi-tasking environments capable of executing various applications at the same time are provided, it becomes difficult to effectively utilize the performance a display apparatus having just one display.

In addition, due to the development of battery technologies and thermal treatment systems, the design paradigm that a portable electronic apparatus may only have one display is not an acceptable truth any more.

Furthermore, the need has been raised to expand touch screens and introduce more various user experiences to portable electronic apparatuses in user experience oriented interface environment.

Against this background, portable electronic apparatuses having two or more displays, that is, multi display apparatuses, are emerging.

A multi display apparatus is receiving attention as a next generation display apparatus since it may execute and display various applications on multiple displays based on powerful hardware performance, and thus is not only appropriate to a multi-tasking environment, but also provides various and abundant information to a user, thereby providing new user experience.

In a multi display apparatus, not only outputting but also inputting may be performed through a plurality of displays. Therefore, the need has been raised for the technology which may perform more various inputs and outputs according to inputs of each display in a multi display apparatus.

A head mounted display is one of the various apparatuses which allows users to experience virtual realities which is similar to the real world through simulation embodied based on software technologies. A user wearing a head mounted display apparatus which supports large-scale and high definition display can experience virtual realities through heading tracking using a sensor and a display which is provided to both eyes. The services and functions provided by a head mounted display have been expanded gradually.

In order to select and execute such various services and functions, not only a button and a touch pad but also a method for performing or providing additional inputs are required.

SUMMARY

Exemplary embodiments of the present general concept provide a multi display apparatus configured to perform an unstructured input through each display of the multi display apparatus, and to combine each input to perform an output corresponding thereto, and a multi display method thereof.

Additional features and utilities of the present general concept will be set forth in part in the description which follows and, in part, will be obvious from the description, or may be learned by practice of the general concept.

Exemplary embodiments of the present general concept provide a multi display apparatus including a first body including a first display, a second body including a second display, a hinge configured to rotatably connect the first body and the second body to support the first body and the second body, a sensor configured to sense a first user manipulation made in a nondecisive location of a nonstructured first screen displayed on the first display and to sense a second user manipulation made in a nondecisive location of a nonstructured second screen displayed on the second display, and a controller configured to combine the sensed first user manipulation and the sensed second user manipulation to perform an operation corresponding to a result of the combination.

The controller may change a function matching the second user manipulation according to the first user manipulation, and the controller may perform an operation corresponding to the second user manipulation according to the changed function, when the second user manipulation is sensed.

The second user manipulation may be a line input by a drag operation, the controller may increase a thickness or transparency of the line input of the second user manipulation when the first user manipulation is a pinch out input, the controller may decrease a thickness or transparency of the line input of the second user manipulation when the first user manipulation is a pinch in input, and the controller may change a texture or thickness of the line input of the second user manipulation when the first user manipulation is a touch and rotate input.

The first user manipulation may be a touch and hold input and the second user manipulation may be a touch input, and the controller may display a menu corresponding to the second user manipulation when the first user manipulation and the second user manipulation are sensed at the same time.

The controller may change the second screen displayed on the second display according to the first user manipulation when the first user manipulation is sensed, and the controller may display the second screen changed by the first user manipulation according to the second user manipulation, when the second user manipulation is sensed.

The controller may expand the second screen displayed on the second display when the first user manipulation is a pinch out input, the controller may reduce the second screen displayed on the second display when the first user manipulation is a pinch in input, and the controller may rotate the second screen displayed on the second display when the first user manipulation is a touch and rotate input.

Exemplary embodiments of the present general concept also provide a multi display apparatus including a first body including a first display, a second body including a second display, a hinge configured to rotatably connect the first body and the second body to support the first body and the second body, a sensor configured to sense a first user manipulation made in a nondecisive location of the first display and a second user manipulation made in a nondecisive location of the second display, when the first display and the second display respectively display a nonstructured first screen and a nonstructured second screen, and a controller configured to combine the sensed first user manipulation and second user manipulation to recognize the combination as one user gesture, and to display an execution screen corresponding to the one user gesture on at least one of the first display and the second display.

The first user manipulation may be an input proximate to or touching the first display using a user's body, and the second user manipulation may be an input proximate to or touching the second display using an input pen.

Exemplary embodiments of the present general concept also provide a multi display method of a multi display apparatus including a first body including a first display, a second body including a second display, and a hinge configured to rotatably connect the first body and the second body to support the first body and the second body, the multi display method including displaying a nonstructured first screen on the first display, displaying a nonstructured second screen on the second display, sensing a first user manipulation made in a nondecisive location on the first screen and a second user manipulation made in a nondecisive location on the second screen, and combining the sensed first user manipulation and the sensed second user manipulation and performing an operation corresponding to a result of the combination.

Performing the operation may include changing a function matching the second user manipulation according to the first user manipulation, and performing an operation corresponding to the second user manipulation according to the changed function when the second user manipulation is sensed.

The second user manipulation may be a line input by a drag operation. Changing the function may include increasing a thickness of the line input of the second user manipulation when the first user manipulation is a pinch out input, reducing a thickness of the line input of the second user manipulation when the first user manipulation is a pinch in input, and changing a texture of the line input of the second user manipulation when the first user manipulation is a touch and rotate input.

The first user manipulation may be a touch and hold input and the second user manipulation may be a touch input. Performing the operation may include displaying a menu corresponding to the second user manipulation when the first user manipulation and the second user manipulation are sensed at the same time.

The multi display method may further include changing the second screen displayed on the second display according to the first user manipulation, when the first user manipulation is sensed. Performing the operation may include displaying the second screen changed by the first user manipulation according to the second user manipulation, when the second user manipulation is sensed.

The changing the second screen may include expanding the second screen displayed on the second display when the first user manipulation is a pinch out input, reducing the second screen displayed on the second display when the first user manipulation is a pinch in input, and rotating the second screen displayed on the second display when the first user manipulation is a touch and rotate input.

Exemplary embodiments of the present general concept also provide a multi display method of a multi display apparatus including a first body including a first display, a second body including a second display, and a hinge configured to rotatably connect the first body and the second body to support the first body and the second body, the multi display method including sensing a first user manipulation made in a nondecisive location of a nonstructured first screen displayed on the first display, sensing a second user manipulation made in a nondecisive location of a nonstructured second screen displayed on the second display, and combining the sensed first user manipulation and second user manipulation to recognize the combination as one user gesture, and displaying an execution screen corresponding to the one user gesture on at least one of the first display and the second display.

The first user manipulation may be an input proximate to or touching the first display using a user's body, and the second user manipulation may be an input proximate to or touching the second display using an input pen.

The controller may extract contents displayed on the first display when the first user manipulation is sensed, and display a screen corresponding to the extracted contents on the second display when the second user manipulation is sensed.

The controller may capture a screen displayed on the first display according to the first user manipulation, and display the captured screen on a location on the second display where the second user manipulation is made.

The controller may extract contents displayed on the first display and the second display and display a screen corresponding to the extracted contents on the second display a third user manipulation is sensed on a nondecisive location of the second screen while the first user manipulation is sensed.

Performing the operation may include extracting contents displayed on the first display when the first user manipulation is sensed, and displaying a screen corresponding to the extracted contents on the second display when the second user manipulation is sensed.

Extracting contents may include capturing a screen displayed on the first display according to the first user manipulation, and displaying the screen corresponding to the extracted contents may include displaying the captured screen on the second display on a location where the second user manipulation is made.

A non-transitory computer-readable recording medium may contain computer-readable codes as a program to execute the multi display method.

Exemplary embodiments of the present general concept also provide a multi display apparatus including a plurality of displays, a sensor configured to sense a first user manipulation on a first display of the plurality of displays and to sense a second user manipulation made in a nondecisive location on at least one second display of the plurality of displays, and a controller to perform an operation on at least one of the plurality of displays according to a combination of the sensed first user manipulation and the sensed second user manipulation.

The sensor may also be configured to sense a location of each of the plurality of displays relative to each other.

The second user manipulation may be made in a nondecisive location on a plurality of second displays, and the controller may perform the operation on each of the plurality of second displays on which the second user manipulation is made.

Exemplary embodiments of the present general concept provide a method of displaying a content of a head mounted display apparatus including executing a process that produces a content displayed in a head mounted display apparatus, wirelessly connecting a peripheral portable apparatus of the head mounted display apparatus, detecting a first touch in a touch pad of the head mounted display apparatus, receiving from the portable apparatus second touch information corresponding to a second touch detected from a touch screen of the portable apparatus, and changing an operation of a virtual character displayed on the content corresponding to combination of the first touch and the second touch information.

The receiving may include receiving a control packet corresponding to the second touch information from the portable apparatus.

An operation of the virtual character corresponding to the combination of the first touch and the second touch may be distinguished from an operation of the virtual character corresponding to the first touch.

Exemplary embodiments of the present general concept provide a head mounted display apparatus including a display configured to display a content, a touch pad configured to receive a first touch, a communication unit configured to be connected to a portable apparatus, and a controller configured to control the display, the touch pad, and the communicator, and the controller changes an operation of a virtual character of the content displayed on the display corresponding to combination of information regarding the first touch and second touch information received from the portable apparatus through the communicator.

The controller may change an operation of the virtual character corresponding to the calculated at least one of a direction of a continuous movement, a distance of a continuous movement, and a speed of a continuous movement of the first touch.

Exemplary embodiments of the present general concept provide a portable apparatus including a touch screen configured to display an executed touch pad application, a communication unit configured to communicate with a head mounted display apparatus near the portable apparatus, and a controller configured to control the touch screen and the communicator, and the controller transmits a control packet corresponding to a touch received from the touch pad application to the head mounted display apparatus through the communicator.

An operation of a virtual character of a content displayed on a display may be changed corresponding to a first touch on a touch pad which is located at a side of a head mounted display apparatus.

An operation of a virtual character of a content displayed on a display may be changed corresponding to combination of the first touch on the touch pad located at a side of the head mounted display apparatus and a second touch which is detected and received by a portable apparatus connected to the head mounted display apparatus wirelessly.

An operation of a virtual character of a content displayed on a display may be changed corresponding to the first touch gesture on the touch pad which is located at a side of the head mounted display apparatus.

An operation of a virtual character of a content displayed on a display may be changed corresponding to combination of the first touch on the touch pad located at a side of the head mounted display apparatus and a second touch which is detected and received by a portable apparatus connected to the head mounted display apparatus wirelessly.

According to the various exemplary embodiments, there is provided a head mounted display apparatus which may change an operation of a virtual character corresponding to combination of the first touch (or a touch gesture) of the head mounted display apparatus and the second touch (or a touch gesture) received by a portable apparatus and a method for displaying a content.

Exemplary embodiments of the present general concept provide a method including obtaining a first touch signal from a head mounted touch interface of a head mounted display, obtaining a second touch signal from a handheld interface of a handheld device via a wireless signal, and controlling a virtual object displayed on the head mounted display responsive to one of the first and second touch signals.

The first touch signal selects an action of virtual object.

The second touch signal controls an action of the virtual object.

The first touch signal selects an action of the virtual object, and the second touch signal controls the action of the virtual object.

The first touch signal selects a control command of the head mounted display, and the second touch signal selects an image command of the head mounted display.

The head mounted display is wirelessly connected to the handheld device responsive a communication device search made responsive to a user selection made on a displayed selection interface Exemplary embodiments of the present general concept provide a method including sensing a touch of a display of a handheld device, and transmitting a touch signal responsive to the touch wirelessly to a head mounted display device to control a virtual object displayed on the head mounted display.

Exemplary embodiments of the present general concept provide a method including sensing a touch of a head mounted display interface and producing a first touch signal, receiving a second touch signal from a handheld device via wireless signal and controlling a virtual object displayed on the head mounted display responsive to one of the first and second touch signals.

Exemplary embodiments of the present general concept provide a cell phone interface including a touch screen allowing a touch input by a user to control a wirelessly connected head mounted display from among a press, a drag, a double tap and a rotation.

Exemplary embodiments of the present general concept provide a head mounted display interface including a touch pad mounted on a head mounted display allowing a touch input by a user to control a virtual character and the display to perform actions on the display from among a drag, a double tap, a rotation, a finger spread and a finger pinch.

Exemplary embodiments of the present general concept provide a system including a portable apparatus including a touch screen configured to display an executed touch pad application, a communication unit configured to communicate with a head mounted display apparatus near the portable apparatus and a controller configured to control the touch screen and the communication unit, where the controller transmits a control packet corresponding to a touch received from the touch pad application to the head mounted display apparatus through the communication unit, and the head mounted display apparatus including a display configured to display content, a touch pad configured to receive a first touch, a communication unit configured to be connected to the portable apparatus and a controller configured to control the display, the touch pad, and the communicator, where the controller changes an operation of a virtual character of the content displayed on the display corresponding to a combination of information regarding the first touch and second touch information received from the portable apparatus through the communication unit.

The portable apparatus includes a cell phone.

BRIEF DESCRIPTION OF THE DRAWINGS

These and/or other features and utilities of the present general concept will become apparent and more readily appreciated from the following description of the embodiments, taken in conjunction with the accompanying drawings of which:

FIG. 5 is a reference view illustrating a display screen of an exemplary embodiment of the multi display apparatus of FIG. 4;

FIG. 11 is a reference view illustrating a display screen of an exemplary embodiment of the multi display apparatus of FIG. 10;

FIG. 18 is a reference view illustrating a display screen of an exemplary embodiment of the multi display apparatus of FIG. 17;

FIG. 48 is a view illustrating an arrangement of displays of the multi display apparatus wirelessly connected according to another exemplary embodiment of the present general concept;

FIGS. 53A and 53B are views illustrating examples of a touch gesture of a head mounted display apparatus and a touch gesture of a portable apparatus according to an exemplary embodiment; and FIGS. 54-56 are tables illustrating exemplary gestures.

DETAILED DESCRIPTION OF THE EMBODIMENTS

Figure 1:
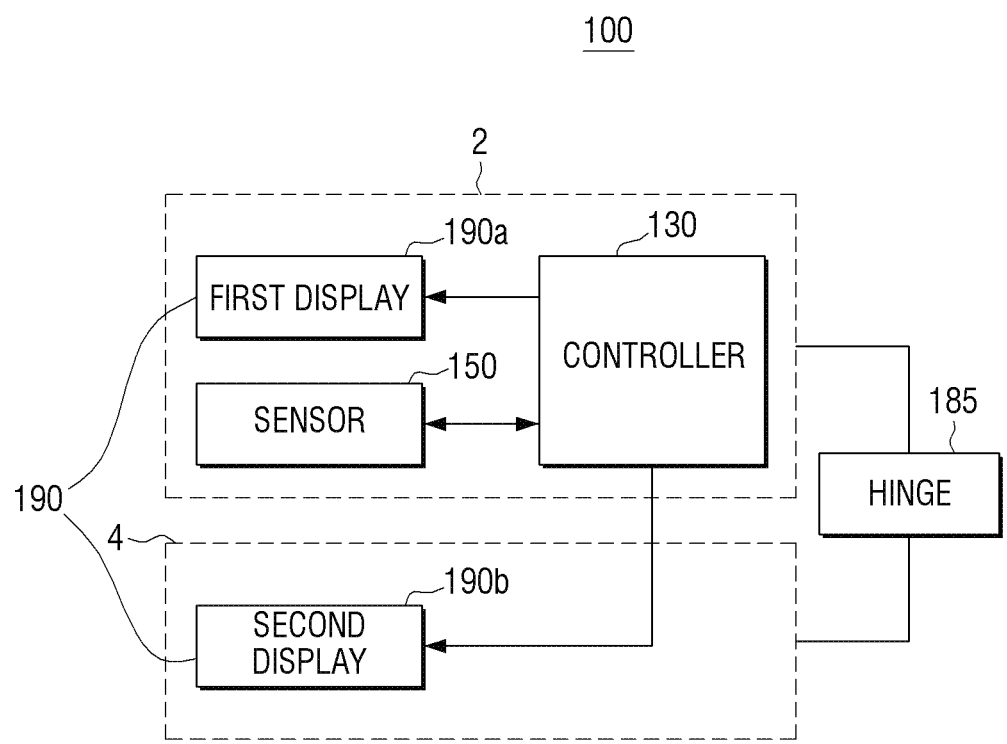
FIG. 1 is a block diagram illustrating a configuration of a multi display apparatus according to an exemplary embodiment of the present general concept.

Reference will now be made in detail to the embodiments of the present general concept, examples of which are illustrated in the accompanying drawings, wherein like reference numerals refer to the like elements throughout. The embodiments are described below in order to explain the present general concept while referring to the figures.

In addition, a method of manufacturing and using an exemplary embodiment will be described in detail with reference to the contents recited in the drawings attached herewith. The like reference numerals and symbols in the drawings refer to the like parts and elements which perform substantially the same functions.

In the present disclosure, relational terms such as first and second, and the like, may be used to distinguish one entity from another entity, without necessarily implying any actual relationship or order between such entities. For example, a first element may be referred to as a second element, and vise versa without going beyond the scope of rights. In addition, the term, "and/or", includes combination of a plurality of related items or one of those items.

In the present specification, a multi display apparatus is an apparatus having a plurality of displays including one or more touch screens, and configured to execute an application or display contents. Examples include a tablet personal computer (PC), portable multimedia player (PMP), personal digital assistant (PDA), smart phone, mobile phone, and digital photo frame, etc. The exemplary embodiments of the present general concept described below and illustrated in the drawings are directed to a multi display apparatus such as a cellular phone or smart phone. However, it will be understood that the present general concept is not limited to these exemplary embodiments, and may be applied to any multi display apparatus.

An application refers to software which is executed and used by a user on an Operating System (OS) for computer or a mobile OS. For example, an application may include a word processor, a spread sheet, contacts, a calendar, a memo, an alarm, a Social Network System, chatting, a map, a game, virtual reality, software, augmented reality software, 3-dimensional software, a music player or video player. An application according to an exemplary embodiment may refer to software which is executed in a portable apparatus or in an external apparatus (for example, a server, etc.) connected to the portable apparatus with wire or wirelessly. In addition, the application according to an exemplary embodiment may refer to software which is executed in a portable apparatus in accordance with a user input received.

A content may be displayed on or by an application executed. For example, a content may include a video file or an audio file executed or produced in a video player which is one of the applications, an audio file played in a music player, a photo file displayed in a photo gallery, a computer game (for example, shooting, sports, car racing, solving mazes, etc.), a web page displayed on a browser, etc. The computer game may include an arcade game, a home video game, a portable device game, or a home computer game. The content may refer to a virtual character which operates in virtual reality software, computer game or augmented reality software. The virtual character may be a virtual avatar corresponding to a user who executes virtual reality software, computer game or augmented reality software, a car, a plane, a ship, or an object around the averter (for example, wall of mazes, car track or background) if there is no avatar, but is not limited thereto.

In addition, the content may include audio, video, text, an image, or a web page which are displayed and executed in an application. The content may include audio, video, text, an image or a web page which is executed in accordance with a user input (for example, a touch, etc.). The content may include an executed or produced application screen and user interface which constitutes the application screen. Further, the content may include a single content or a plurality of contents.

A widget refers to a mini application which is one of Graphic User Interface (GUI) which facilitates interaction between a user and an application or OS, and includes a weather widget, a calculator widget, a clock widget, etc.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof. The said reference numerals in each drawing refer to elements which perform substantially said functions.

Figure 2:
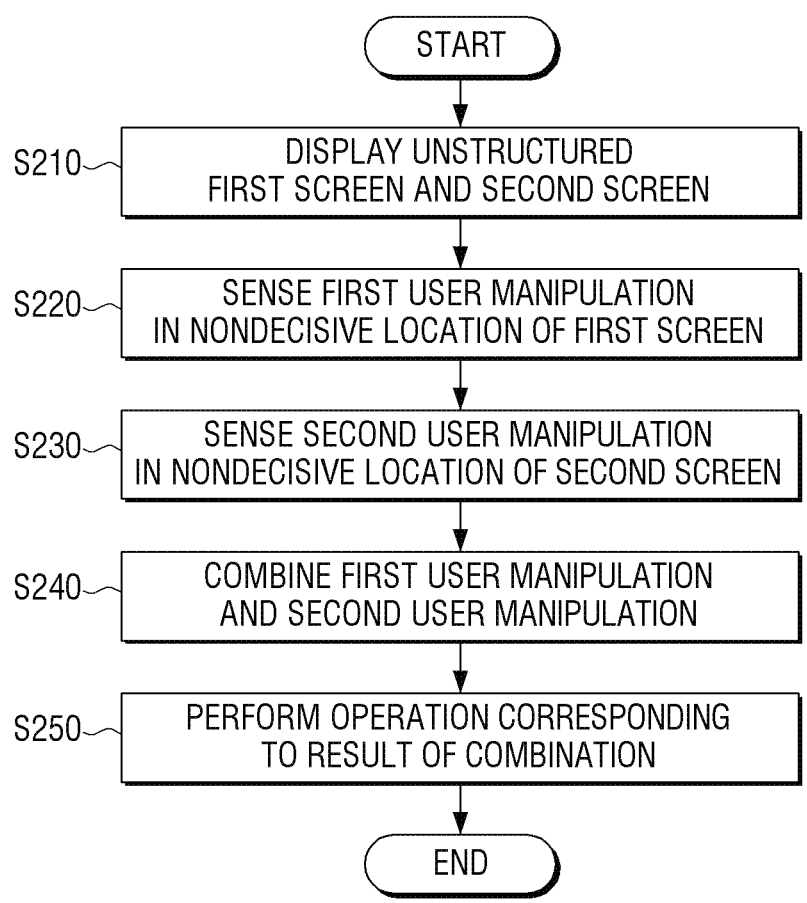
FIG. 2 is a flowchart illustrating operations of a multi display apparatus according to an exemplary embodiment of the present general concept.

FIG. 1 is a block diagram illustrating a configuration of a multi display apparatus 100 according to an exemplary embodiment of the present general concept, and FIG. 2 is a flowchart illustrating an operation of a multi display apparatus 100 according to an exemplary embodiment of the present general concept.

With reference to FIG. 1, a multi display apparatus 100 according to an exemplary embodiment of the present general inventive concept includes a first body 2, a second body 4, a hinge 185, a sensor 150, and a controller 130.

The first body 2 may include a first display 190*a* of the multi display apparatus 100. In addition, as illustrated in FIG. 1, the first body 2 may include the sensor 150, and the controller 130 to be explained hereinbelow. However, the sensor 150 and controller 130 may alternatively be included in the second body 3. Besides the above, the first body 2 may further include circuit components (not illustrated) to drive the first display 190*a* and a bezel (not illustrated) to accept the circuit components, but further configuration and explanation is omitted for convenience of explanation.

The second body 4 may include a second display 190*b* of the multi display apparatus 100. Besides the above, the second body 4 includes circuit components (not illustrated) to drive the second display 190*b* and a bezel (not illustrated) to accept the circuit components. The circuit components may be included in either one of the first body 2 or the second body 4, or in both the first body 2 and the second body 4. The first body 2 and the second body 4 are connected to each other by the hinge 185, to be explained hereinbelow.

The first display 190*a* and the second display 190*b* may be referred to as a multi display (dual display) 190.

The hinge 185 is configured to connect the first body 2 and the second body 4 to support the first body 2 and the second body 4 so that they are rotatable. More specifically, the hinge 185 combines the first body 2 and the second body 4 physically so that they could be connected to each other, and plays the role of a shaft so that the first body 2 and the second body 4 may rotate while they are connected to each other. An exterior configuration of the first and second body 4 and the hinge 185 will be explained hereinbelow with reference to the figures. However, the hinge 185 may be embodied as a part of a flexible connector or flexible touch screen (not illustrated) besides the structure to be explained hereinbelow.

The sensor 150 is configured to sense a user manipulation of the multi display apparatus 100. For example, when there is a touch input of a user object 50 (illustrated for example in FIG. 34) through a display 190*a*, 190*b*, the sensor 150 senses a location (coordinate) of a touch input and a type of input. Especially, when the first display 190*a* and the second display 190*b* display a nonstructured first screen and second screen, respectively, as described below with reference to FIG. 2, the sensor 150 senses a first user manipulation regarding a nondecisive location of the first screen and a second user manipulation regarding a nondecisive location of a second screen.

Figure 3:
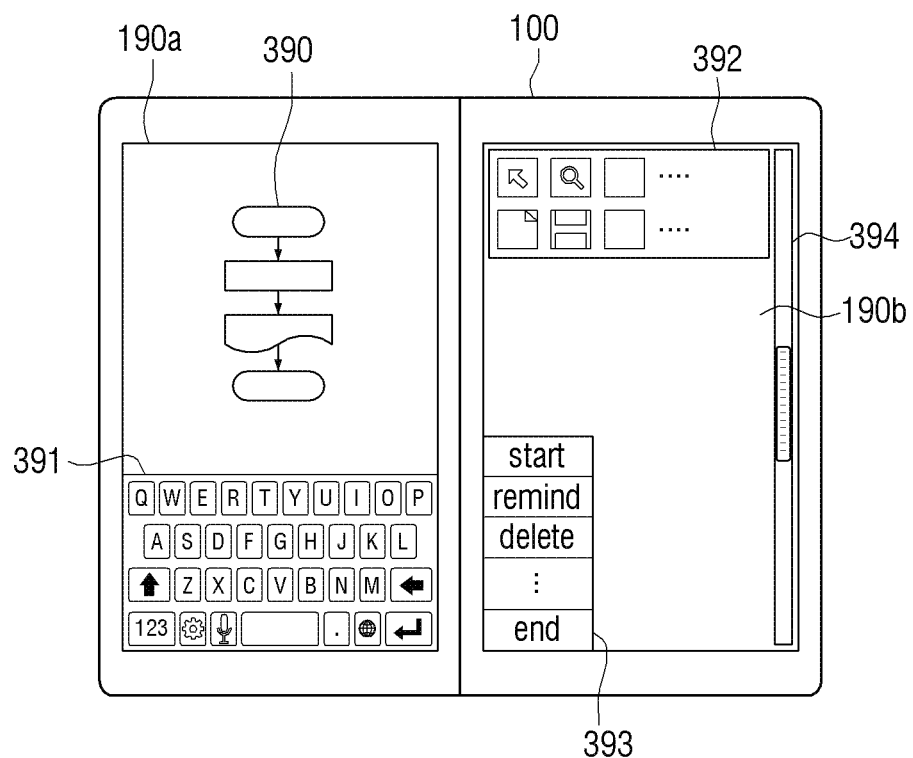
FIG. 3 is a view illustrating a structured screen according to an exemplary embodiment of the present general concept.

A structured state refers to a state where various menus and other objects that a user may select are arranged according to a predetermined layout. That is, a structured screen is a screen configured to provide an interface structured by such a layout. Examples of a structured screen include templates 390 having various shapes, keypads 391 where numbers or text data could be input, and screens where tool bars 392, menu buttons 393, scroll bars 394, etc. are displayed, as illustrated in FIG. 3. A user becomes able to perform an input by simply touching a button of a menu at a predetermined location on a screen or by an operation (for example, dragging their finger) while touching the button. On the other hand, a nonstructured screen refers to a screen that does not provide a structured interface. When a nonstructured screen is displayed, the user may simply drag a nondecisive location of the screen or may touch for a predetermined time (touch & hold input) and perform an input. Various types of user input will be explained hereinbelow in tables 1 to 3.

Herein, a nondecisive location denotes any location on the screen. In other words, a nondecisive location means that a same result can be obtained regardless of the location of an input on the screen.

In various exemplary embodiments of the present general concept, the sensor 150 may sense whether or not a user object 50 touched or is proximate to the multi display apparatus 100, and the location where the touch or the proximity is made. The definitions of "touch" and "proximate" for the purposes of the present general concept are given below. In addition, the sensor 150 may distinguish a case where the user object 50 is the user's body and a case where the user object 50 is an input pen 200. Technological means which may support the aforementioned exemplary embodiments will be explained in further detail hereinbelow.

The controller 130 combines a first user manipulation and a second user manipulation, and performs a control operation corresponding to a result of that combination. For example, when there is a touch input in the first display 190*a* and there is also a proximate input in the second display 190*b*, the controller 130 may perform operations corresponding to each of the touch input and the proximate input, but the controller 130 may also perform a calculation corresponding to the result of that combination. In addition, the controller 130 may display information corresponding to at least one calculation result of the first display 190*a* and the second display 190*b*. Operations of the controller 130 will be explained in further detail hereinbelow based on each exemplary embodiment of the present general concept, and the technological means configuring the controller 130 may be explained in further detail hereinbelow.

First of all, various input types to be used in the exemplary embodiments of the present general concept are as follows. Herein, inputs using the user object 50 include a touch, proximity, and motion. The user object 50 may be part of the user's body such as fingers or palm, or other objects such as an input pen 200. The input pen 200 may be made from conductive material such as metal, but it may also be made from other materials that may be detected by the sensor 150. For example, an input pen 200 may be configured to include magnetic coil, and the sensor 150 of the multi display apparatus 100 may include a magnetic sensor.

As such, the input pen 200 including the magnetic coil may also be the user object 50. As such, the user object 50 includes all types of objects and bodies that may be recognized within contact or a predetermined range. These various objects may be used independently or used in combinations.

A touch denotes an input of contacting the aforementioned user object 50. For example, it is a user's operation of contacting one location or a plurality of consecutive locations on a touch screen 192 (illustrated in FIG. 31) using a user object 50 may include the user's fingers (especially, index finger) of a left hand and right hand, thumb, or a stylus pen 200 contacting the touch screen 192. Technological means to recognize a touch will be explained hereinbelow.

Proximity denotes an input of locating a user object 50 within the predetermined range 5 of the sensor 150 of the multi display apparatus 100 without directly touching or pressing the multi display apparatus 100. Various exemplary embodiments of the present general concept presuppose differentiating between the aforementioned proximity and touch. Technological means to recognize proximity will be explained in further detail hereinbelow.

A motion denotes an input of a predetermined identifiable movement while proximate to the multi display apparatus 100. "Motion" may be included in the definition of "proximity," and thus a detailed explanation is omitted herein.

Various input types used in the present disclosure are explained with reference to the table below. The explanation below is made based on a touch input, but proximate inputs may be based on the same reference. In addition, as aforementioned, the user object 50 may be the user's body part or input pen 200.

Referring to FIG. 54, which includes Table 1, Table 1 illustrates exemplary gesture types which use one finger. Although hereinbelow is explanation in the case where the user object 50 is a finger, cases where other user objects 50 are used are also defined as the same operation.

With reference to table 1, examples of a gesture type using one finger include Tap, Touch & Hold, Double Tap, Drag, Drag & Drop, and Flick etc.

A tap denotes an operation where the user contacts the user object 50 to the screen for a predetermined time and then separates it therefrom. A touch & hold is an operation where the user object 50 touches the touch screen 192 for more than a predetermined time. A double tap denotes an operation of performing a tap twice quickly and consecutively within a predetermined time. A drag is an operation of moving to a predetermined direction while a touch is made, and a drag & drop is an operation of touching any object on the touch screen 192 and performing a drag to a predetermined location and then separating the user object 50 therefrom. A flick is an operation of quickly dragging.

Referring to FIG. 55, which includes Table 2, Table 2 illustrates exemplary gesture types using two fingers. Although hereinbelow is explanation in the case where the user object 50 is a finger, cases where other user objects 50 are used are also defined as the same operation.

With reference to table 2, gesture types using two fingers include a Two Finger Tap, Touch & Spread, Pinch Out, Pinch In, Two Finger Drag, Cross Two Finger, and Touch & Rotate etc.

A Two Finger Tap is an operation of two fingers tapping at the same time. A Touch & Spread is an operation of two fingers pressing the touch screen 192 at the same time, one finger moving, and the other finger moving in a straight line. A Pinch Out is an operation of two fingers touching the screen at the same time and then dragging away from each other, while a Pinch In is an operation of two fingers touching the touch screen 192 and then dragging in a direction towards each other. A Two Finger Drag is an operation of two fingers dragging in a same direction, a Cross Two Finger is an operation of dragging in an approaching direction at the same time and then dragging away from each other again. Finally, a Touch & Rotate is an operation with one finger touching the touch screen 192 (touch & hold) and the other rotating around the still finger.

Referring to FIG. 56, which includes Table 3, Table 3 illustrates exemplary gesture types using two or more fingers and a gesture type using a palm.

With reference to table 3, examples of a gesture type using two or more fingers include a Three Finger Touch, Four Finger Touch, and Five Finger Touch etc. In addition, it is possible to perform gesture operations such as a Tap, Drag, and Rotate, as illustrated in the aforementioned tables 1 and 2.

The sensor 150 identifies each input type of the aforementioned tables 1 to 3, and transmits the identification information to the controller 130. Each aforementioned input type may be sensed independently and be transmitted to the controller 130. The controller 130 may process calculations corresponding to combination results of each input type or a plurality of input types sensed by the sensor and display information corresponding to the calculation results on the first display 190*a* or second display 190*b*.

Operations of the aforementioned multi display apparatus 100 may be performed according to the flowchart illustrated in FIG. 2.

First of all, the first display 190*a* and second display 190*b* each displays the nonstructured first screen and second screen (operation S210). In this state, the multi display apparatus 100 may sense a first user manipulation made in a nondecisive location of the first screen and a second user manipulation made in a nondecisive location of a second screen (operations S220, S230). In FIG. 2, it is explained that the first user manipulation is made first and then the second user manipulation is made next, but the first and second user manipulations may be made independently and sensed. When the first and second user manipulations are each sensed, the multi display apparatus 100 combines the sensed first user manipulation and second user manipulation (operation S240), and performs one or more operations corresponding to that combination result (operation S250). Operations performed by the combination of the user manipulations may be embodied in various ways according to exemplary embodiments of the present general concept.

Hereinbelow is explanation on various examples of operations performed by the first and second user manipulations made in nondecisive locations.

First of all, hereinbelow is explanation of an exemplary embodiment of changing a function matching a second user manipulation, when there is a first user manipulation through the first display 190*a* of the multi display apparatus 100.

In a case of performing a user manipulation on a display to perform a particular operation, it is necessary to set a function matching the user manipulation. For example, in a case of performing an operation of drawing a line according to a user manipulation on a screen of a display, there may be a need to adjust the thickness of the line according to circumstances. Herein, it is possible to use a menu screen to adjust the thickness of the line through a structured interface and adjust the thickness of the line. However, such an operation is cumbersome, and may cause inconvenience if there is frequent changing of functions. Therefore, there is a need to reduce the setting process for user manipulation.

Figure 4:
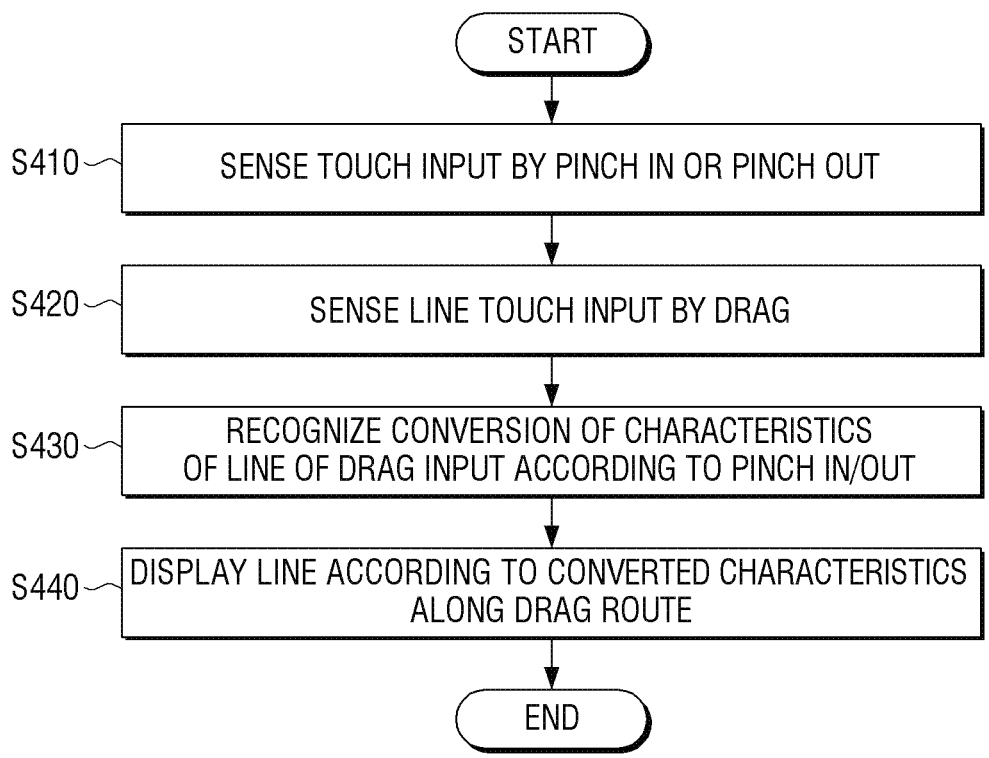
FIG. 4 is a flowchart illustrating an operation of a multi display apparatus according to an exemplary embodiment of the present general concept configured to change a function matching a second user manipulation, when there is a first user manipulation.

FIG. 4 is a flowchart illustrating operations of the multi display apparatus 100 changing functions matching the second using manipulation when there is a first user manipulation, and FIG. 5 is a reference view illustrating the display screen of the multi display apparatus 100 of FIG. 4.

With reference to FIG. 4, first of all, the sensor 150 senses a point touched in the first display 190*a* or the second display 190*b* and notifies the controller 130. The controller 130 determines whether a pinch in or pinch out is made according to the number and location of the touch point (operation S410). The controller 130 determines a pinch out when a touch is sensed at two or more points and the straight line distance between the sensed coordinates increases, and determines a pinch out when the straight line distance between the sensed coordinates decreases. The pinch in and pinch out may be the first user manipulation aforementioned.

The controller 130 may perform operations corresponding to the determined pinch input. That is, as illustrated in FIG. 4, it is possible to adjust the thickness of the line or change the transparency or other characteristics according to the pinch input.

In this state, when a drag is made in a nondecisive location of another display, through the sensor 150 the controller 130 may sense a touch input by a drag defining a drag route (operation S420). Herein, the drag may be the aforementioned second user manipulation.

The controller 130 may recognize, according to the detected pinch in or pinch out of the first user input, whether a command to adjust characteristics of the line, such as thickness or transparency, has been input (operation S430). The controller 130 performs an operation of displaying a line along the drag route according to the converted characteristics (operation S440).

View (1) of FIG. 5 is a view illustrating a state of adjusting the thickness of a line.

According to view (1) of FIG. 5, the first display 190a, located on the left, displays the nonstructured first screen, and the sensor 150 senses the first user manipulation at the nondecisive location of the first screen. Such an operation is performed by a touch sensor, but this will be explained in further detail below. In addition, the second display 190b, located on the right, also displays the nonstructured second screen. It will be understood that the first and second displays 190a and 190b are not necessarily located on the left and right as illustrated in FIG. 5, and may have different orientations to each other depending on the configuration of the multi display apparatus 100.

As illustrated in FIG. 5, the user may perform a touch input such as a pinch in or pinch out using fingers in the first display 190a. At the same time, the user may perform a touch input using an input pen 200 or one's fingers, or other user objects 50 on the second display 190b. For convenience of explanation, FIG. 5 illustrates a case of an input pen 200, and also in various exemplary embodiments of the present general concept to be explained below, explanation is based on a limitation that manipulations are made using an input pen 200 regarding one display, and using the user's body regarding the other display. However, as aforementioned, manipulations may obviously be made using only the input pen 200 or only the user's body regarding both displays. Explanation hereinbelow will be made in consideration of specific situations and convenience of explanation, but the exemplary embodiments of the present general concept may be performed in all types of manipulation methods.

In the exemplary embodiment of view (1) of FIG. 5, when there is a touch input by a pinch in using fingers on the first display 190a, the controller 130 displays a line according to the changed thickness along the input route of the input pen 200 (or user's body) regarding the second display 190b. Therefore, a gradually thinner line is displayed along the drag route of the input pen 200 on the second display 190b. On the other hand, when there is a touch input by a pinch out using fingers on the first display 190a, the controller 130 displays a line according to the changed thickness along the input route of the input pen 200 regarding the second display 190b. Accordingly, a gradually thicker line is displayed along the drag route of the input pen 200 on the second display 190b.

View (2) of FIG. 5 illustrates an exemplary embodiment of the present general concept similar to (view 1), illustrating operations of the multi display apparatus 100 of changing the transparency of the line output by the second user manipulation when the first user manipulation is a touch input by a pinch in or pinch out. For example, in a case where the first user manipulation is a touch input by a pinch in, when performing an operation of drawing a line on the second display 190b with the input pen 200, the transparency of the line being drawn by the input pen 200 decreases. On the other hand, when the first user manipulation is a touch input by a pinch out, the transparency of the line being drawn by the input pen 200 increases. Of course, the outputs corresponding to the pinch in and pinch out may be set to be opposite to each other from this particular exemplary embodiment of the present general concept.

In this exemplary embodiment of the present general concept, the user becomes able to change the thickness or transparency of an input expression regarding the second display 190b with simply a touch input by a pinch in or pinch out into the first display 190a of the multi display apparatus 100 only. That is, there is no need to perform numerous manipulations using an additional structured interface in order to change the functions matching the second user manipulation. By performing an input at a certain point on a nonstructured screen, the user becomes able to easily change the function corresponding to the user manipulation.

Figure 6:
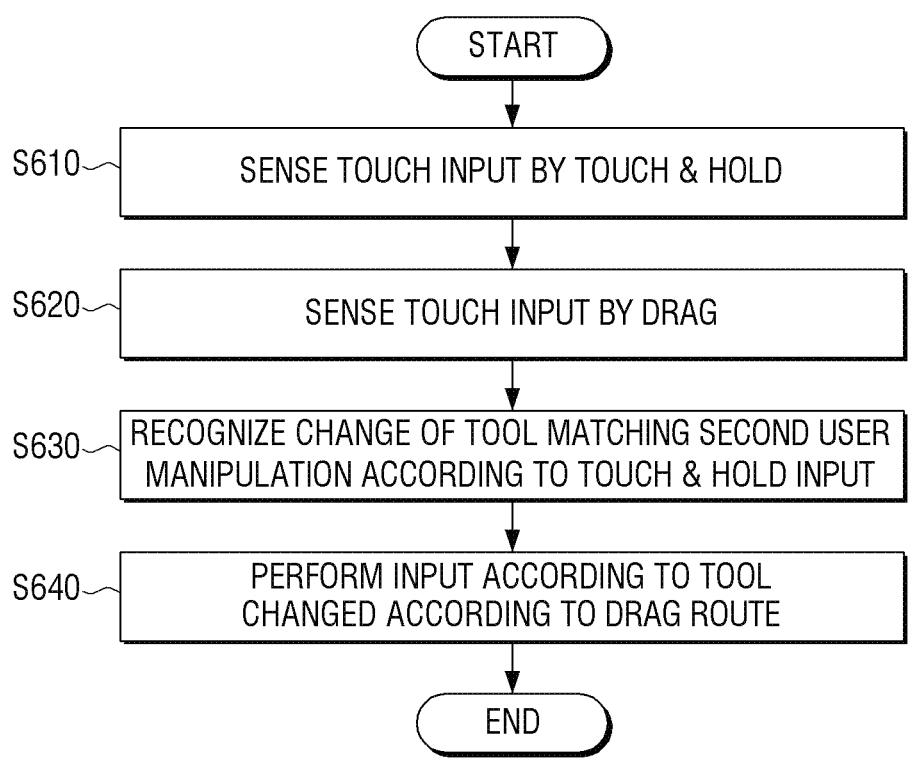
FIG. 6 is a flowchart illustrating another exemplary embodiment of the multi display apparatus of FIG. 4.
Figure 7:
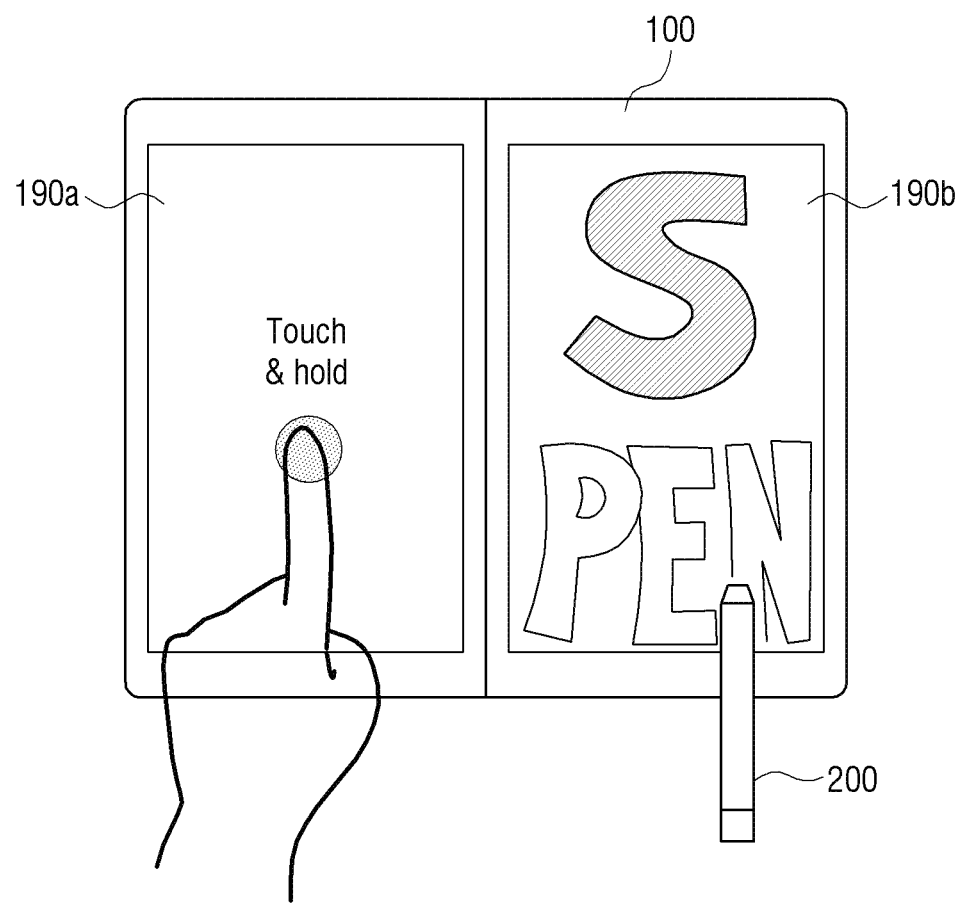
FIG. 7 is a reference view illustrating a display screen of an exemplary embodiment of the multi display apparatus of FIG. 6.

FIG. 6 is a flowchart illustrating another exemplary embodiment of the multi display apparatus 100 of FIG. 4, and FIG. 7 is a reference view illustrating a display screen of an exemplary embodiment of the multi display apparatus 100 of FIG. 6.

With reference to FIG. 6, the sensor 150 senses a first user manipulation which is maintained for a predetermined time with an initial touch made in the first display 190a and the touch is not removed, that is, a touch input by a touch & hold (operation S610). That is, the display 190a displays the nonstructured first screen, and the sensor 150 senses that there is a touch input by a touch & hold at a nondecisive location of the first screen. Such an operation may be performed by a touch sensor, but this will be explained in more detail below.

After the first user manipulation is sensed, a second user manipulation may be performed on the second display 190b while the first user manipulation is maintained. This second user manipulation may be a touch input by a drag on the second display 190b (operation S620). This drag operation defines a drag route on the second display 190b.

In this case, the controller 130 recognizes that the first user manipulation is to convert the tools corresponding to the second user manipulation, and that the second user manipulation is an operation to perform an input along the drag route (operation S630). In addition, the controller 130 performs an input along the drag route according to the changed tool (operation S640). In the exemplary embodiment of the present general concept illustrated in FIG. 7, when there is a touch input by a touch & hold using fingers in the first display 190a, the controller 130 converts the tool corresponding to the input of the input pen 200 regarding the second display 190b into an eraser. In addition, the controller 130 recognizes that there is an eraser input along the drag route of the input pen 200 on the second display 190b, and deletes the display on the route.

Unlike the above, when the user stops a touch & hold input regarding the first display 190a, that is, when the user detaches one's hand from the first display 190a, the sensor 150 does not sense the first user manipulation any more, but senses only the second user manipulation, and thus the controller 130 performs only operations corresponding to the second user manipulation. As an example, in the exemplary embodiment of the present general concept illustrated in FIG. 4, the tool corresponding to the input of the input pen 200 returns from an eraser to the original tool again, and an input is performed according to the original tool.

In such an exemplary embodiment of the present general concept, the user becomes able to change the input tool regarding the second display 190b with only a touch input (such as for example a touch & hold) in the first display 190a. That is, it is not necessary to perform numerous manipulations using an additional structured interface in order to change the function matching the second user manipulation. The user becomes able to easily change the function corresponding to the user manipulation by performing an input at any point on the nonstructured screen.

Figure 8:
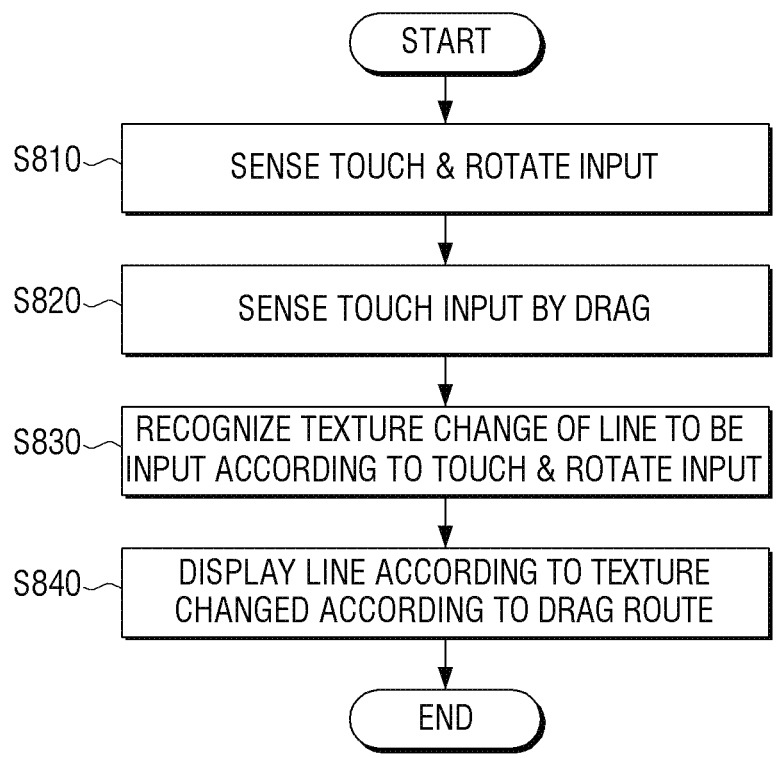
FIG. 8 is a flowchart illustrating another exemplary embodiment of the multi display apparatus of FIG. 4.

FIG. 8 is a flowchart illustrating another exemplary embodiment of the multi display apparatus 100 of FIG. 4.

Figure 9:
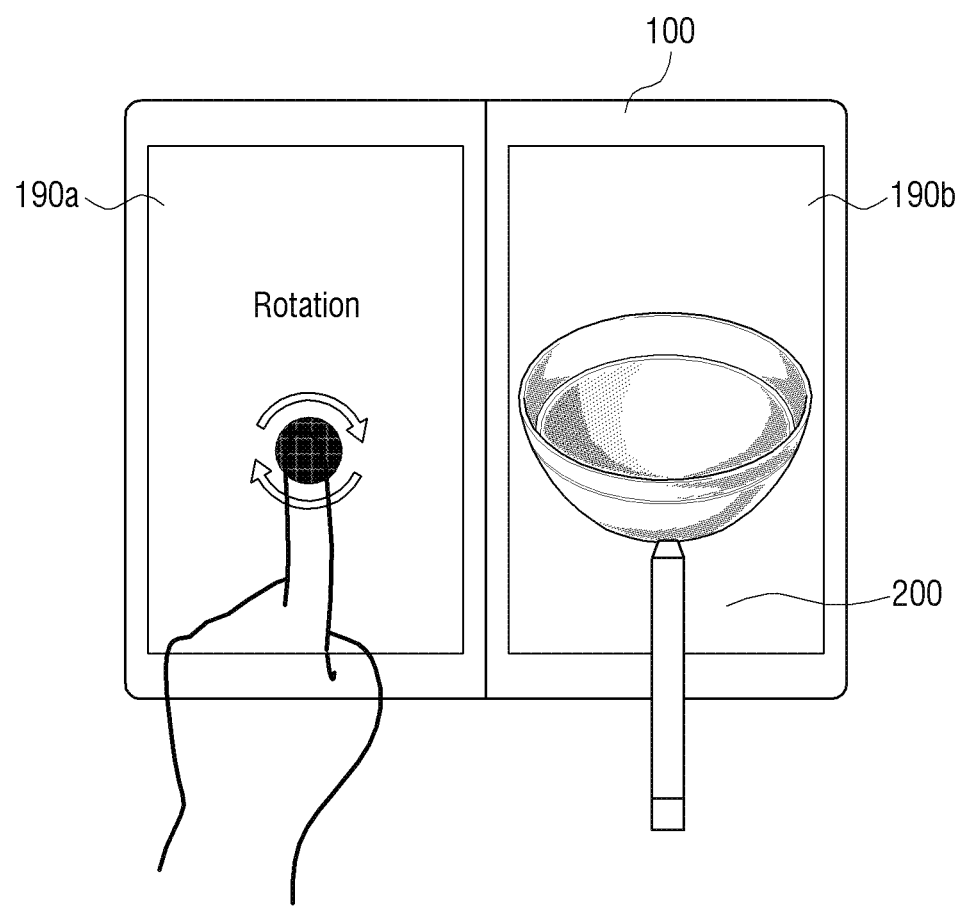
FIG. 9 is a reference view illustrating a display screen of an exemplary embodiment of the multi display apparatus of FIG. 8.

FIG. 9 is a reference view illustrating a display screen of an exemplary embodiment of the multi display apparatus 100 of FIG. 8.

With reference to FIG. 8, first of all, the sensor 150 senses the first user manipulation where a touch input by rotation, that is where an initial touch is made in the first display 190a and a drag is made by a rotations in one direction, corresponding to a touch & rotate (operation S810). That is, the first display 190a displays the nonstructured first screen, and the sensor 150 senses that there is a touch input by a touch & rotate at a nondecisive location of the first screen.

After the first user manipulation is sensed, a second user manipulation of a touch input by a drag regarding the second display 190b is sensed (operation S820). Herein, the touch input by the drag may be made by the input pen 200. In the exemplary embodiment of the present general concept illustrated in FIG. 9, a drag input is performed in the second display 190b using the input pen 200. The drag input defines a drag route on the second display 190b.

In this case, the controller 130 recognizes that the first user manipulation is to convert the texture of the line displayed by the second user manipulation, and recognizes that the second user manipulation is an operation to perform an input along the drag route. In addition, the controller 130 combines both user manipulations and recognizes the input of a line, the texture of which is changed along the drag route (operation S830). The line is then displayed according to the changed texture along the drag route (operation S840).

Herein, texture denotes characteristics of the material being displayed. For example, in the case of an embossing, the texture denotes a case where protruded parts and recessed parts exist in turns so that each part is shown as an emboss with protruded parts and an engrave with recessed parts. Another example may be expressions of a touch of a thin brush or a touch of a thick brush.

As in FIG. 9, when the first user manipulation is a touch input by a rotation in one direction (for example, in a clockwise direction), the texture of the line or dot displayed on the second display 190b by the input pen 200 may be changed (operation S840). On the other hand, when the first user manipulation is a touch input by a rotation in another direction (for example, a counterclockwise direction), the texture of the line or dot displayed by the input pen 200 may return to the original state or be changed to another shape. That is, when there is a first user manipulation of a rotation in one direction, the line or dot displayed on the second display 190b by the input pen 200 may be expressed as a watercolor painting brush, and when there is a first user manipulation of a rotation in another direction, the line or dot may return to the original state, or may be expressed to show a more precise brush. However, this is merely an exemplary embodiment, and thus more various textures may be expressed.

Figure 10:
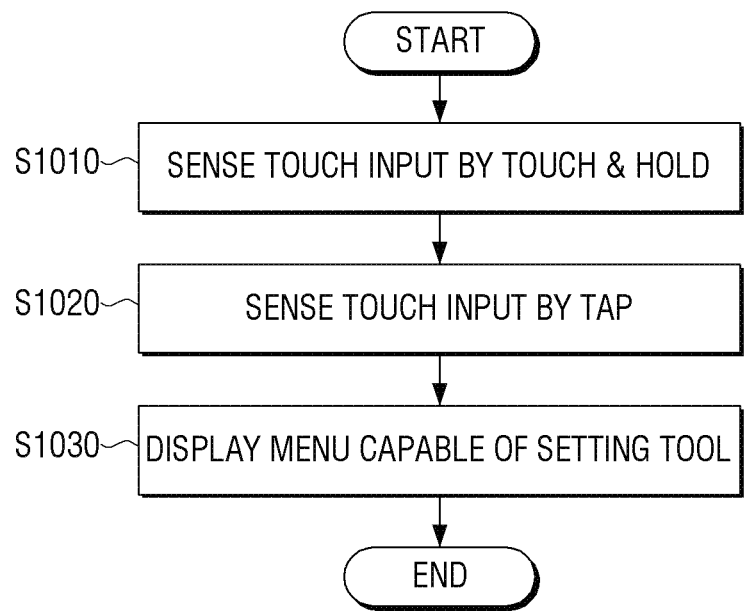
FIG. 10 is a flowchart illustrating another exemplary embodiment of the multi display apparatus of FIG. 2.

FIG. 10 is a flowchart specifically illustrating a tool menu display of a multi display apparatus 100 according to an exemplary embodiment of the present general concept, and FIG. 11 is a reference view illustrating a display screen of the multi display apparatus 100 of FIG. 10.

In the case of performing an operation of drawing a picture on the multi display apparatus 100 through a touch input, or selecting a certain tool and performing an operation, there may be a need to change the setting of the tool. FIGS. 10 and 11 illustrate methods of easily displaying a menu of the tool in such cases.

With reference to FIG. 10, first the sensor 150 senses a first user manipulation where a touch input by a touch & hold, that is, an initial touch is made in the first display 190a and the touch is maintained for a predetermined time and the touch is not removed (operation S1010). The first display 190a displays the nonstructured first screen, and the controller 130 senses that there is a touch input by a touch & hold at a nondecisive location of the first screen using the sensor 150 (operation S1010). While the touch & hold is maintained, a second user manipulation, such as a touch input by a tap on the second display 190b, is sensed (operation S1020). That is, the second display 190b also displays the nonstructured second screen, and the sensor 150 senses that there is a touch input at a nondecisive location of the second screen. Herein, the touch input by the tap may be made by the input pen 200, as illustrated in FIG. 11.

In this case, the controller 130 may display a menu 1110 (operation S1030), which may change the setting of the tool, in response to a touch & hold input performed on the first screen 190a and a second user manipulation on the second screen 190b. Furthermore, when a first user manipulation by a touch & hold is performed on the first screen 190a while the menu 1110 to set the tool is displayed, and there is a second user manipulation such as a touch on the second display 190b, the already displayed menu 1110, which may change the setting of the tool, disappears from the screen.

The above process is illustrated in FIG. 11. To be more specific, when the user performs a touch & hold input on the first display 190a with their hand while drawing a picture on the multi display apparatus 100, and touches the second display 190b with the input pen 200 (view 1), the menu 1110, which may set the tool corresponding to the input pen 200, is displayed on the second display 190b (view 2). The user may perform a setting of the tool corresponding to the input pen 200 through the menu 1110. For example, if the tool corresponding to the input pen 200 is a color pencil, the user may adjust the color and thickness of the color pencil. In addition, when the user performs a touch & hold input on the first display 190a again with their hand, and then touches the second display 190b with the input pen 200 (view 3), the menu 1110 disappears from the second display 190b (view 4).

As such, it is possible to grant functions to the input pen 200 and use the functions without complicated option setting operations.

Hereinbelow is an explanation on various operations of the multi display apparatus 100 which changes a display of the second display 190b according to a first user manipulation when an input is sensed through the first display 190a of the multi display apparatus 100.

Figure 12:
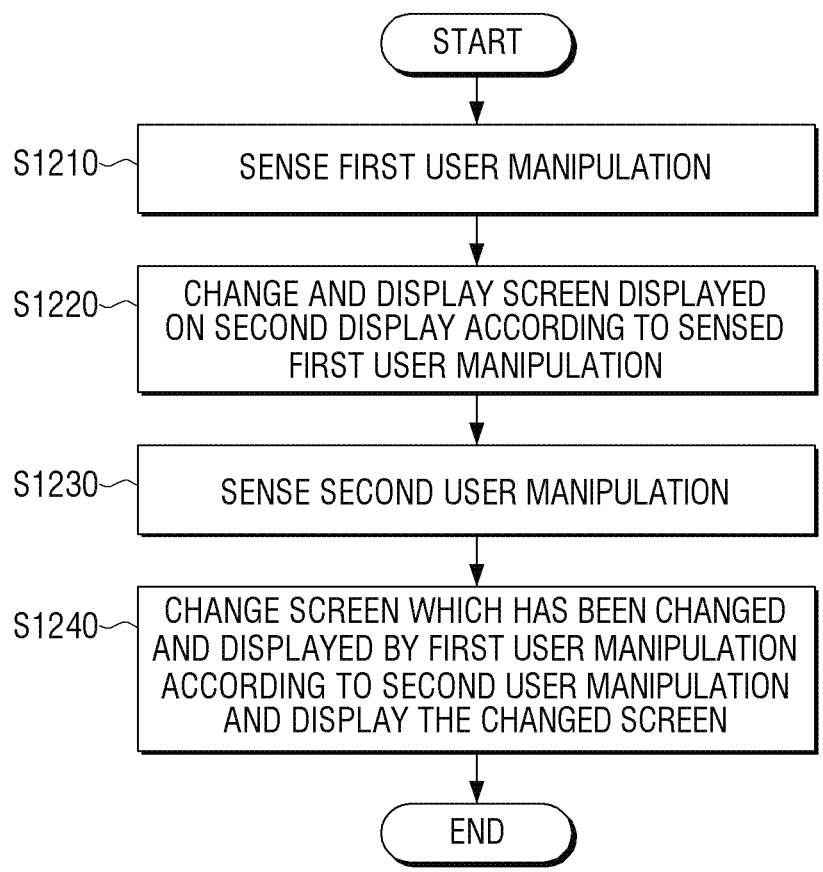
FIG. 12 is a flowchart illustrating operations of a multi display apparatus according to an exemplary embodiment of the present general concept.

FIG. 12 is a flowchart illustrating operations of the multi display apparatus 100 according to an exemplary embodiment of the present general concept.

With reference to FIG. 12, the sensor 150 of the multi display apparatus 100 senses the first user manipulation on the first display 190a (operation S1210). That is, with the first display 190a displaying the nonstructured first screen, the user may touch a nondecisive location of the first screen and input a first user manipulation. When a touch point is sensed by the sensor 150, the controller 130 changes the screen displayed on the second display 190b according to the sensed first user manipulation and displays the changed screen (operation S1220). A screen changing operation may be embodied in various ways according to the type of the first user manipulation. For example, depending on how the first user manipulation is made, an operation of returning to the previous screen, an operation of converting into the next screen, and an operation of returning to the main screen may be selectively performed.

In this state, when the user performs a second user manipulation of touching the second display 190b, the sensor 150 senses the second user manipulation (operation S1230), and the controller 130 changes the screen which has been changed by the first user manipulation and then displayed according to the second user manipulation, and displays the changed screen on the second display 190b (operation S1240).

Figure 13:
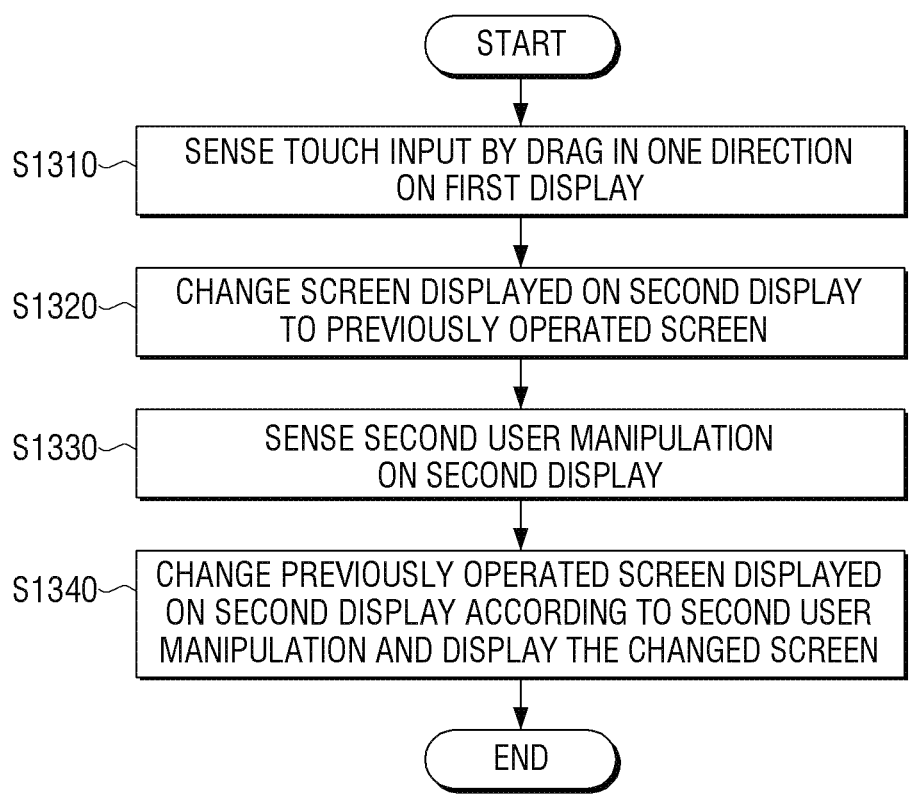
FIG. 13 is a flowchart illustrating an exemplary embodiment of the multi display apparatus of FIG. 12.

Hereinbelow is more detailed explanation on the exemplary embodiment of the present general concept illustrated in FIG. 12. FIG. 13 is a flowchart illustrating a specific exemplary embodiment of the multi display apparatus 100 of FIG. 12, and FIG. 14 is a reference view illustrating a display screen of an exemplary embodiment of the multi display apparatus 100 of FIG. 13.

With reference to FIG. 13, when the sensor 150 of the multi display apparatus 100 senses the first user manipulation such as a drag on the first display 190a (operation S1310), the controller 130 changes the screen displayed on the second display 190b to the previous operated screen according to the sensed first user manipulation and displays the changed screen (operation S1320). This may correspond for example to a scrolling command, moving sequentially back through pictures which have been previously displayed. In this state, when a second user manipulation such as a tap is sensed in the second display 190b by the sensor 150 (operation S1330), the controller 130 changes the previously operated screen being displayed on the second display 190b, the change being according to the second user manipulation, and displays the changed screen (operation S1340).

Figure 14:
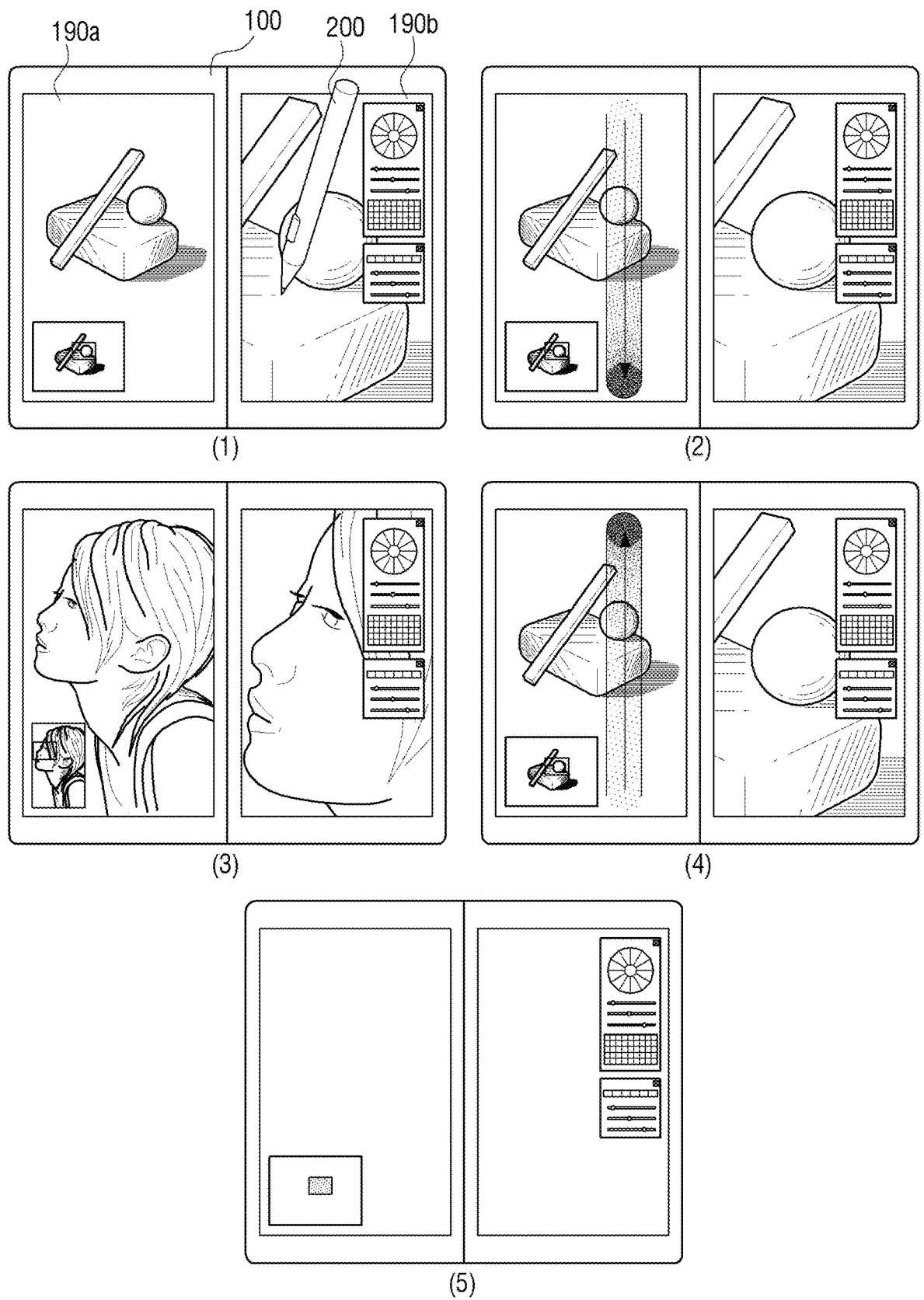
FIG. 14 is a reference view illustrating a display screen of an exemplary embodiment of the multi display apparatus of FIG. 13.

With reference to FIG. 14, a picture is displayed on the second display 190b (view 1). Inputs may be performed on this picture with a user object 50 such as an input pen 200. Such inputs may perform operations such as modifying the picture. When a touch input by a drag is performed in a downward direction on the first display 190a (view 2), a previous picture from among the pictures stored in the second display 190b is displayed (view 3). In addition, a new input may be performed with an input pen 200 on the second display 190b regarding the displayed picture, and perform an operation such as modifying the picture.

Furthermore, when a touch input by a drag in an upwards direction is performed on the first display 190a (view 4), a picture stored after the present picture is displayed on the second display 190b (view 5). In the exemplary embodiment of the present general concept illustrated in FIG. 5, such an upward drag on the first display 190a returns the second display 190b to the original picture illustrated in view 1. There may be various touch input directions by the drag performed by the first display 190a. For example, as an alternative configuration, when there is a touch input by a drag in the left direction (not illustrated) on the first display 190a, the previous picture from among the pictures stored in the second display 190b is displayed, and when there is a touch input by a drag in the right direction (not illustrated) on the first display 190a, the picture after the picture displayed on the second display 190b from among the stored pictures may be displayed.

Figure 15:
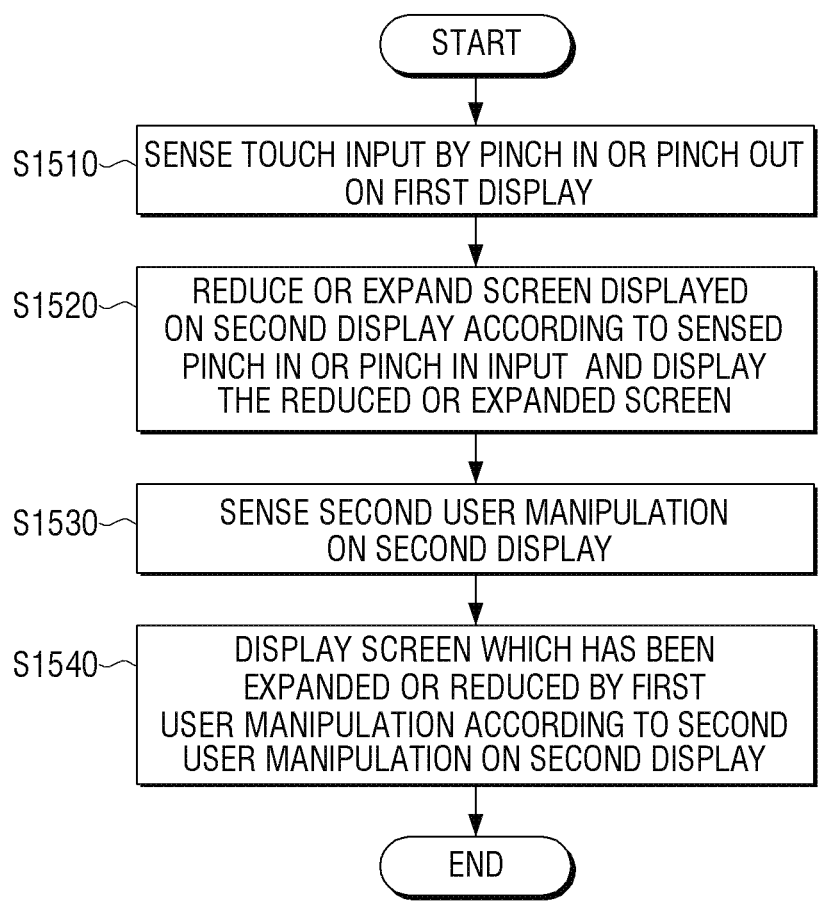
FIG. 15 is a flowchart illustrating another exemplary embodiment of the multi display apparatus of FIG. 12.
Figure 16:
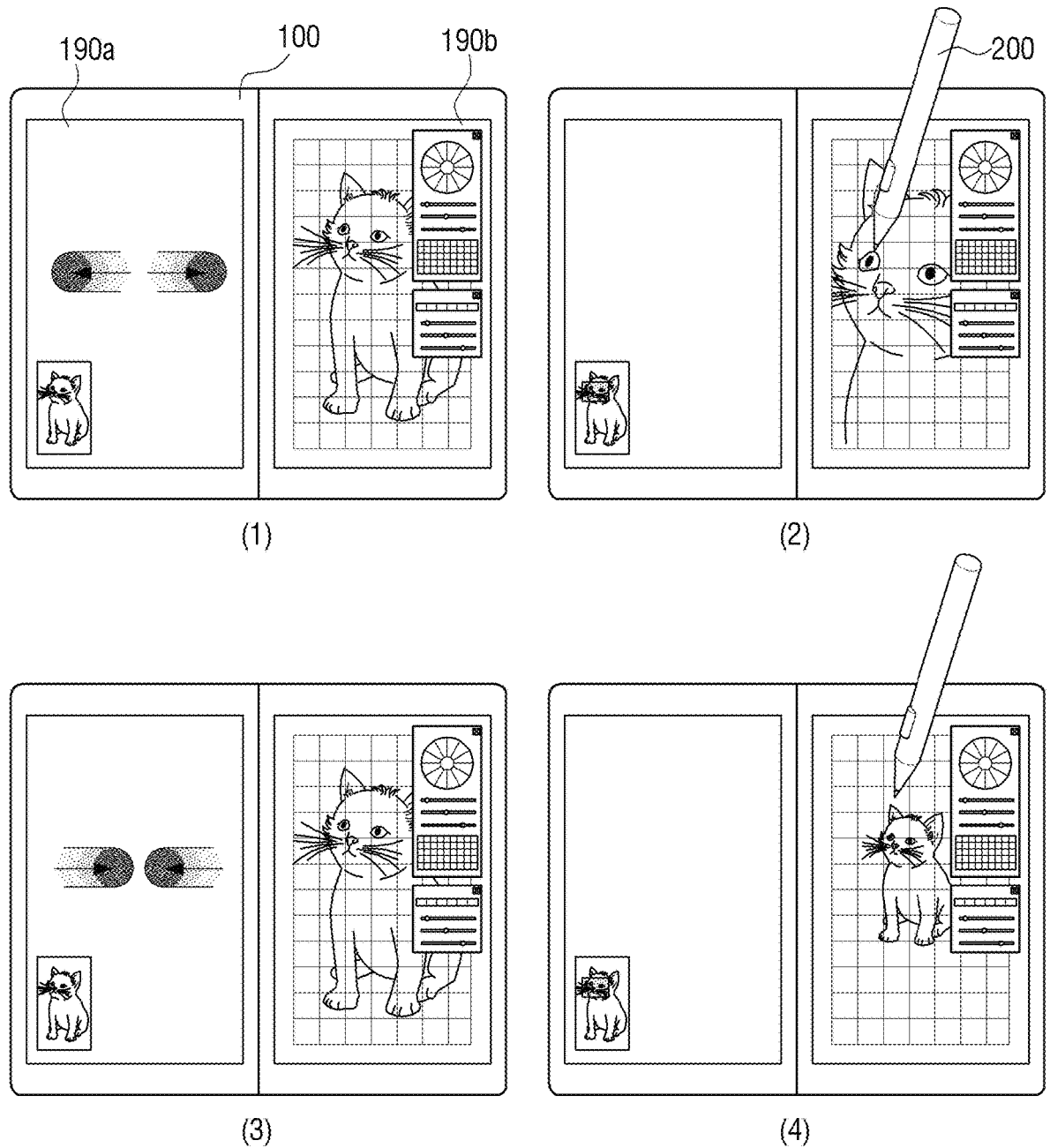
FIG. 16 is a reference view illustrating a display screen of an exemplary embodiment of the multi display apparatus of FIG. 15.

FIG. 15 is a flowchart illustrating another exemplary embodiment of the multi display apparatus 100 of FIG. 12, and FIG. 16 is a reference view illustrating a display screen of an exemplary embodiment of the multi display apparatus 100 of FIG. 15.

With reference to FIG. 15, when the sensor 150 of the multi display apparatus 100 first senses the first user manipulation performing a touch input by a pinch in or pinch out at a certain point on the first display 190a (operation S1510), the controller 130 reduces or expands the screen displayed on the second display 190b according to the sensed first user manipulation and displays the reduced or expanded screen (operation S1520). More specifically, when the first user manipulation is a pinch out input, the controller 130 may expand the screen displayed on the second display 190b according to the direction and length of the drag made by the pinch out input and displays the expanded screen, and when the first user manipulation is a pinch in input, the controller 130 may reduce the screen displayed on the second display 190b according to the direction and length of the drag made by the pinch out input and displays the reduced screen. In addition, the controller 130 senses the second user manipulation performing a touch input by a tap on the second display 190b (operation S1530), and in this case, the controller 130 changes the reduced or expanded screen displayed on the second display 190b according to the second user manipulation result and displays the changed screen (operation S1540).

In the example illustrated in FIG. 16, when a touch input by a pinch out is performed on the first display 190a (view 1), for example in a horizontal direction, the picture displayed on the second display 190b is expanded to correspond to the direction and length of the drag made by the pinch out and is displayed (view 2). In addition, the user becomes able to perform a new input on the second display 190b regarding the expanded and displayed picture with the input pen 200, such as performing an operation of modifying the picture. On the other hand, when a touch input by a pinch in is performed on the first display 190a (view 3), the picture displayed on the second display 190b is reduced and then displayed (view 4).

Figure 17:
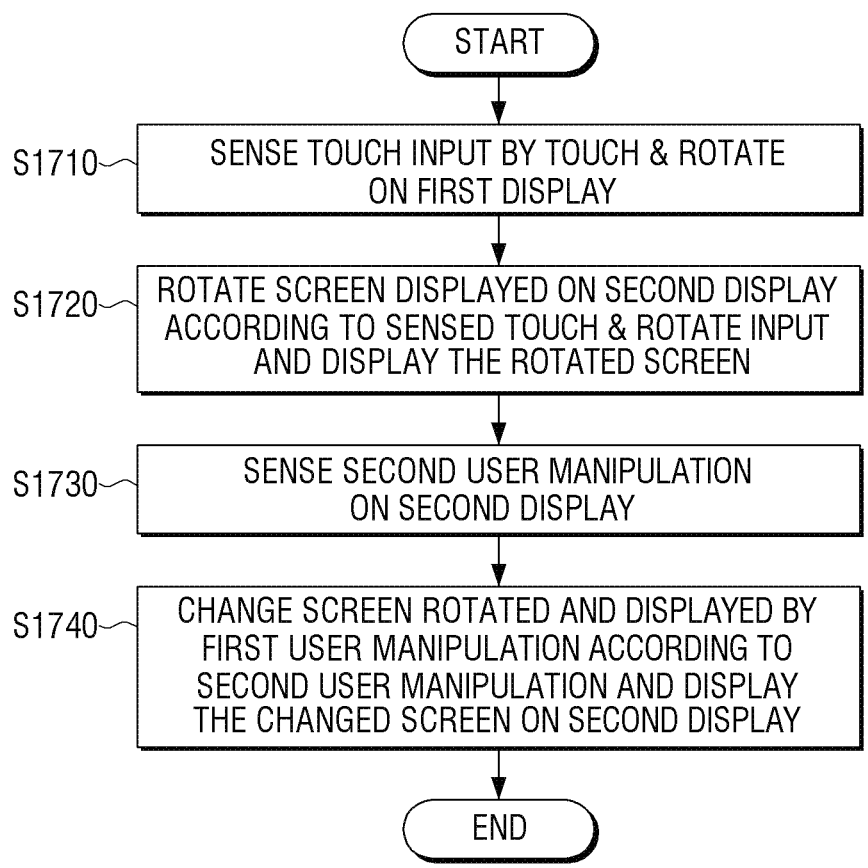
FIG. 17 is a flowchart illustrating another exemplary embodiment of the multi display apparatus of FIG. 12.

FIG. 17 is a flowchart specifically illustrating another exemplary embodiment of the multi display apparatus 100 of FIG. 12, and FIG. 18 is a reference view illustrating a display screen of an exemplary embodiment of the multi display apparatus 100 of FIG. 17.

With reference to FIG. 17, when the sensor 150 of the multi display apparatus 100 first senses the first user manipulation which performs a touch input by a touch & rotate on the first display 190a (operation S1710), the controller 130 rotates the screen displayed on the second display 190b according to the sensed first user manipulation and displays the rotated screen (operation S1720). More specifically, when the first user manipulation is a touch & rotate input, the controller 130 controls so that the screen displayed on the second display 190b is rotated and displayed according to the rotate direction and length based on the point of the touch. In addition, the controller 130 senses the second user manipulation such as performing a touch input by a tap by the second display 190b (operation S1730), and in this case, the controller 130 changes the rotated screen on the second display 190b according to the second user manipulation result and displays the changed screen (operation S1740).

In the example of FIG. 18, when a touch & rotate input is performed on the first display 190a, or when there is a rotate input based on the predetermined location at the touch point (views 1 and 3, respectively illustrating clockwise and counterclockwise rotation), the picture displayed on the second display 190b rotates corresponding to the rotation direction and length of the touch & rotate input based on the point corresponding to the touch point, and is displayed on the second display 190b (views 2 and 4, respectively corresponding to the rotation illustrated in views 1 and 3). Regarding the rotated and displayed picture, the user may perform a new input with an input pen 200 on the second display 190*b*, becoming able to perform operations such as zooming in on or modifying the picture. In this case, since the picture prior to rotation is displayed on the first display 190*a*, the user becomes able to perform the desired operation on the picture rotated and displayed on the second display 190*b* while checking the shape and color of the entire picture. Of course, the picture displayed on the first display 190*a* may also be rotated as well, depending on the configuration of the particular embodiment of the present general concept.

Hereinbelow is explanation of an exemplary embodiment of extracting contents from the first display 190*a* by the first user manipulation and displaying the extracted contents on the second display 190*b* by the second user manipulation, according to the present general concept.

Figure 19:
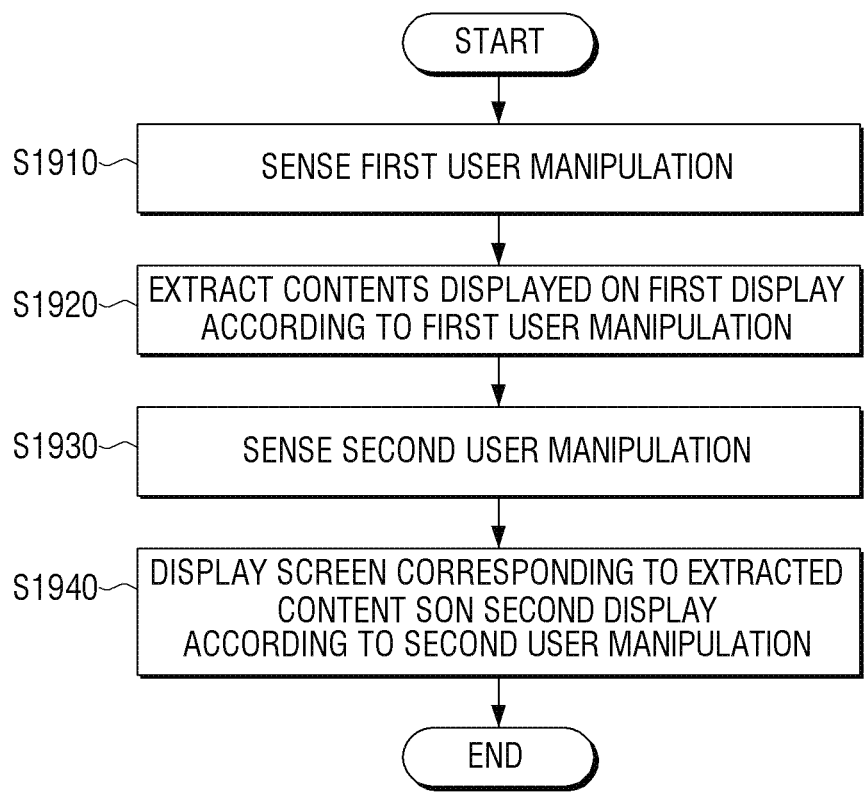
FIG. 19 is a flowchart illustrating an operation of a multi display apparatus according to an exemplary embodiment of the present general concept.

FIG. 19 is a flowchart illustrating operations of a multi display apparatus 100 according to an exemplary embodiment of the present general concept.

With reference to FIG. 19, the sensor 150 of the multi display apparatus 100 first senses the first user manipulation on the first display 190*a* (operation S1910). That is, the first display 190*a* displays the nonstructured first screen, and the sensor senses that there is a first user manipulation at a nondecisive location of the first screen.

The controller 130 extracts contents displayed on the first display 190*a* according to the sensed first user manipulation (operation S1920). In addition, the sensor 150 senses a second user manipulation on the second display 190*a* (operation S1930). That is, the second display 190*b* displays the nonstructured second screen, and the sensor 150 senses that there is a second user manipulation at a nondecisive location of the second screen. The controller 130 displays the screen on the second display 190*b* corresponding to the extracted contents from the first display 190*a* according to the second user manipulation (operation S1940).

Hereinbelow is specific explanation on the exemplary embodiment of the present general concept illustrated in FIG. 19.

Figure 20:
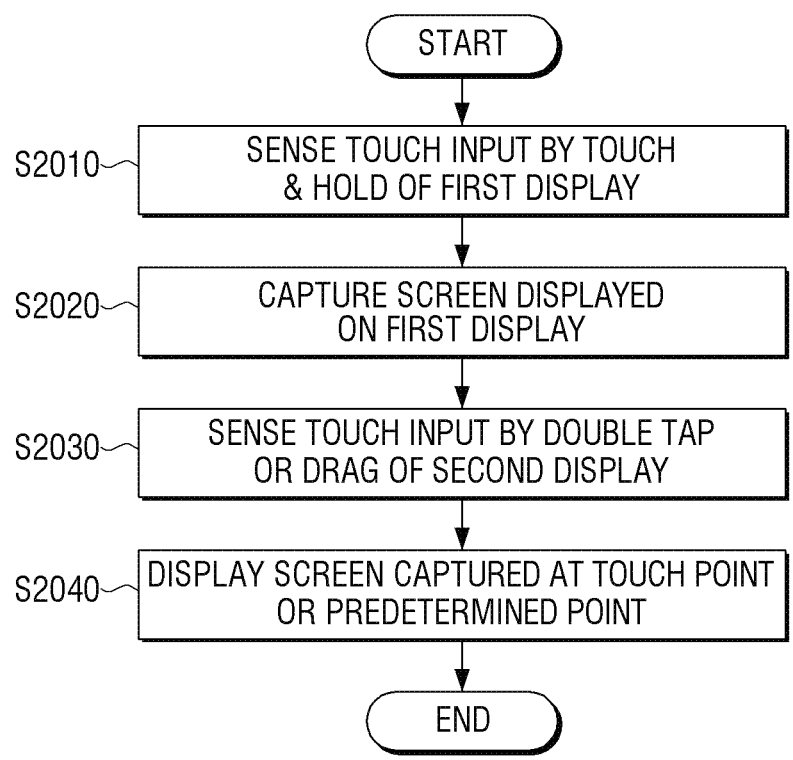
FIG. 20 is a flowchart illustrating an exemplary embodiment of the multi display apparatus of FIG. 19.

FIG. 20 is a flowchart illustrating an exemplary embodiment of the multi display apparatus 100 of FIG. 19, and FIGS. 21 to 23 are reference views of a display screen of an exemplary embodiment of the multi display apparatus 100 of FIG. 20.

With reference to FIG. 20, first the sensor 150 senses a first user manipulation where a touch input by a touch & hold, that is, an initial touch is made on the first display 190*a*, and the touch is maintained for a predetermined time (operation S2010).

When the first user manipulation is sensed, the controller 130 captures the screen displayed on the first display 190*a* (operation S2020).

After the first user manipulation is sensed, the sensor 150 senses a second user manipulation where a touch input by a double tap or drag on the second display 190*b* is made (operation S2030). Herein, a touch input by the double tap or drag may be made by an input pen 200.

In this case, the controller 130 displays the screen captured from the first display 190*a* or a screen related thereto on the second display 190*b* where a touch is made by the second user manipulation (operation S2040).

Figure 21:
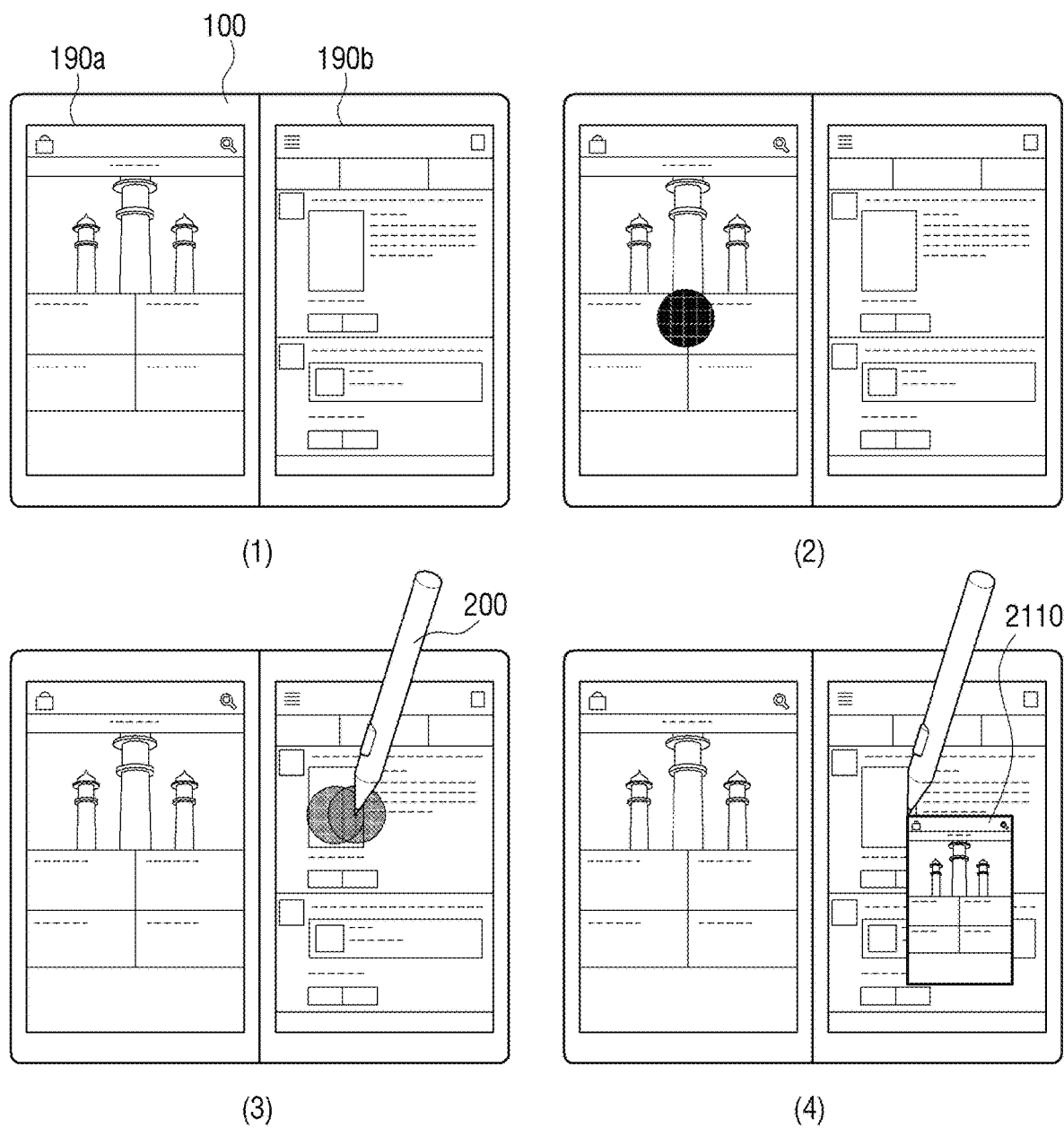
FIGS. 21 to 23 are views illustrating a display screen of an exemplary embodiment of the multi display apparatus of FIG. 20.

In the exemplary embodiment illustrated in FIG. 21, a screen is displayed on the first display 190*a* and a second screen is displayed on the second display 190*b* (view 1). When a point is touched on the first display 190*a* and a predetermined time has passed, such that a touch & hold input is detected, the screen of the first display 190*a* is captured (view 2). When a touch input by a double tap is made on the second display 190*b*, for example with the input pen 200 (view 3), a memo 2110 including an image of the screen captured at the touch point of the first display 190*a* is inserted and displayed on the second display 190*b* (view 4). The user may perform operations such as performing an input of writing, storing, or uploading necessary contents together with the captured screen in the memo 2110, for example with the input pen 200.

Figure 22:
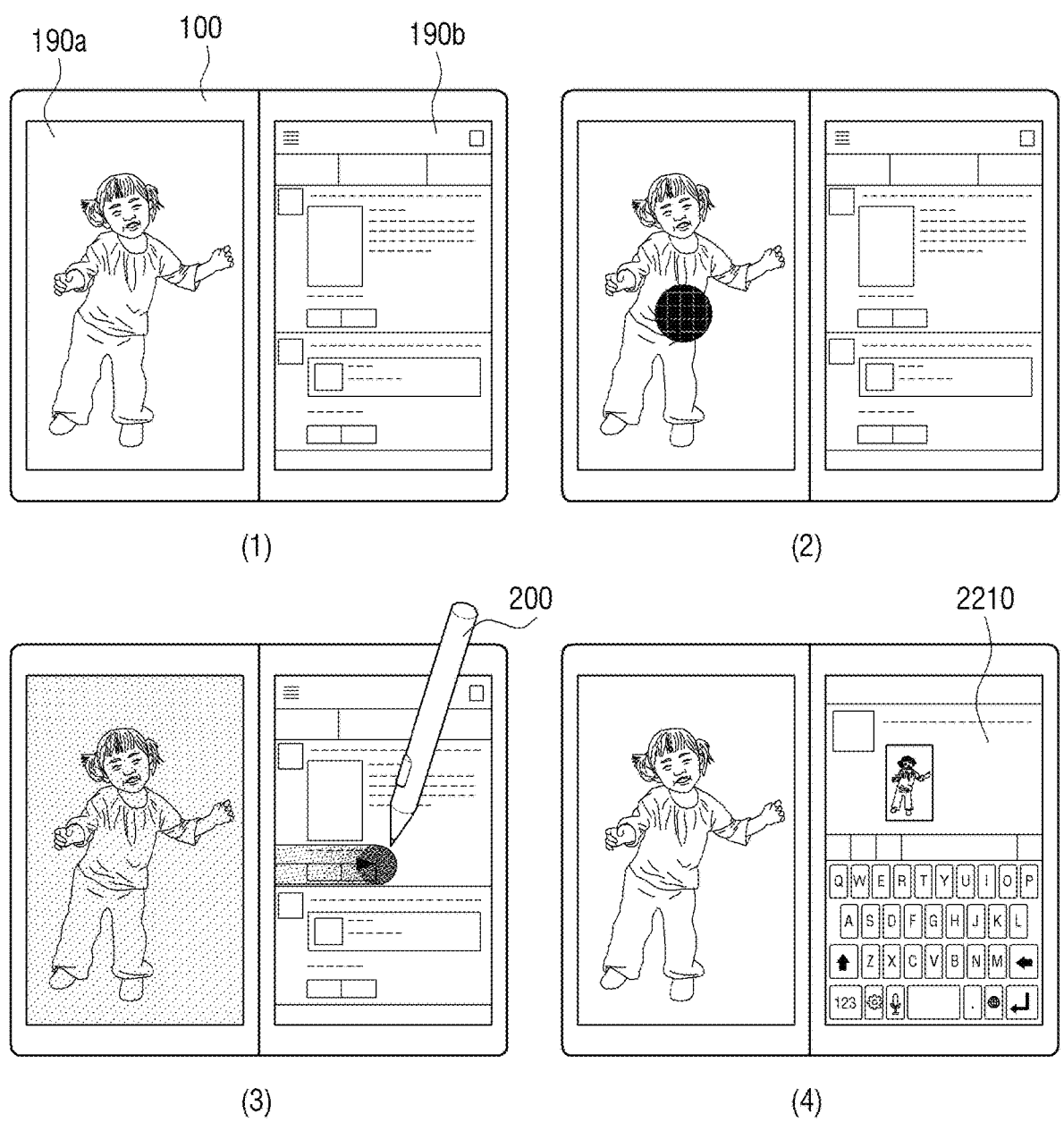

In the exemplary embodiment illustrated in FIG. 22, a screen is displayed on the first display 190*a* and a second screen is displayed on the second display 190*b* (view 1). When a point is touched on the first display 190*a* and a predetermined time has passed, such that a touch & hold input is detected (view 2), the screen of the first display 190*a* is captured. When a touch input by a drag is made in the second display 190*b* with the input pen 200 (view 3), the image regarding the screen captured at the touch point is uploaded to the message input window L 2210 (view 4).

Figure 23:
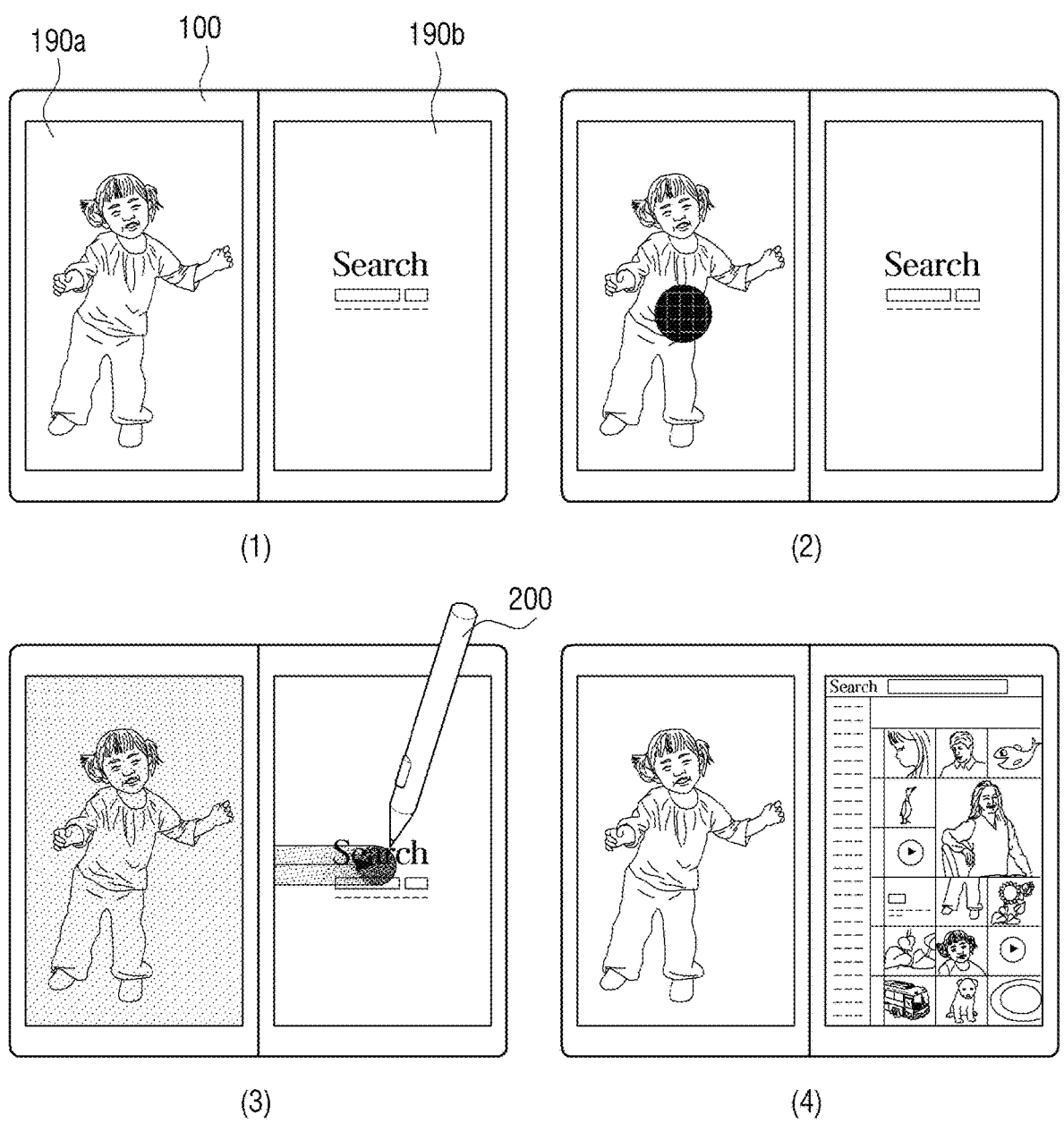

In the exemplary embodiment illustrated in FIG. 23, a screen is displayed on the first display 190*a* and a second screen is displayed on the second display 190*b* (view 1). When a point is touched in the first display 190*a* and a predetermined time has passed, such that a touch & hold input is detected (view 2), the screen of the first display 190*a* is captured. When a touch input by a drag is made on the second display 190*b* with an input pen 200 (view 3), an image similar to the captured image is searched and a search result screen is displayed on the second display 190*b* (view 4).

Figure 24:
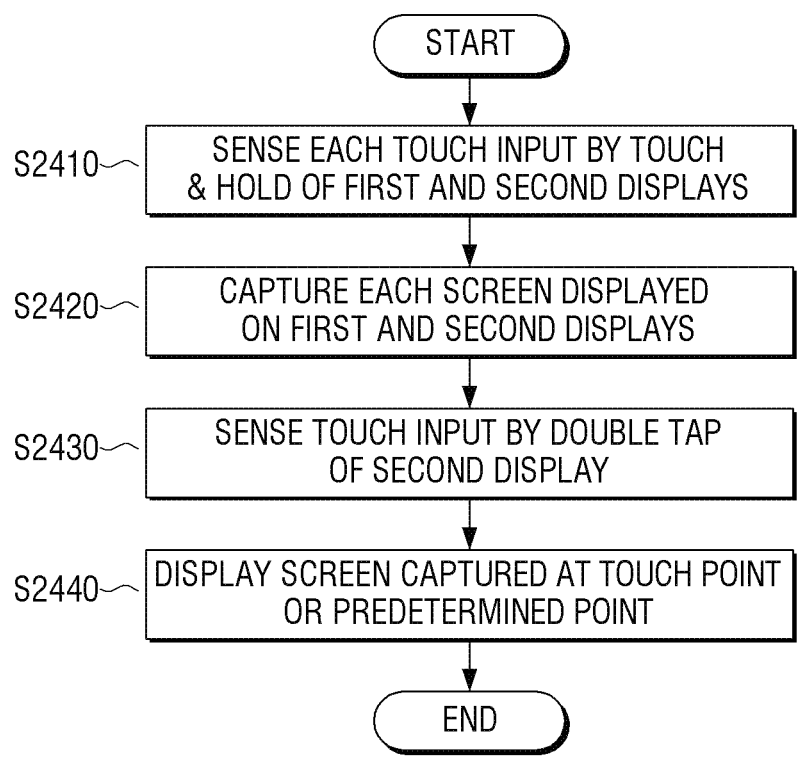
FIG. 24 is a flowchart illustrating a specific another exemplary embodiment of the multi display apparatus of FIG. 19.
Figure 25:
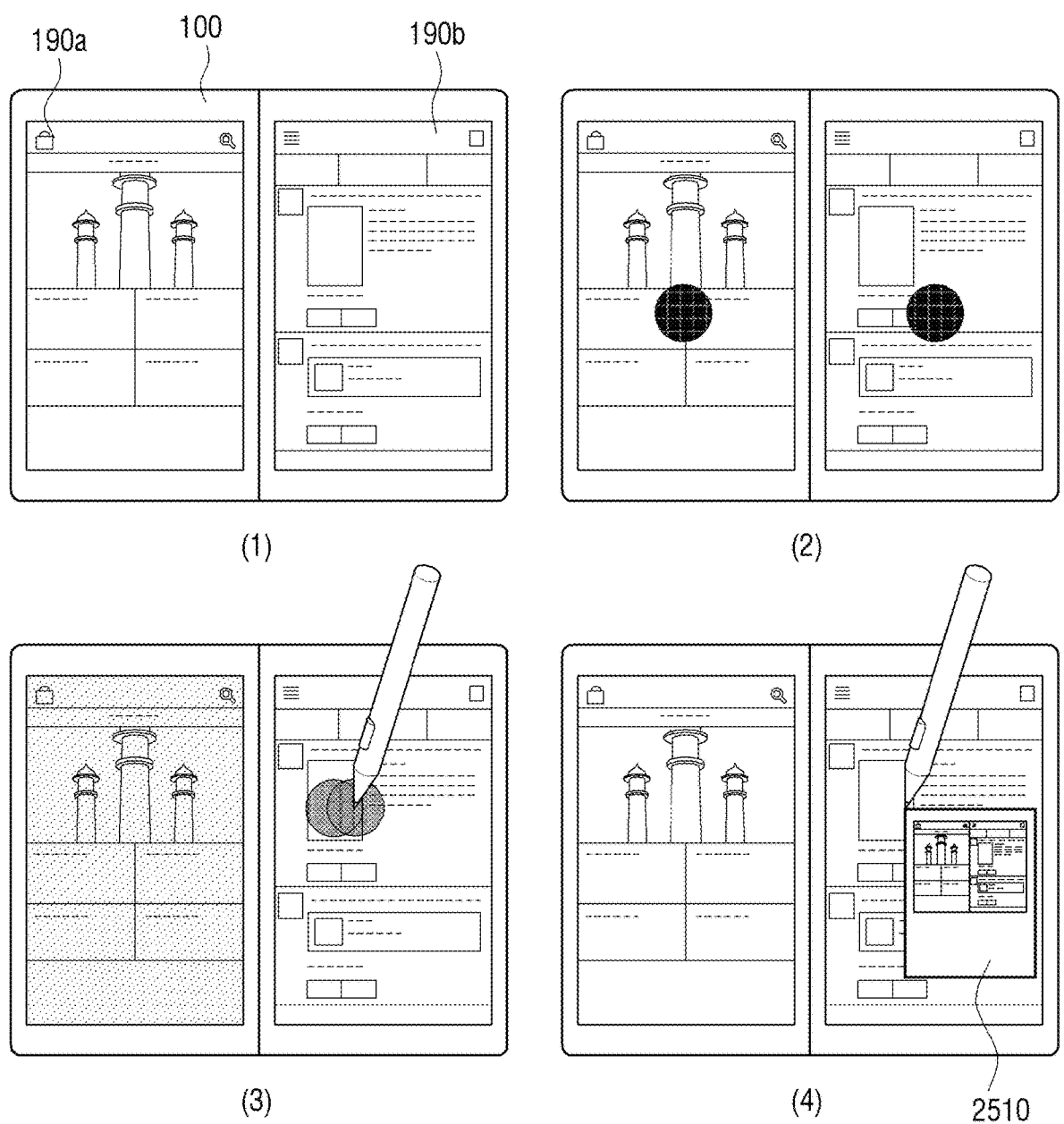
FIG. 25 is a reference view illustrating a display screen of an exemplary embodiment of the multi display apparatus of FIG. 24.

FIG. 24 is a flowchart specifically illustrating another exemplary embodiment of the multi display apparatus 100 of FIG. 19, and FIG. 25 is a reference view illustrating a display screen of an exemplary embodiment of the multi display apparatus 100 of FIG. 24. More specifically, FIGS. 24 and 25 illustrate an exemplary embodiment of the present general concept in which the first user manipulation on the first display 190*a* and the second user manipulation on the second display 190*b* are followed by a third user manipulation.

With reference to FIG. 24, first the sensor 150 senses each of a first user manipulation and a second user manipulation. Each of the first and second user manipulations may correspond to a touch input on the first display 190*a* and the second display 190*b* by a touch & hold, that is, where an initial touch is made on each of the first display 190*a* and the second display 190*b*, and each touch is maintained for a predetermined time (operation S2410).

When the first and second user manipulations are sensed, the controller 130 captures each screen displayed on the first display 190*a* and the second display 190*b* (operation S2420). When the first and second user manipulations are sensed, the controller 130 may perform a capture operation corresponding to each of the first and second user manipulations independently. In this case, the second display 190*b* may display the nonstructured second screen, and the second user manipulation may be made in a nondecisive location of the second screen. Herein, the screens displayed in the first display 190*a* and the second display 190*b* are both captured as part of operation S2420.

After the first and second user manipulations are sensed, the sensor 150 senses a third user manipulation where a touch input by a double tap regarding the second display 190*b* is made (operation S2430). Herein, a touch input by the double tap or drag may be made by the input pen 200.

When there exists a third user manipulation unlike in the aforementioned exemplary embodiment of the present general concept, the controller 130 displays the two captured screens on a point on the second display 190*b* where the third user manipulation is made (operation S2440).

In the exemplary embodiment illustrated in FIG. 25, a screen is displayed on the first display 190*a* and a second screen is displayed on the second display 190*b* (view 1). When a point is touched on the first display 190*a* and a predetermined time passed, such that a touch & hold input is detected, the screen of the first display 190*a* is captured. Independently from this, when a certain point is touched in the second display 190*b* and a predetermined time passed, the screen of the second display 190*b* is captured (view 2). When a touch input by a double tap is made in the second display 190*b* with the input pen 200 (view 3), a memo 2510 is inserted at the touch point, including an image corresponding to each screen captured (view 4). The user may perform operations of performing inputting necessary contents together with the capture screen, or storing or uploading the contents to a sns (Social Network Service) together with the capture screen with the input pen 200.

When there is a third user manipulation after the aforementioned first user manipulation, the third user manipulation may be differentiated from the second user manipulation. That is, since there is a possibility that a touch corresponding to the second user manipulation may be determined as the third user manipulation, when a touch input regarding the second display 190*b* is maintained for a predetermined time, the touch input may be determined as the touch for the second user manipulation, and when the touch input ends before the predetermined time passes, the touch input may be determined as an input for the third user manipulation.

When the first user manipulation and the second user manipulation are input at the same time, unlike in the exemplary embodiment of the present general concept illustrated in FIG. 25, the user manipulations may be recognized as a single user manipulation. That is, when a touch input by a touch & hold is made on the second display 190*b* at the same time as the touch & hold input is made on the first display 190*a*, all the display screens having a touch & hold by the user manipulation may be captured and the aforementioned operations may be performed.

Meanwhile, in the aforementioned exemplary embodiments of the present general concept illustrated in FIGS. 2 to 25, the controller 130 may connect the sensed first user manipulation and the sensed second user manipulation and recognize them as one user gesture, and may display the execution screen corresponding to the user gesture on at least one of the first display 190*a* and the second display 190*b*.

That is, in this case, the controller 130 senses the first user manipulation and the second user manipulation, but the controller 130 recognizes these as a single manipulation and performs operations corresponding to this single manipulation, instead of performing operations corresponding to each of the first and second manipulations. In addition, the controller 130 may perform each of the operations corresponding to the separate first and second user manipulations when recognizing the first and second user manipulations as a single manipulation.

For example, in an exemplary embodiment of the present general concept where the first user manipulation changes the functions corresponding to the second user manipulation, the controller 130 may not change the functions corresponding to the second user manipulation solely in response to the first user manipulation. Instead, when there is a second user manipulation after the first user manipulation, the controller 130 may then change the functions corresponding to the second manipulation, and operations according to the changed functions.

As such, the controller 130 may recognize one user manipulation according to the result of combining the first user manipulation, second user manipulation, and third user manipulation, and may control to perform operations corresponding to the user manipulation according to the combination results.

Hereinbelow is explanation on the detailed configuration of the multi display apparatus 100 which may be embodied differently according to various exemplary embodiments of the present general concept.

Figure 26:
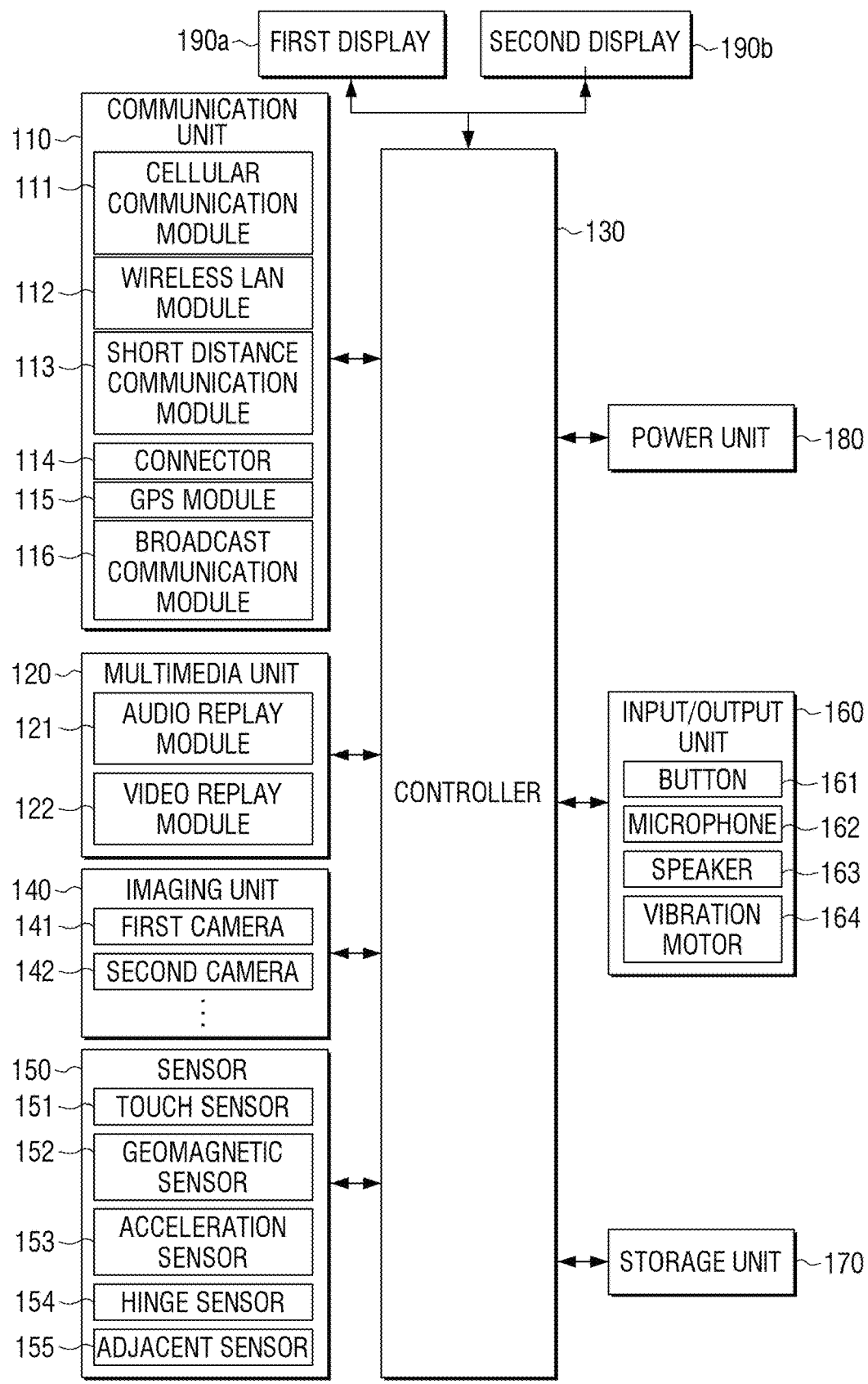
FIG. 26 is a block diagram illustrating a configuration of a multi display apparatus according to an exemplary embodiment of the present general concept.

FIG. 26 is a block diagram illustrating a configuration of a multi display apparatus 100 according an exemplary embodiment of the present general concept.

With reference to FIG. 26, the multi display apparatus 100 of the exemplary embodiment of the present general concept includes a communication unit 110, multimedia unit 120, controller 130, imaging unit 140, sensor 150, inputter/outputter 160, storage unit 170, power unit 180, the first display 190*a*, and the second display 190*b*.

The communication unit 110 is configured to transmit and receive information to and from an external apparatus (not illustrated) using various wired/wireless communication methods. Herein, the external apparatus may include at least one of another multi display apparatus, mobile phone, smart phone, tablet PC (Personal Computer), computer server, and digital TV. These apparatuses may be connected to the multi display apparatus 100 through a communication network (not illustrated).

The communication unit 110 may include a connector 114 which includes at least one of wireless communication modules such as for example a cellular communication module 111, wireless LAN module 112, short distance communication module 113, GPS communication module 115, and broadcast communication module 116. The communication unit may also include wired communication modules (not illustrated), such as for example an HDMI (High-Definition Multimedia Interface), USB (Universal Serial Bus), IEEE (Institute of Electrical and Electronics Engineers) 1394, and so on.

The cellular communication module 111 uses wireless access technology according to a cellular communication protocol by a control of the controller 130 so that the multi display apparatus 100 may be connected to an external apparatus (not illustrated), such as a base station of the cellular system, through at least one or a plurality of antennas (not illustrated).

In addition, the cellular communication module 111 transmits/receives wireless signals containing voice calls, video calls, Short Messaging Services (SMS), messages or Multimedia Messaging Service (MMS) messages with compatible apparatuses such as a mobile phone having telephone numbers input into the multi display apparatus 100, a smart phone, a tablet PC, or other apparatuses.

The wireless LAN module 112 is configured to access a wireless AP (access point, not illustrated) existing within a predetermined range and of be connected to the internet according to the control of the controller 130. The wireless LAN module 112 may support for example the wireless LAN standard (IEEE802.11x) of the IEEE.

The short distance communication module 113 is configured to perform a short distance communication wirelessly between the multi display apparatus 100 and the external apparatus according to the control of the controller 130. The short distance communication module 113 may include for example at least one of a Bluetooth module, an IrDA (infrared data association) module, a NFC (Near Field Communication) module, a Wi-Fi module, and a Zigbee module.

As such, the communication unit 110 may be embodied by the aforementioned various short distance communication methods. Other communication technologies not mentioned herein may be adopted when necessary, according to the configuration of the particular embodiment of the present general concept.

The connector 114 is configured to provide an interface with various apparatuses such as for example USB 2.0, USB 3.0, HDMI, IEEE 1394, and so on.

The connector 114 may be used as an interface to connect the multi display apparatus 100 and the external apparatus or a power source (not illustrated). By the control of the controller 130, data stored in the storage unit 170 of the multi display apparatus 100 may be transmitted to an external apparatus (not illustrated) or data may be received from the external apparatus. Through for example a wired cable connected to the connector 114, power may be input from a power source (not illustrated) or may be charged in a battery (not illustrated).

The GPS module 115 may receive electric waves from a plurality of GPS satellites (not illustrated) in the Earth orbit, and may calculate the location of the multi display apparatus 100 using Time of Arrival and GPS parameters from the GPS satellites (not illustrated) to the multi display apparatus 100.

The broadcast communication module 116 may receive broadcast signals (for example, TV broadcast signals, radio broadcast signals or data broadcast signals) and broadcast additional information (for example, EPS (Electric Program Guide) or ESG (Electric Service Guide)) transmitted from a broadcasting station through broadcast communication antennas (not illustrated) according to a control by the controller 130.

The multimedia unit 120 is a configurative element to play video contents, audio contents, and other various multimedia contents. For the purposes of this application, "playing" contents denotes executing and displaying the contents for a user of the multi display apparatus 100. It may also denote playing or replaying the contents. The multimedia unit 120 processes multimedia contents using a parser or codec etc. to play contents. The multimedia unit 120 may include for example an audio module 121 and a video module 122.

The audio module 121 may play digital audio files (for example, files having mp3, wma, ogg or way as file extensions) stored or received according to the control of the controller 130. The video module 123 may play digital video files (for example, files having mpeg, mpg, mp4, avi, mov, or mkv as file extensions) stored or received according to the control of the controller 130.

The video module 122 supports codecs of various forms to play the digital video files. That is, the video module 122 plays a video file by the codec prestored in a format suitable to the format of the video file to be played. In addition, the audio module 122 or video module 123 of the multimedia unit 120 may be included in the controller 130.

Figure 27:
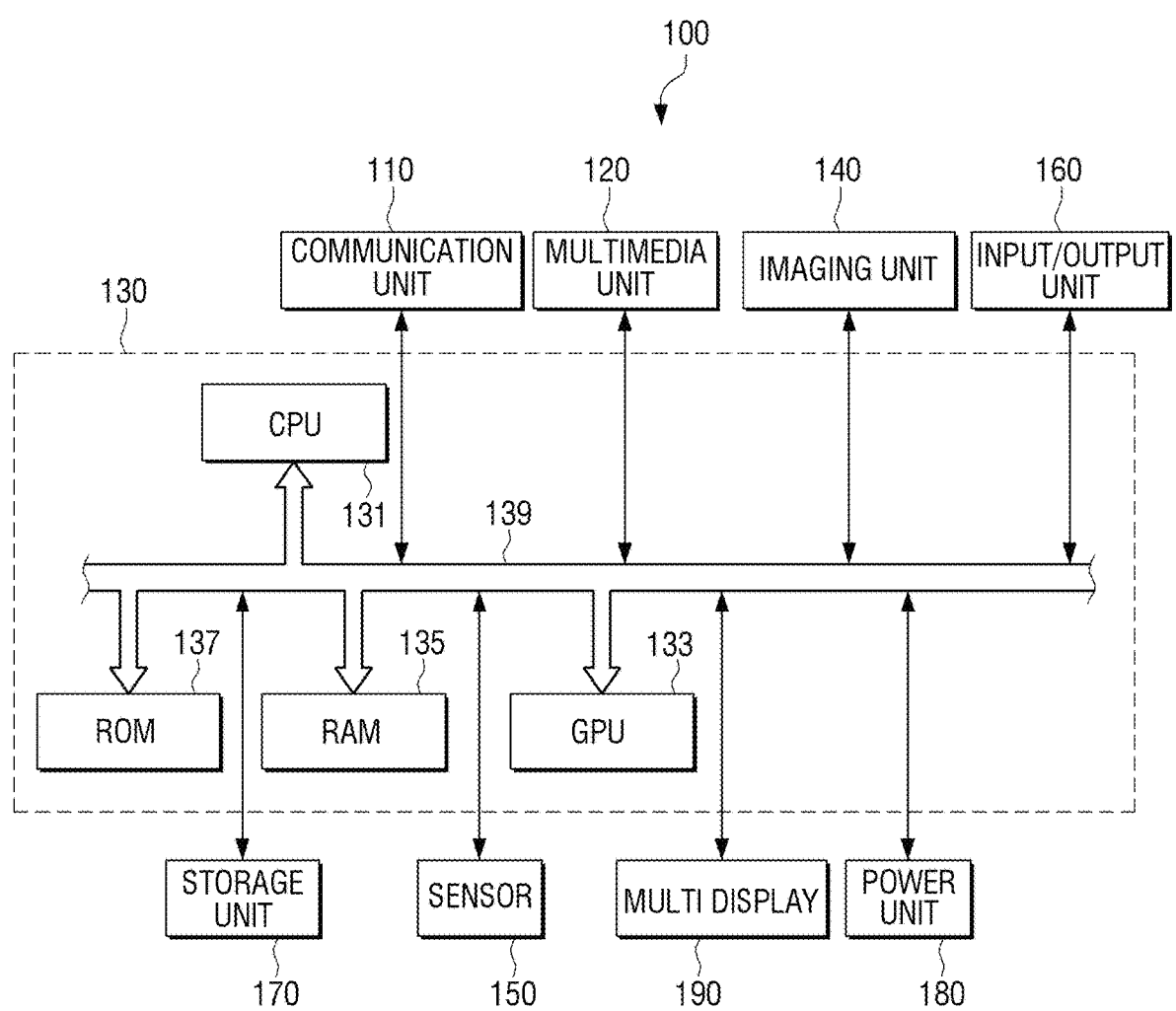
FIG. 27 is a block diagram illustrating a hardware configuration of a controller according to an exemplary embodiment of the present general concept.

The controller 130 is configured to control the communication unit 110, multimedia unit 120, imaging unit 140, sensor 150, inputter/outputter 160, storage unit 170, power unit 180, first display 190a, and second display 190b. As illustrated in FIG. 27, the controller 130 may include a CPU (Central Processing Unit) 131 configured to provide a clock and to transmit a control signal, a memory such as a RAM (Random Access Memory) 135 and ROM (Read Only Memory) 137 configured to temporarily or semi-permanently store a process, a GPU (Graphics Processing Unit) 133 for graphic processing, and a system bus 139 configured to transmit graphic data between the memory, CPU 131, and GPU 133. In addition, the controller 130 also includes an operating system (OS) 420 (illustrated in FIG. 28) to drive the hardware configuration, and an application configured to provide the user interface on the OS 420 and delivering it to the framework. These components of the controller 130 may be explained in further detail hereinbelow.

The imaging unit 140 may include at least one of the first camera 141 and second camera 142, as illustrated in FIG. 26. Although FIG. 26 only illustrates the first camera 141 and the second camera 142, more cameras may be added according to exemplary embodiments of the present general concept.

Each camera includes a shutter (not illustrated), lens (not illustrated), aperture (not illustrated) and CCD (Charge Coupled Device) image sensor (not illustrated) and ADC (Analog/Digital Converter). The lens receives light from an external source (not illustrated) and processes the images. The shutter is an apparatus configured to adjust the volume of light entering the camera, together with the aperture. The aperture adjusts the quantity of light (light quantity) entering the camera according to a degree by which the aperture is opened or closed. The CCD image sensor accumulates the quantity of light entering through the lens, obtains an image, and outputs the image in accordance with a vertical sync signal according to the accumulated quantity of light. The CCD image sensor obtains the image by converting the received light into electrical signals. In order to obtain a color image using the CCD image sensor, a color filter is needed, and a filter called CFA (Color Filter Array) may be adopted. The CFA passes only light that represents just one color per each pixel, has a regular arrangement structure, and has various forms according to the arrangement structure. The ADC converts the analog image signals output from the CCD image sensor into digital signals. This is a mere example, and configurations of each camera may be changed in various ways. For example, each camera may photograph an image using a CMOS (Complementary Metal Oxide Semiconductor) image sensor instead of a CCD image sensor.

The first camera 141 and second camera 142 may be provided in a housing of the multi display apparatus 100 or may be connected to the multi display apparatus 100 using additional connection means. At least one of the first camera 141 and second camera 142 may include a subsidiary light source (for example, a flash, not illustrated) which provides a quantity of light needed to properly obtain an image.

In an exemplary embodiment of the present general concept, the first camera 141 may be arranged on a front surface of the multi display apparatus 100, and the second camera 142 may be arranged in the rear surface of the multi display apparatus 100. In another exemplary embodiment of the present general concept, the first camera 141 and second camera 142 may be arranged adjacent to each other (for example, so that the distance between the first camera 141 and the second camera 142 is bigger than 1 cm but smaller than 8 cm), and photograph 3-dimensional still images or 3-dimensional videos. In another exemplary embodiment of the present general concept, the first camera 141 may be arranged in the first display 190a, and the second camera 142 may be arranged in the second display 190b.

The imaging unit 140 may detect a movement or shape of a user object 50 through at least one of the first camera 141 and second camera 142, and transmit the detected movement or shape to the controller 130 as an input to execute or control an application. In an exemplary embodiment of the present general concept, movement of the user object 50 denotes the movement of the user's hand sensed through the first camera 141 or second camera 142. The shape of the user object 50 may denote for example the user's facial shape or orientation of fingers of their hand, sensed through the first camera 141 or second camera 142.

In another exemplary embodiment, the multi display apparatus 100 may detect the user's movement using another means such as an infrared sensor (not illustrated) and may control or execute the application in response to the detected movement.

The sensor 150 is a configurative element to sense various changes of state, such as for example the user's touch on the multi display apparatus 100, the user's movement, or movement of the multi display apparatus 100 itself. In the aforementioned exemplary embodiment of the present general concept, a touch sensor 151 or proximity sensor 155 was explained as an example of the sensor 150. Besides the aforementioned exemplary embodiment of the present general concept, the sensor 150 may include at least one of a touch sensor 151, a geomagnetic sensor 152, an acceleration sensor 153, a hinge sensor 154 and a proximity sensor 155.

The touch sensor 151 is a sensor which may sense contact of the user object 50 regarding the multi display (dual display) 190 of the multi display apparatus 100. That is, the touch sensor 151 denotes a sensor which may sense an input of touching the first display 190a or the second display 190b and selecting an object displayed on the touched display. The touch sensor 151 may be classified as an electrostatic type and a piezoelectric type depending on the method of sensing the touch of the user. The touch sensor 151 according to an exemplary embodiment of the present general concept may be embodied as any one of the two types. The touch sensor 151 may be included in the multi display 190 together with a display panel 235 (illustrated in FIG. 29).

The geomagnetic sensor 152 is a sensor which may detect the flow of a magnetic field and detect the azimuth of the magnetic field. The geomagnetic sensor 152 may detect the azimuth coordinates of the multi display apparatus 100, and may detect the direction of the multi display apparatus 100 when it is placed based on the azimuth coordinates. The detected direction may be recognized by the control input corresponding thereto and the controller 130 may perform the corresponding output.

The acceleration sensor 153 is a sensor used to detect the acceleration of a moving object (dynamic acceleration), but is also utilized to detect the acceleration due to gravity as well. The acceleration sensor 153 may set virtual x, y, z axes on the multi display apparatus 100, detect the acceleration of the multi display apparatus 100, and detect the value of acceleration due to gravity, which changes according to an inclined degree of each axis.

The hinge sensor 156 may detect angles or movement of the hinge 185 (illustrated in FIG. 1). The proximity sensor 155 may detect whether or not a user object 50 approaches the multi display apparatus 100. The proximity sensor 155 will be explained in further detail below.

Although not illustrated in FIG. 26, the sensor 150 of the multi display apparatus 100 may further include at least one of a gravity sensor which may detect in which direction gravity acts, a gyro sensor which may recognize a total of 6 axes due to rotations applied to the acceleration sensor 153, an orientation sensor which may automatically sense a width and length of contents, such as an image, and align the sensed width and length, an illuminance sensor which may detect the quantity of light surrounding the multi display apparatus 100, a height measuring sensor which may measure the air pressure, an RGB sensor which may detect the color of objects, a distance measurement sensor which may measure the distance using an ultrasound wave or infrared ray, and a hall sensor which uses changes of voltage according to the intensity of the magnetic field.

The sensor 150 may detect the state of each of the sensors described above, generate a signal corresponding to the detection, and transmit the generated signal to the controller 130. The sensors of the sensor 150 described above may be added or deleted according to the performance and specific configuration of the multi display apparatus 100.

The inputter/outputter 160 is a configurative element to perform an input/output using a screen or other external connection ports. More specifically, the inputter/outputter 160 may receive an input signal transmitted from an input means (not illustrated) such as a mouse, keyboard, joystick connected to the multi display apparatus 100, or from a wireless input means (not illustrated) such as a remote control, etc., and transmit the received input signal to the controller 130. Otherwise, the inputter/outputter 160 may output various signals or data generated by the controller 130 to the external apparatus. The inputter/outputter unit 160 may include a button 161, a microphone 162, a speaker 163 and a vibration motor 164.

The at least one button 161 may be formed in a push type or touch type in a front surface, lateral service, or rear surface of the housing of the display apparatus 100, and may include at least one of the power/lock button, volume adjusting button, menu button, home button, back button and search button.

When the button 161 is pressed, for example by the user, a corresponding control command is generated and transmitted to the controller 130, and the controller 130 controls operations of the multi display apparatus 100 according to the corresponding control command.

The microphone 162 receives voice or sound according to the control of the controller 130 and generates a corresponding electrical signal.

The speaker 163 may output sound corresponding to various signals (for example, a wireless signal, a broadcast signal, a digital audio file, a digital video file, photography, etc.) of the cellular communication module 111, wireless LAN module 112, short distance communication module 113, multimedia unit 120 or imaging unit 140 to an outside of the multi display apparatus 100.

The speaker 163 may output sound (for example, button manipulating sound or ring back tone corresponding to telephone calls) corresponding to the functions performed by the multi display apparatus 100. The speaker 163 may be formed as a single speaker or a plurality of speakers, in an appropriate location or locations of the housing of the multi display apparatus 100. For example, the speaker 164 may be configured to include an inner speaker module (not illustrated) arranged in a location suitable to approach the user's ear, and an external speaker module (not illustrated) having a higher output suitable to be used in playing audio/video files or when viewing broadcast programs, and may be arranged in a suitable location of the housing of the multi display apparatus 100.

The vibration motor 164 may convert electrical signals into mechanical vibration according to a control of the controller 130. For example, in the case of the multi display apparatus 100 in a vibration mode, when a voice call is received from another apparatus (not illustrated), the vibration motor 164 operates. The vibration motor 164 may be formed as a single motor or a plurality of motors within the housing of the multi display apparatus 100. The vibration motor 164 may operate in response to the user's touch gesture sensed on the first and second display 190a, 190b, and consecutive movements of the touch sensed on the first and second display 190a, 190b.

The storage unit 170 is configured to store data.

First of all, the storage unit 170 stores an operating system program to control an operation of the multi display apparatus 100. When the multi display apparatus 100 is turned on, the stored operating system is read in the storage unit 170 and compiled to drive each configuration of the multi display apparatus 100.

Secondly, the storage unit 170 is managed by the operating system and uses the resources of the operating system to perform operations of the multi display apparatus 100, and stores an application program providing the user interface. The application program is read in the storage unit 170 by the operating system by the user's execution command, and is transferred to the controller 130 in an executable state to perform various operations.

Thirdly, the storage unit 170 stores various multimedia data processed by the controller 130, contents data, and data received from external sources. That is, the storage unit 170 may store signals, information, or data being input/output correspondingly to the operations of the cellular communication module 111, wireless LAN module 112, short distance communication module 113, connector 114, GPS module 115, multimedia unit 120, imaging unit 140, sensor 150, inputter/outputter 160, first display 190a, and second display 190b according to the control of the controller 130.

The storage unit 170 may be embodied as at least one of a memory card (for example, SD card, memory stick), nonvolatile memory, volatile memory, hard disk drive (HDD) or solid state drive (SSD) which are detachable/mountable to a ROM, RAM or multimedia apparatus 100.

The power unit 180 supplies power used in the multimedia apparatus 100. The power unit 180 may be embodied as a chargeable battery, and may further include a voltage converter which converts external supply power and supplies the converted external supply power to a chargeable battery (not illustrated).

The power unit 180 may supply power to the multi display apparatus 100 in various modes such as a maximum performance mode, general mode, saving mode, waiting mode etc. according to the power management control of the controller 130.

The first display 190a and the second display 190b are included in the sensor 150 as aforementioned, and output images stored in a frame buffer (described below). The first display 190a and the second display 190b may display multimedia contents, images, videos, and texts etc. by the control of the controller 130.

The first display 190a and the second display 190b may be physically separated from each other. The screens displayed on the first display 190a and the second display 190b may be controlled independently from each other. For example, the resolution of the first display 190a and the resolution of the second display 190b may be set independently from each other. In addition, expansion, rotation, screen movement, screen division etc. of the screens displayed on the first display 190a and the second display 190b may be executed independently from each other.

In addition, the first display 190a and the second display 190b may display a single screen using a virtual integrated frame buffer.

The first and second display 190a, 190b are display apparatuses which display various applications (for example, telephone calls, data transmission, broadcasting, camera operation, etc.) which may be executed by the controller 130 and which provide user interfaces configured to be adaptable thereto. The first display 190a and the second display 190b may include the aforementioned touch sensor 151, in which case at least one touch gesture may be input through a user object 50 such as for example the user's body (for example fingers including the thumb) or sensible input means (for example, stylus pen)

Such a user interface may include a predetermined touch area, soft key and soft menu. The first and second display 190a, 190b may transmit electronic signals corresponding to at least one touch gesture input through the user interface to the first display 190a and the second display 190b through an LCD controller (not illustrated). In addition, the first display 190a and the second display 190b may sense the consecutive movement of the touch, and transmit electronic signals corresponding to the consecutive or nonconsecutive movements of the touch to the LCD controller. As aforementioned, the touch sensor 151 may be embodied with a resistive method, capacitive method, infrared method, or acoustic wave method.

The first display 190a and the second display 190b may convert the sensed signals regarding the user operations sensed through the touch sensor 151 into digital signals (for example, X and Y coordinates), and transmit the converted digital signals to the controller 130. The controller 130 uses the received digital signals to perform control operations corresponding to the user operation input through the first display 190a and the second display 190b. For example, the controller 130 may have a soft key displayed on the first display 190a and/or the second display 190b, and may execute the application corresponding to the soft key in response to the user operation.

The aforementioned user gesture is not limited to direct contact between the first display 190a and the second display 190b, and the user object 50 (including the user's body and other touchable input means), but includes methods by noncontact as well. The sensitivity of the user operations detectable in the first display 190a and the second display 190b may be changed according to the performance and structure of the multi display apparatus 100.

The multi display apparatus 100 is an apparatus configured to execute applications, widgets and functions which may be stored in the storage unit 170 and may be executed by the controller 130 through a touch screen 192. A general touch screen 192 may display applications, widgets, functions and graphic objects (that is soft keys or shortcut keys) that correspond to those groups through a home screen or an application menu, and the multi display apparatus 100 executes the corresponding applications, widgets or functions in response to the detected user's touch gesture on each displayed graphic object.

Herein, a widget denotes a mini application which may be downloaded by the user and then used, or may be generated by the user, for example, a weather widget, stock widget, calculator widget, alarm clock widget, dictionary widget etc. A shortcut icon to execute a widget may provide simple dictionary information through the widget application corresponding to the shortcut icon to execute the widget. For example, the icon of the weather widget simply provides the current temperature and weather symbols, and the widget application executed through a touch of the icon provides more information such as weather per period/region. In the present application, an application includes a widget based application and a non-widget based application.

The first body 2 including the first display 190a and the second body 4 including the second display 190b may be connected to each other by a connecting portion such as the hinge 185, and the first body 2 and the second body 4 may be folded in or folded out by a certain angle around the hinge 185.

The connecting portion may be embodied as a part of a flexible connecting portion (not illustrated), or part of a flexible touch screen (not illustrated), besides the hinge 185.

Hereinbelow is detailed explanation on the configuration of the hardware of the aforementioned controller 130, with reference to FIG. 27.

FIG. 27 is a block diagram illustrating a hardware configuration of the controller 130.

With reference to FIG. 27, the controller 130 of the multi display apparatus 100 may include a CPU 131, a GPU 133, a RAM 135, a ROM 137 and a system bus 139 in a hardware perspective, and provides an operating system (OS) to drive the hardware configuration in a software (program) perspective, as well as an application to provide the user interface on the operating system and delivering it to the framework. However, operating systems, frameworks, and applications will be explained in further detail below.

The CPU 131 controls functions of various blocks while performing data communication with each block through the system bus 139, collects the result of the control, and transmits the control signal to various peripheral apparatuses connected to the controller 130 based on the collected result, to perform the function of controlling the peripheral apparatuses. The "peripheral apparatuses" include for example the communication unit 110, the multimedia unit 120, the imaging unit 140, the sensor 150, the inputter/outputter 160, the storage unit 170, and the power unit 180, as illustrated for example in FIG. 26. In addition, the CPU 131 controls the calculator to read the instruction and argument per each process in the RAM 135, and to perform calculation.

First, the CPU 131 performs a booting using the booting information prestored in the ROM 137. That is, when the power of the system is turned on, the CPU 131 reads the command to operate each peripheral apparatus from the ROM 137, and transmits the control signal to each peripheral apparatus according to the command. In addition, the CPU 131 reads the data stored in the storage unit 170 to the RAM 135, and transmits data which need graphic processing from among the data stored in the RAM 135 to the GPU 133. The CPU 131 receives the data which has been graphically processed by the GPU 133, and transmits the data to the LCD controller (not illustrated) connected to the system bus 139 to display the image on the multi display 190.

Herein, the CPU 131 temporarily stores the image data processed by the GPU 133 in the virtual frame buffer allocated to the predetermined area of the RAM 135. The CPU 131 allocates the area of the virtual frame buffer so as to support the maximum resolution (for example 1024*600) of the multi display 190. When there are two displays in the multi display 190, the virtual frame buffer area is allocated in a size of 1024*1200.

The CPU 131 inputs the data temporarily stored in the virtual frame butter to the GPU 133 and performs digital signal processing.

The GPU 133 performs graphic processing on the input data under the control of the CPU 131. More specifically, the GPU 133 may generate a screen including various objects such as an icon, an image, text, etc. using a calculator (not illustrated) and renderer (not illustrated). The calculator calculates the characteristics values such as coordinate values, shapes, sizes, and colors etc. where each object is to be displayed according to the layout of the screen. The rendering generates screens of various layouts including the object based on the characteristics values calculated in the calculator. The screen generated in the rendering is transmitted to the first display 190a and/or the second display 190b through the bus 139, and is displayed within a display area of the first display 190a and/or the second display 190b, or is stored in the storage unit 170.

The CPU 131 may control to display the data graphic processed by the GPU 133 through at least one of the first display 190a and the second display 190b, or may input the processed data into a display controller (not illustrated).

The GPU 133 may include a decoder, renderer, and scaler, etc. (not illustrated). Accordingly, the stored contents are decoded, the decoded contents data is rendered to configure a frame, and the size of the configured frame may be scaled to be suitable to the display size by the control of the display controller. If a screen is displayed on one of the first display 190a and the second display 190b, the scaling is made to suit the corresponding display size, and if the screen is displayed in both of the first display 190a and the second display 190b, the scaling is made to suit the combination of the two display sizes. The GPU 133 provides the processed frame to the display and displays the provided processed frame.

The controller 130 may further include an audio processor, an interface, etc. (not illustrated), besides the above. The interface is a configurative element to interface with the surrounding configurative elements.

The audio processor (not illustrated) denotes a configurative element which interfaces with the multimedia unit 120 through the audio interface (not illustrated) and processes the audio data to provide the processed audio data to sound output means such as a speaker. The audio processor may decode the audio data stored in the storage unit 170 and the audio data received through the communication unit 110, noise filter the decoded audio data, and then perform audio signal processing such as amplifying the audio data to an appropriate decibel. In the aforementioned example, when the contents that are played are video contents, the audio processor may process the audio data demultiplexed from the video contents, synchronize the processed audio data with the GPU 133, and provide the result to the speaker 163 to be output.

In ROM 137, a set of commands for system booting etc. is stored. When a turn on command is input and power is supplied, the CPU 131 copies the O/S stored in the storage unit 170 to the RAM 133 according to the commands stored in the ROM 137, and executes the O/S to boot the system. When the booting is completed, the CPU 131 copies various application programs stored in the storage unit 170 in the RAM 133, and executes application programs copied in the RAM 133 to perform various operations. As such, the CPU 131 may perform various operations according to execution of the application program stored in the storage unit 170.

As aforementioned, when a touch and other user manipulation is sensed in the multi display apparatus 100, the controller 130 may determine whether or not the user manipulation is intended. When it is determined that it is an intended user manipulation, the controller 130 reads information on the operations corresponding to that user manipulation from the storage unit 170, and then performs operations corresponding to that information. Such operations of the controller 130 may be embodied by execution of various programs stored in the storage unit 170.

The imaging unit 140 is configured to perform photographing operations according to the user manipulations. The imaging unit 140 may be provided in plural within the multi display apparatus 100. For example, a first imaging unit (not illustrated) may be provided in the first body 2 where the first display 190a is provided, and a second imaging unit (not illustrated) may be provided in the second body 4 where the second display 190b is provided. The controller 130 may store the image photographed by the imaging unit 140 or attach the photographed image to an email, document, message, etc. and transmit the attached image outside of the multi display apparatus 100 via the communication unit 110. In addition, the controller 130 may analyze the image photographed by the imaging unit 140 and recognize the user's motion or gesture, and perform a control operation corresponding to that motion or gesture.

The CPU 131 may be embodied as at least one of a single core processor, multi core processor, triple core processor, and quad core processor. In the case of a multi core processor, each processor included in the multi core processor may independently control the first display 190a and second display 190b.

Hereinbelow is an explanation of a software (program) hierarchy configuration of the controller 130.

Figure 28:
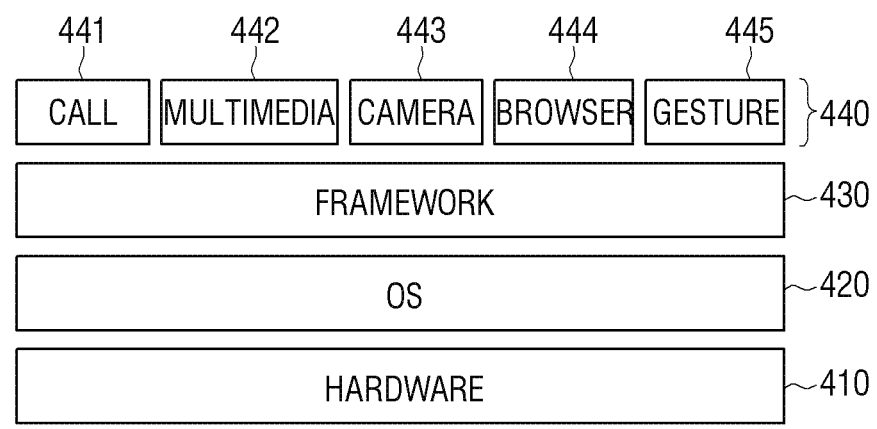
FIG. 28 is a view illustrating a system hierarchy structure of a multi display apparatus according to an exemplary embodiment of the present general concept.

FIG. 28 is a view illustrating a system hierarchy structure of a multi display apparatus 100 according to an exemplary embodiment of the present general concept.

With reference to FIG. 28, the multi display apparatus 100 according to an exemplary embodiment of the present general concept includes an operating system (OS, 420) configured to drive the hardware, application hierarchies 441-445 managed by the operating system and configured to provide user services using resources of the multi display apparatus 100, and a framework hierarchy 430 relaying the communications between the operating system and the applications.

The operating system 42 controls the overall operations of the hardware 410 and performs functions such as managing the process corresponding to each application. That is, OS 420 is a hierarchy configured to play the basic functions such as hardware management, memory, and security etc. The OS 420 includes modules (not illustrated) such as a display driver to drive the multi display, a communication driver to transceive data, a camera driver to drive a camera, an audio driver to drive an audio, and a power manager etc. In addition, an application programming interface (API) library and runtime records (not illustrated) that may be read by a developer (not illustrated) may be included. The OS 420 processes the calls of the applications, and operates the hardware according to the processed results.

There exists a framework hierarchy 430 as a superior hierarchy of OS 420. The framework hierarchy 430 performs a role of connecting the application hierarchy 440 and the OS hierarchy 420. That is, the framework hierarchy 430 includes a location manager, notification manager, and a frame buffer to display an image on the touch screen 192.

There exists an application hierarchy 440 where various functions of the multi display apparatus 100 are embodied in the superior hierarchy of the framework hierarchy 430. For example, various application programs such as call applications 441, multimedia applications 442, camera applications 443, browser applications 444, gesture applications 445, etc., may be included.

The applications 441-445 provide the user interface, and receive the command from the user and transmit the command received to OS 420 through the framework, or requests for resources of the OS 420. The OS 420 processes the system call, and manages operation of various applications. In addition, the applications 441-445 operate various hardware, such as the first display 190a and second display 190b, according to the system call processing result.

Hereinbelow is explanation of the hardware configuration of the multi display 190 according to an exemplary embodiment of the present general concept.

Figure 29:
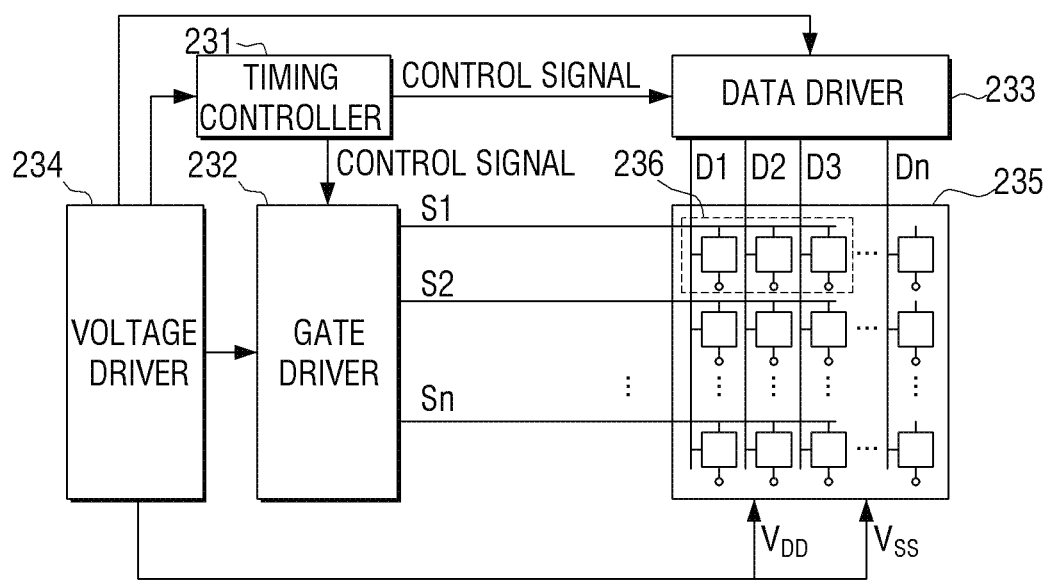
FIG. 29 is a view illustrating a circuit configuration of an image outputter of the first display or the second display according to an exemplary embodiment of the present general concept.
Figure 31:
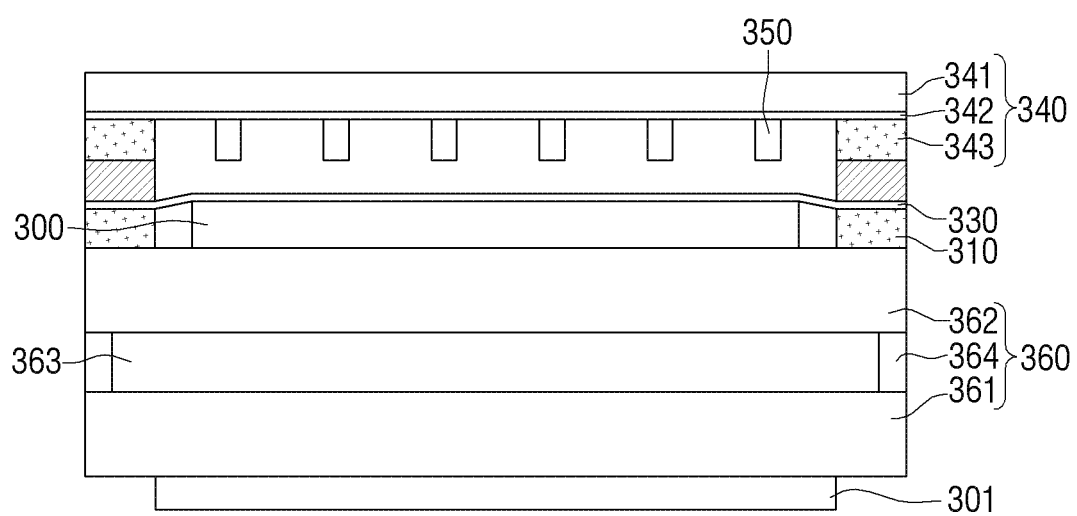
FIG. 31 is a cross-sectional view of a first display or second display including a touch screen according to an exemplary embodiment of the present general concept.

FIG. 29 is a view illustrating a circuit configuration of an image outputter 191 of the first display 190a or the second display 190b. Hereinbelow, the explanation will be made based on the first display 190a, but the second display 190b would include the same configurations and would operate in the same manner. Furthermore, FIG. 29 illustrates the circuit configuration of the image outputter 191, whereas FIG. 31 illustrates the physical construction of the image outputter 191.

According to FIG. 29, the image outputter 191 of the first display 190a may include a timing controller 231, a gate driver 232, a data driver 233, a voltage driver 234, and a display panel 235.

The timing controller 231 receives a clock signal (DCLK) and horizontal sync signal (Hsync), vertical sync signal (Vsync), etc. and generates a gate control signal (injection control signal), and data control signal (data signal), and realigns the received R, G, B values of the image to be displayed, and provides them to the data driver 233.

The timing controller 231 may generate a gate shift clock (GSC), gate output enable (GOE), and gate start pulse (GSP) etc. Herein, a GSC is a signal configured to determine the time when a thin film transistor (TFT) connected to light emitting diodes such as R, G, B (for example Organic Light Emitting Diodes, OLEDs) is turned on/off, a GOE is a signal configured to control the output of the gate driver 232, and a GSP is a signal configured to notify the first driving line of the screen in one vertical sync signal.

In addition, the timing controller 231 may generate Source Sampling Clock (SSC), Source Output Enable (SOE), and Source Start Pulse (SSP) etc. regarding the data control signal. Herein, SSC is used as a sampling clock to latch data in the data driver 233, and determines the driving frequency of the data driver 233. The SOE delivers the data latched by the SSC to the display panel 235. The SSP is a signal notifying a latch or sampling start of data during one horizontal sync period.

The gate driver 232 is a configuration generating an injection signal, and is connected to the display panel 235 through the injection lines S1, S2, S3, ... Sn. The gate driver 232 applies gate on/off voltage (Vgh/Vgl, not illustrated) provided from the voltage driver 234 to the display panel 235 according to the gate control signal generated by the timing controller 231. The gate on voltage (Vgh) is provided consecutively from gateline 1 (GL1) to gateline N (GLn) for embodiment of unit frame images on the display panel 235. The data driver 233 is a configuration of generating a data signal, and is connected to the display panel 235 through data lines D1, D2, D3, ... Dn. The data driver 233 finishes scaling according to the data control signal generated by the timing controller 233, and inputs the RGB data of the image into the display panel 235. The data driver 233 converts the RGB image data provided in serial into parallel in the timing controller 231, and converts the digital data into analog voltage to provide the image data corresponding to one horizontal line portion to the display panel 235. This process is made consecutively per horizontal line.

The voltage driver 234 generates and delivers each driving voltage of the gate driver 232, data driver 233, and display panel 235 etc. That is, the voltage driver 234 may receive prevailing voltage from outside the multi display apparatus 100, for example, alternating voltage of 110V or 220V, generate and provide source voltage (VDD) necessary in the display panel 235, or provide ground voltage (VSS). In addition, the voltage driver 234 may generate a gate on voltage (Vgh) and provide it to the gate driver 232. To this end, the driver 234 may include a plurality of voltage driving modules (not illustrated) operating independently. Herein, the plurality of voltage driving modules may operate to provide different voltages from one another according to the control of the controller 130, and the controller 130 may control the voltage driver 234 so that a plurality of voltage driving modules could provide different driving voltages from one another according to the predetermined information. For example, each of the plurality of voltage driving modules may provide a different first voltage according to the information predetermined according to the control of the controller 130 and a second voltage set in default.

According to an exemplary embodiment of the present general concept, the voltage driver 234 may include a plurality of voltage driving modules corresponding to each area of the display panel 235 divided in a plurality of areas. In this case, the controller 130 may control a plurality of voltage driving modules to provide first voltages which are different from one another, that is, ELVDD voltages (not illustrated) according to each screen information (or input image information) of the plurality of areas. That is, the controller 130 may use the image signal input into the data driver 233 to control the size of the ELVDD voltage. Herein, the screen information may be at least one of the brightness information and gradation information of the input image.

The display panel 235 may be provided with a plurality of gatelines GL1-GLn and datalines D1-Dn configured to intersect one another and define pixel areas 236, and in the intersecting pixel areas 236, R, G, B light emitting diodes such as OLEDs may be formed in the pixel area 236 where the gatelines and datalines intersect one another. In addition, in one area of the pixel area 236, more specifically in the corner, a switching element, that is a TFT, is formed. During the turn on operation of the TFT, the gradation voltage from the data driver 233 is provided to each light emitting diode of R, G, B. Herein, R, G, B light emitting diodes in accordance with the quantity of current provided based on the gradation voltage. That is, when a large quantity of current is provided, R, G, B light emitting diodes provide that much of the current provided.

Figure 30:
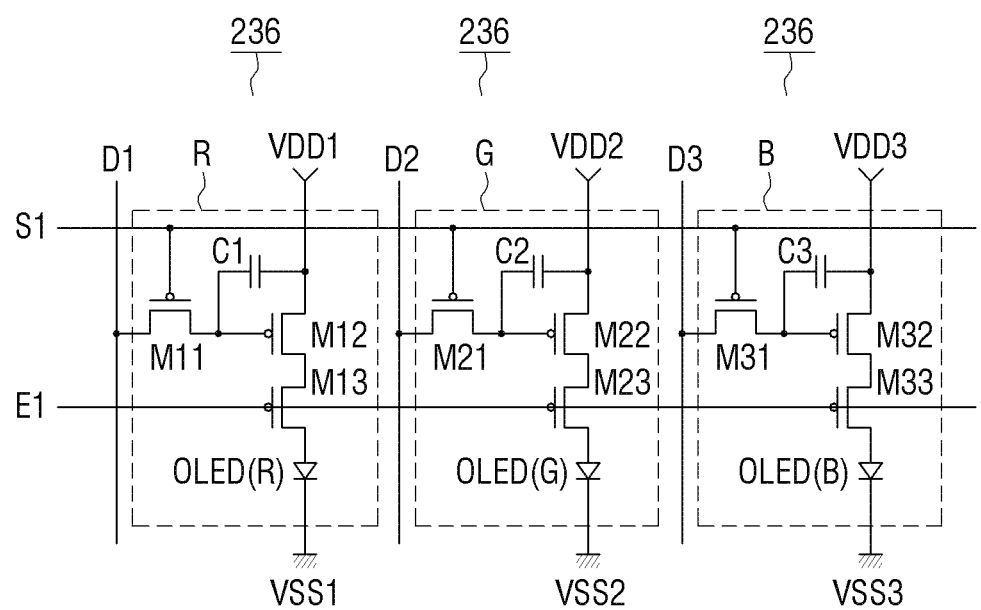
FIG. 30 is a view illustrating a circuit structure configuring R, G, and B pixel areas within the display panel of FIG. 29.

FIG. 30 is a view illustrating a circuit structure configuring R, G, and B pixel areas 236 which configure the display panel 235 of FIG. 29.

With reference to FIG. 30, the display panel 235 includes three pixel areas 236 corresponding to R, G, and B colors. The R, G, B pixel areas 236 may include a scan signal S1, switches M11, M21, M31 that operate by the gate on voltage (Vgh, not illustrated), switchers M12, M22, M32 that output current based on the pixel values including the changed high gradation value provided to the datalines D1-Dn, and switchers M13, M23, M33 that adjust the quantity of current provided from the switchers M12, M22, M32 to the R, G, B light emitting diodes according to the control signal provided in the timing controller 231. In addition, such switchers M13, M23, M33 are connected to the organic light emitting diodes (OLEDs) to supply current to the OLEDs. Herein, "OLED" denotes a display that emits light itself using the principle of electric field light emission when current is applied to fluorescence or phosphorescence organic matter thin film. The anode electrode of each OLED is connected to the pixel circuit, and the cathode electrode is connected to the ELVSS. Such an OLED generates light of a predetermined brightness in response to the current supplied from the pixel circuit. Herein, the gate electrode of the switchers M11, M21, M31 are connected to the injection line S1, while the other one of the source electrode and the drain electrode is connected to the dataline D1. As such, the display panel 235 may be embodied as an AM-OLED (Active Matrix Organic Light-Emitting Diode) panel. However, the aforementioned exemplary embodiment is merely one exemplary embodiment of the present general concept, and a PM OLED (Passive Matrix Organic Light-Emitting Diode), which is a method where one line emits light and drives at the same time, is obviously not to be excluded.

As such, in the case of embodying the multi display 190 of the multi display apparatus 100 with OLEDs, there is no need to provide an additional light emitting means (backlight), and thus there is an advantage of making the thickness of the display thinner and simplifying the configuration.

However, although OLEDs are described in the above exemplary embodiment of the present general concept, the display may be embodied as various display technologies such as Liquid Crystal Display Panel (LCD Panel), Plasma Display Panel (PDP), Vacuum Fluorescent Display (VFD), Field Emission Display (FED), and Electro Luminescence Display (ELD).

FIG. 31 is a cross-sectional view of a first display 190a including a touch screen 192. Although the configuration illustrated in FIG. 31 is described below with reference to the first display 190a, the second display 190b may have the same construction.

With reference to FIG. 31, the first display 190a includes an image outputter 191 and a touch screen 192.

The image outputter 191 includes the display panel 235, where an upper substrate 362 and a lower substrate 361 are disposed, an upper polarizing plate 300 provided on the upper substrate 362 of the display panel 235, and a lower electrode 310 provided in the edge area of the upper polarizing plate 300. In addition, the image outputter 191 includes a lower polarizing plate 301 provided on the lower substrate 361.

There may be provided a liquid crystal layer 363 between the upper substrate 362 and lower substrate 361. The upper substrate 362 and lower substrate 361 include a display area to display images and a peripheral area provided at the edge of the display area. Although not illustrated, in the display area of the lower substrate 361, a thin film transistor is provided in an intersecting area of a plurality of gatelines, and a plurality of gatelines and datalines, as well as a pixel electrode connected to the thin film transistor, are provided. There is provided a sustained electrode where the pixel electrode and a portion thereof overlap each other. In addition, in a peripheral area of the lower substrate 361, there may be provided a plurality of pads (not illustrated) connected to the gatelines and datalines.

The upper substrate 362 and the lower substrate 361 may be sealed using a sealing member 364, such as silant. The sealing member 364 is effective when provided in a peripheral area of the upper substrate 362 and lower substrate 361.

The touch screen 192 includes a lower transparent electrode 330 connected to the lower electrode 310 and provided on the upper polarizing plate 300, a touch pad 340 type user interface provided on the lower transparent electrode 330, and a protrusion 350 provided between the upper transparent electrode 342 and the lower transparent electrode 330.

The touch pad 340 includes a base film 341, the upper transparent electrode 342 provided on the base film 341, and an upper electrode 343 provided on the upper transparent electrode 342.

In the case of pressing the touch pad 340 with a predetermined force, the protrusion 350 of the area where the force is applied contacts the lower transparent electrode 330, and accordingly, the lower transparent electrode 330 and upper transparent electrode 342 contact each other electrically. Through the electrical contact, the current flowing through the upper transparent electrode 342 and/or the lower transparent electrode 330 changes, and this change is sensed through an additional sensing means (not illustrated). A signal output from the sensing means is delivered to the controller 130. The controller 130 uses the signal to generate coordinates of the area where the flow of current is changed, and delivers the generated coordinates to a predetermined driver (not illustrated). The driver may perform the same operations as those used in manipulating the image displayed on the display panel 235 using the input tool such as a mouse in response to the input coordinates.

Meanwhile, due to the characteristics of the multi display apparatus 100, it is possible to provide an image frame buffer 134a-1, 134b-1, or 134-1 in various methods. Hereinbelow is explanation on image frame butters provided in various methods.

Figure 32:
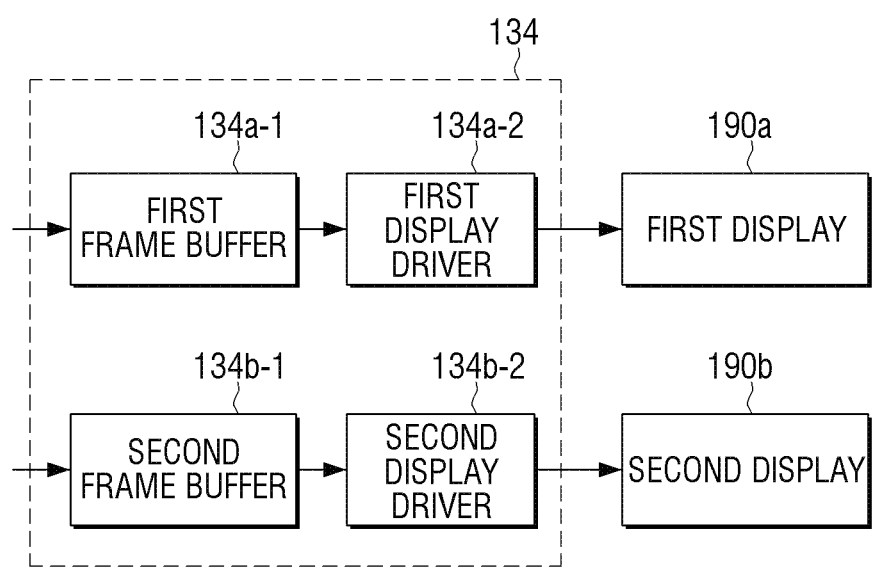
FIG. 32 is a block diagram illustrating a display driver of a multi display apparatus according to an exemplary embodiment of the present general concept.
Figure 33:
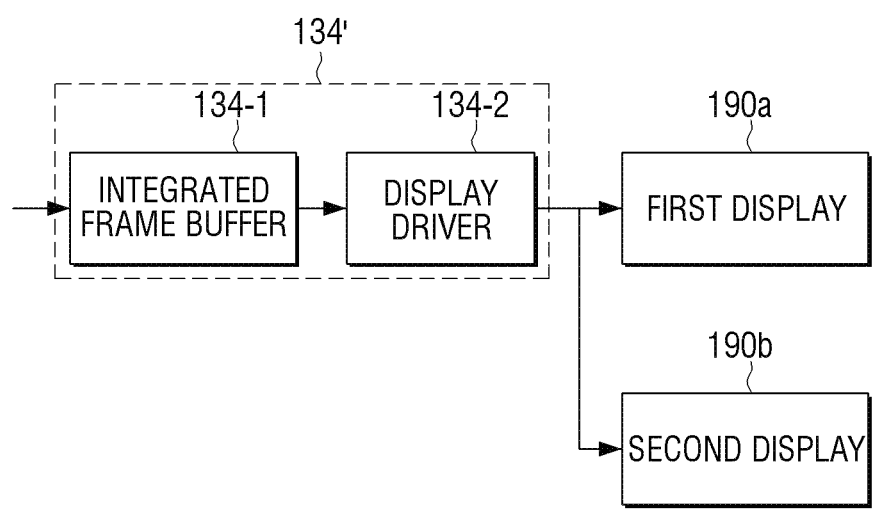
FIG. 33 is a block diagram illustrating a configuration of a display driver according to another exemplary embodiment of the present general concept.

FIG. 32 is a block diagram illustrating a display driver 134 of the multi display apparatus 100 according to an exemplary embodiment of the present general concept, and FIG. 33 is a block diagram illustrating a configuration of the display driver 134' according to another exemplary embodiment of the present general concept.

According to FIG. 32, the display driver 134 may include a first frame buffer 134a-1, first display driver 1341-2, second frame buffer 134b-1 and second display driver 134b-2. That is, each of the displays 190a, 190b may have an additional frame buffer 134a-1 134b-1, and display driver 134a-2, 134-2.

The first frame buffer 134a-1 is a configuration to buffer an image frame to be displayed on the display 190a, and the second frame buffer 134b-1 is a configuration to buffer an image frame to be displayed on the second display 190b.

For example, the image frame which has been digital signal processed by the GPU 133 is stored in a bit map format to the first and second frame buffers 134a-1, 134b-1. In this case, the buffering area of each frame 134a-1, 134b-1 is allocated suitable to the maximum pixel size that may be supported in each of first display 190a and second display 190b. The first display driver 134a-2 analyzes the image frame stored in the first frame buffer 134a-1 and converts the image frame stored in the first frame buffer 134a-1 into a first image source signal. The first display driver 134a-2 provides the first image source signal to the first display 190a, to drive the first display 190a to display the image frame.

Likewise, the second display driver 134b-2 analyzes the image frame stored in the second frame buffer 134b-1 and converts the analyzed image frame into a second image source signal, and provides the converted second image source signal to the second display 190b to be displayed.

These two frame buffers 134a-1 and 134b-1 may be suitable to process the image frames regarding each of the first display 190a and the second display 190b in parallel. When a parallel processor (not illustrated) outputs the image signal regarding each of first display 190a and second display 190b, it is possible to increase the image output efficiency.

However, unlike the above, the first frame buffer 134a-1 and second frame buffer 134b-1 respectively corresponding to each of first display 190a and second display 190b may be integrated to one integrated frame buffer 134-1 and used instead of being provided separately.

FIG. 33 is a block diagram illustrating a configuration of a multi display apparatus 100 controlling operations of each display 190a, 190b using the integrated frame buffer 134-1. When the frame buffer is embodied as an integrated frame buffer 134-1, the size of the integrated frame buffer 134-1 may be allocated and embodied to be bigger than the maximum resolution of the first display 190a and the second display 190b.

For example, when each of the first display 190a and the second display 190b displays the maximum resolution of 1024*800, the integrated frame buffer 134-1 allocates the storage area to be the frame buffer size capable of displaying the resolution of 1024*1600. In the first area of the integrated frame buffer 134-1, the first image frame where the first display 190a is displayed is stored, and in the second area of the integrated frame buffer 134-1, a second image frame displayed on the second display 190b is stored.

The display driver 134-2 uses the first image frame stored in the integrated frame buffer 134-1 and the address of the second frame to provide the first and second image frames to the first display 190a and the second display 190b, to drive each display.

As aforementioned, the sensor 150 of the multi display apparatus 100 may include proximate sensing means, for example, the proximity sensor 155. Hereinbelow is explanation on the configuration and operations of the proximity sensor 155.

Figure 34:
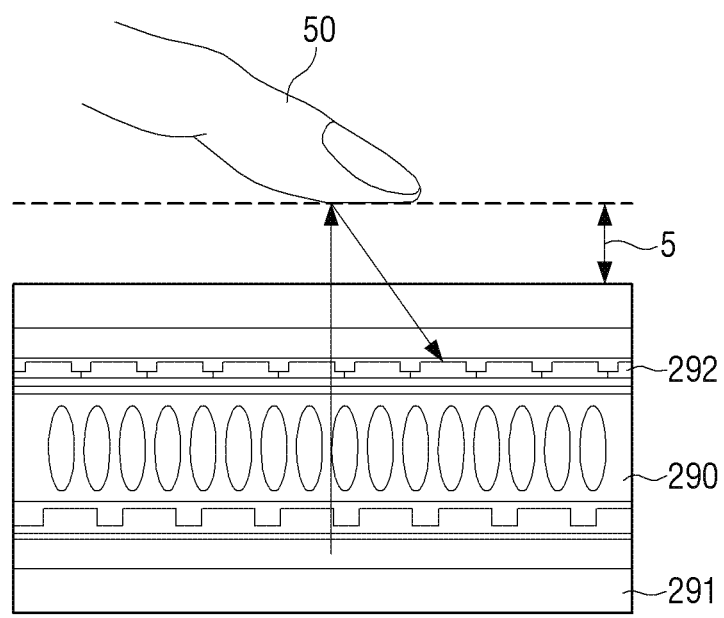
FIG. 34 is a view illustrating a proximate touch according to an exemplary embodiment of the present general concept.

FIG. 34 is a view illustrating a proximate touch according to an exemplary embodiment of the present general concept. The construction illustrated in FIG. 34 may be applied to either or both of first display 190a and second display 190b.

According to the exemplary embodiment illustrated in FIG. 34, a user may input a control command into the multi display apparatus 100 merely by bringing a user object 50 such as a finger or other object into proximity of the touch screen 192 or user interface, without directly touching the touch screen 192. The multi display apparatus 100 may sense the proximate touch using the proximity sensor 155. The proximate touch denotes recognizing as one touch gesture when a movement is recognized within a certain spatial effective recognition range 5, without directly touching the touch screen 192.

With reference to FIG. 34, in the upper portion of a display 290, an infrared source 291 to recognize proximate touches is located, and in the lower portion of the display 290, an infrared sensor 292 is included.

The infrared source 291 irradiates an infrared ray in a surface direction of the display 290. More specifically, the infrared source 291 is arranged in the lower portion of the display 290 where the image is displayed, and may irradiate the infrared ray in the surface direction of the display 290. There exists a certain area which may recognize the approach of the user object 50 above the surface of the display 290. This area is the effective recognition area 5 in which the proximate touch may be recognized.

The meaning of the user object 50 is the means to input a command into the multi display apparatus 100, for example, a body part such as the hand.

When the user object 50 approaches towards inside the effective recognition area 5, the sensor 292 senses the infrared reflected by the approach of the user object 50 and generates the infrared scan image. More specifically, the infrared sensor 292 uses a plurality of infrared sensing elements arranged in an array format to generate an infrared scan image corresponding to the infrared ray reflected by the approach of the user object 50. The multi display apparatus 100 may sense the proximate touch input using the generated infrared scan image.

Hereinbelow is explanation on the exterior configuration of the multi display apparatus 100 according to an exemplary embodiment of the present general concept with reference to the perspective view attached.

Figure 35:
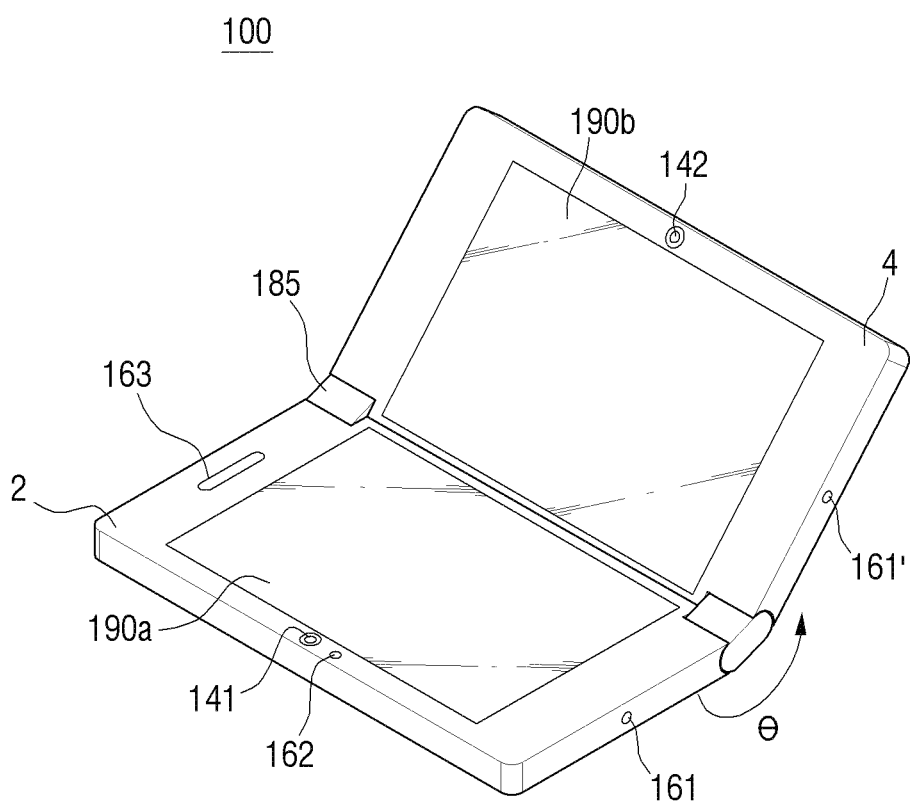
FIG. 35 is a detailed perspective view of a multi display apparatus according to an exemplary embodiment of the present general concept.

FIG. 35 is a detailed perspective view of the multi display apparatus 100 according to an exemplary embodiment of the present general concept. Herein, it is illustrated that the multi display apparatus 100 has two displays 190a and 190b, combined by the hinge 185.

With reference to FIG. 35, the multi display apparatus 100 includes the first body 2 and the second body 4, the first body 2 and the second body 4 configured to be connected by the hinge 185 and thus movable relative to one another. On one surface of the first body 2, there is provided the first display 190a, while on one side of the display 190a, at least one physical button 161 may be arranged. On one surface of the second body 4, the second display 190b is provided, while on one side of the second display 190b, at least one physical button 161' may be arranged. The physical buttons 161 and 161' may include at least one of the push button and touch button. In an exemplary embodiment of the present general concept, the first display 190a arranged in the first body 2 having the speaker 163 and microphone 162 may operate as a main screen, while the second display 190b arranged in the second body 4 may operate as a sub screen.

In an exemplary embodiment of the present general concept, the body 2 has the first camera 141, and the second body 4 has the second camera 142.

With the multi display apparatus 100 arranged as illustrated in FIG. 35, each of the displays 190a and 190b may display the screen in a landscape mode.

As long as the multi display apparatus 100 has the first body 2 and second body 4 connected by the hinge 185 to be relatively moveable, it may be any apparatus such as a mobile phone, notebook, tablet PC, PMP, etc. The first display 190a and the second display 190b are explained as having the first body 2 and second body 4, respectively, but the following explanation may be applied to any apparatus which provides a touch screen display as only one panel. In addition, at least one of the function buttons 161 on the side of each of the displays 190a, 190b may be omitted. Furthermore, although it is explained that a connection between the first body 2 and second body 4 is made by the hinge 185, the hinge 185 may be substituted for any other configurative element as long as the first body 2 and second body 4 are configured to move relative to one another.

Meanwhile, the hinge 185 may include two hinges arranged in the upper and lower sides of the connecting portion of the first body 2 and second body 4. In addition, the hinge 185 may include one hinge arranged in the entirety of the connecting portion of the first body 2 and second body 4.

The multi display apparatus 100 has the display apparatus including the first display 190a and second display 190b which are separated from each other physically or graphically. The multi display apparatus 100 may utilize two displays 190a and 190b to support various screen modes such as illustrated in FIGS. 11 to 15.

FIGS. 35 to 40 are views illustrating various screen modes according to the relative angle between the first body 2 and the second body 4 of the multi display apparatus 100 according to an exemplary embodiment of the present general concept.

The relative angle θ is a rotation angle between the second body 4 rotated in a predetermined direction (for example counterclockwise direction) regarding the first body 2.

More specifically, the relative angle θ may be detected using the hinge sensor 154 mounted inside the hinge 185 itself. The hinge sensor 154 may include one of a hall sensor, pressure sensor, induction detection sensor, electricity contact sensor and optical sensor, and detect the movement of the hinge and relative location to recognize the relative angle θ.

In addition, besides the hinge sensor 154, the geomagnetic sensor 152 and acceleration sensor 153 may detect each location of the first body 2 and the second body 4 to recognize the relative angle θ.

Figure 36:
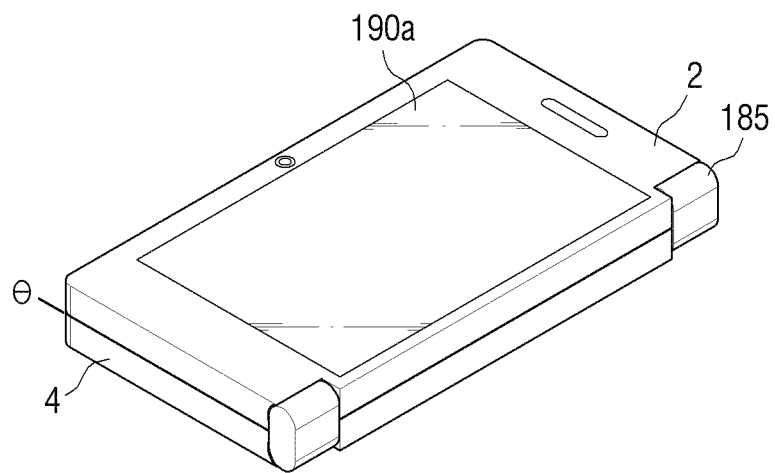
FIGS. 36 to 38 are perspective views illustrating states of a multi display apparatus changed in various ways with reference to a hinge according to an exemplary embodiment of the present general concept.

FIG. 36 is a perspective view illustrating a folded multi display apparatus 100 according to an exemplary embodiment of the present general concept. As illustrated in FIG. 36, with the first display 190a on the first body 2 and the second display 190b on the second body 4 facing each other, the first body 2 and the second body 4 touch each other. That is, the second display 190b is located on the opposite side of the first display 190a. When the user sees the first display 190a, the second display 190b is located at the opposite side, and thus the user cannot see the second display 190b. As such, the user may only see one display.

In the configuration illustrated in FIG. 36, the relative angle θ is defined as 0 degrees. For example, when the relative angle between the first body 2 and the second body 4 is 0 to 60 degrees, the multi display apparatus 100 may recognize as a single display mode. The single display mode may be used usefully for applications in which only one display is necessary, for example in a telephone call application, or when the multi display apparatus 100 is in a locked state and is not used. In the single display mode, the first display 190a of the front surface displays the operation screen by at least one application, and the second display 190b on the rear surface may be turned off. Some applications may use an option menu (not illustrated) to turn on the second display 190b of the rear surface. In the case of the single display mode, the user can see only one display screen, and thus controller 130 controls one display only. That is, the controller 130 only transmits a control signal regarding the display that the user is currently seeing. Additional control signals and data signals are not transmitted regarding the display which is not controlled by the controller 130, thereby saving power consumption.

Herein, the display which is not provided with the control signal and data signal operates in a sleep mode, and when the signal to be released from the sleep mode is applied by the controller 130, such as when the user rotates the multi display apparatus 100 to see the display in the sleep mode, the display may be released from the sleep mode, and therefore receive control signals from the controller 130.

Figure 37:
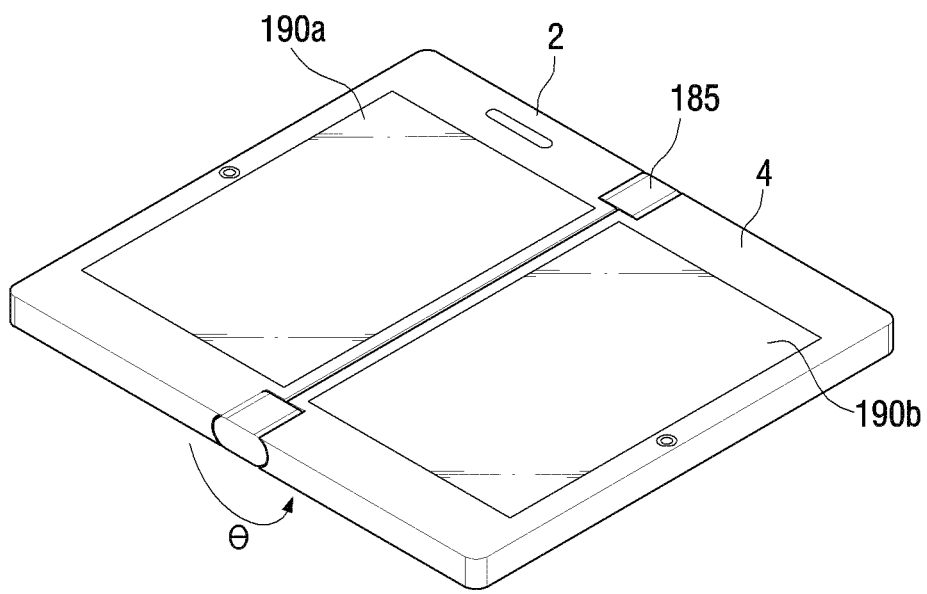

FIG. 37 illustrates a state where the relative angle θ is or approximates 180 degrees within a predetermined range, with the first body 2 and second body 4 substantially parallel to each other. Hereinbelow this mode is called an expanding mode. For example, when the relative angle between the first body 2 and the second body 4 is in the range of 175 to 185 degrees, the multi display apparatus 100 may determine that the first body 2 and the second body 4 are unfolded. The expanding mode may display two operation screens regarding two applications on each of the displays 190a and 190b, or display one screen regarding one application on both of the displays 190*a* and 190*b*, or display two operation screens regarding one application on the two displays 190*a* and 190*b*. No application may be displayed on either one of the displays, but a defaulted home screen may be displayed. The expanding mode may be useful in applications best performed with multiple displays or a single large display, such as for example in E-books, video player applications, and web browsing screens.

For example, the controller 130 may display a first web browsing screen (not illustrated) on the first display 190*a*, and display a second web browsing screen (not illustrated) on the second display 190*b*. Herein, the first web browsing screen and second web browsing screen are related to each other, and a third web browsing screen (not illustrated) related to the second web browsing screen may be displayed on the first display 190*a*, and a fourth web browsing screen (not illustrated) related to the third browsing screen may be displayed on the second display 190*b*.

The controller 130 may display the web browsing screens alternately on the first display 190*a* and second display 190*b*, and may perform screen conversion between the plurality of web browsing screens displayed on each display 190*a* and 190*b*, and may display the web browsing screens displayed on the first display 190*a* and the web browsing screens displayed on the second display 190*b* in different layouts from each other.

Figure 38:
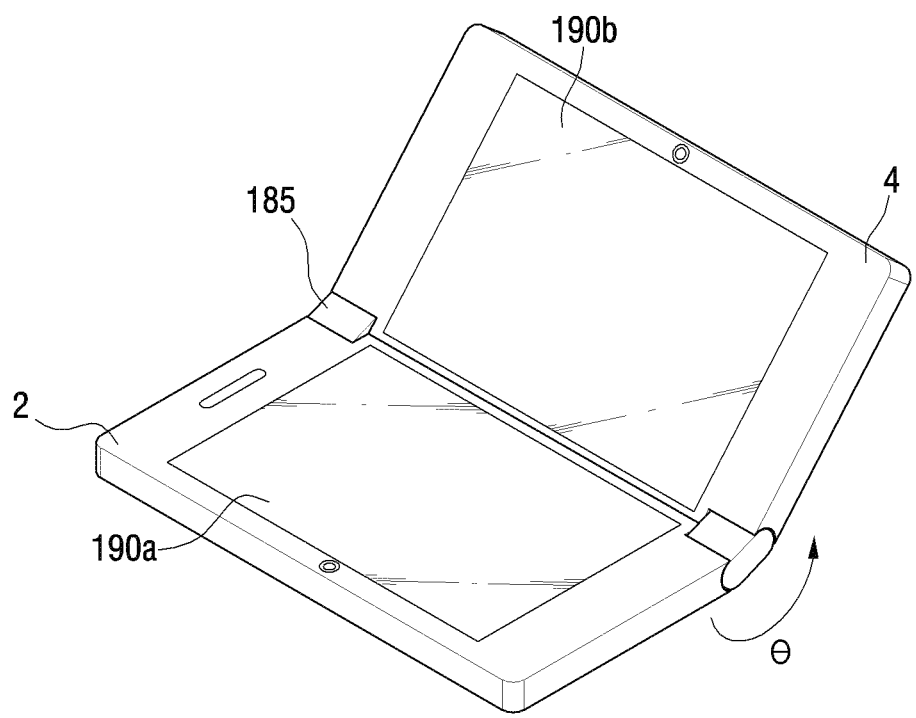

FIG. 38 illustrates a state of the multi display apparatus 100 in which the relative angle of the second body 4 to the first body 2 exceeds 180 degrees, that is, when the two displays 190*a* and 190*b* are folded slightly towards an inside direction, i.e., folded slightly towards each other. This is referred to herein as a tool kit mode. For example, when the relative angle between the first body 2 and second body 4 is 180 to 265 degrees, it is recognized as the tool kit mode. The tool kit mode is useful when the multi display apparatus 100 is used in a similar format as a notebook computer. For example, various operation environments may be provided such as displaying an operation screen on the first display 190*a* and displaying a tool such as a keyboard on the second display 190*b*.

Figure 39:
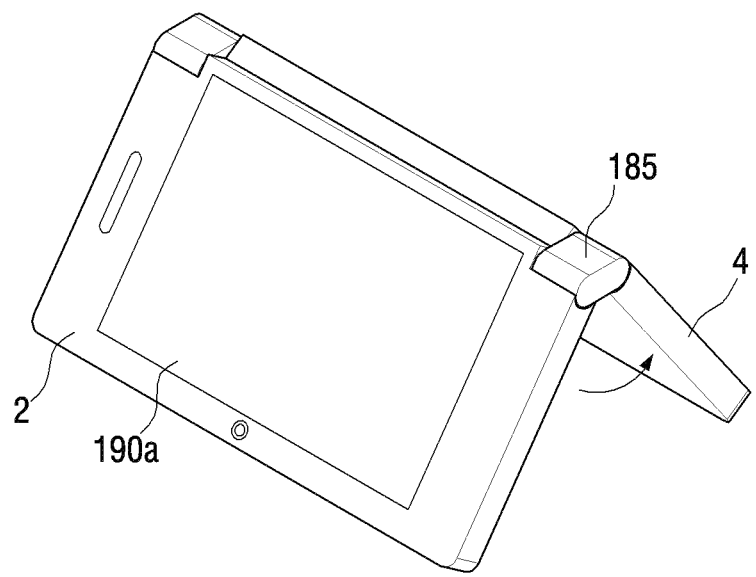
FIGS. 39 and 40 are perspective views illustrating standing states of a multi display apparatus according to an exemplary embodiment of the present general concept.

FIG. 39 illustrates a state where the relative angle θ of the first body 2 and second body 4 is less than 180 degrees, that is, when the two displays 190*a* and 190*b* are folded towards an outside, i.e., folded so that the displays 190*a* and 190*b* face almost opposite directions. This mode is referred to herein as a standing mode. For example, when the relative angle between the first body 2 and the second body 4 is between 30 to 90 degrees, the multi display apparatus 100 may recognize the standing mode. Since the standing mode is a structure where the two displays 190*a* and 190*b* are folded towards outside, it is possible to stand the multi display apparatus 100 on the bottom in a triangular shape, i.e., balanced on an edge portion of the first body 2 and the second body 4. The standing mode of the multi display apparatus 100 may be useful when charging, viewing an image (for example, using the multi display apparatus 100 as a digital clock or frame), or watching personal broadcast, film, and video etc. In another exemplary embodiment of the present general concept, the standing mode may be applied to the application which requires cooperation or interaction by two or more users, for example, a conference call, a collaborative game, etc. Some applications display operations screens on only the first display 190*a* in the standing mode, and may turn off the second display 190*b*. Some applications may turn on the second display 190*b* using the option menu.

Figure 40:
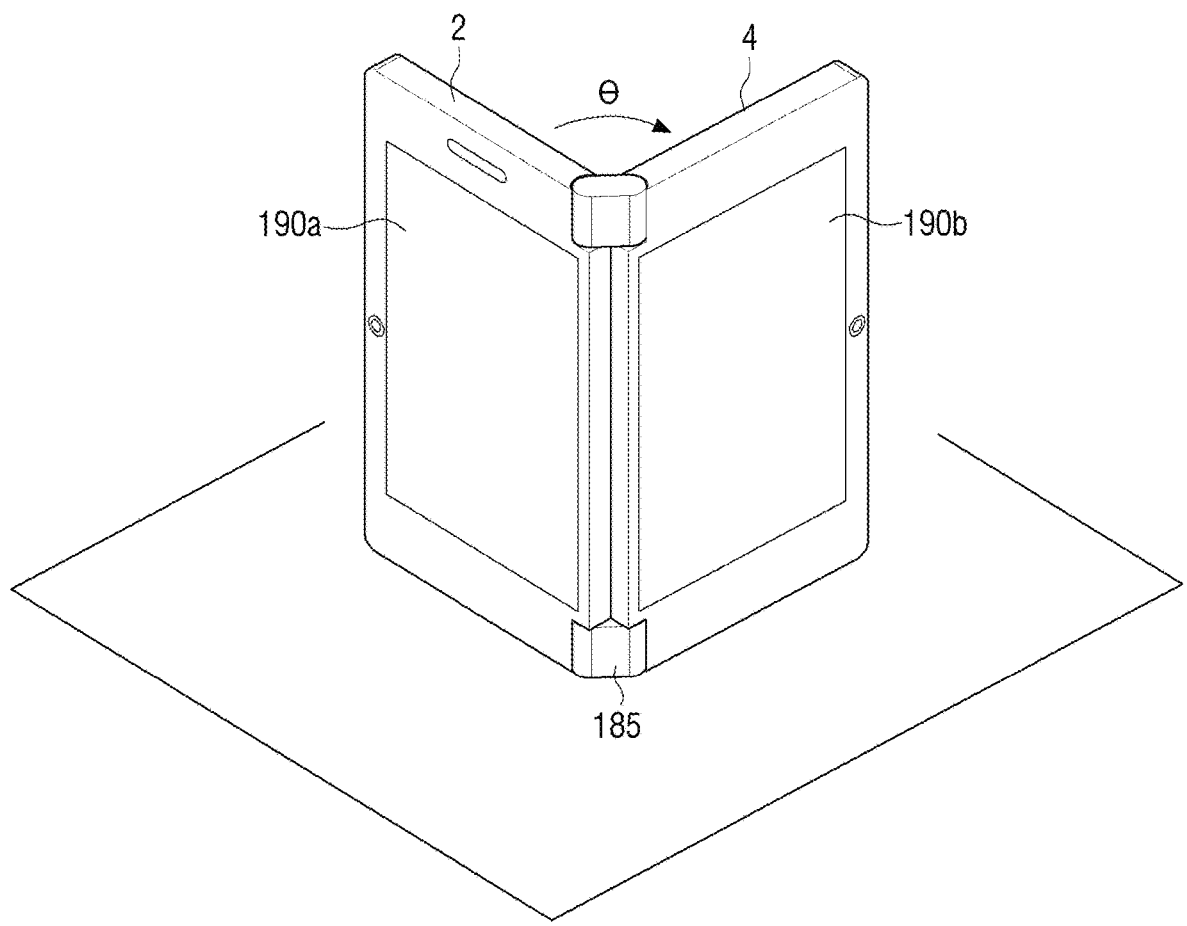

FIG. 40 is another exemplary embodiment of the standing mode illustrated in FIG. 39, referred to herein as length view mode where the multi display apparatus 100 is placed in a standing manner so that a portion of the hinge 185 touches the ground. When it is determined that the relative angle θ between the first body 2 and the second body 4 is 30 to 90 degrees and that the multi display apparatus 100 is placed in a standing manner by the acceleration sensor 153, the multi display apparatus 100 may recognize the length view mode.

More specifically, the acceleration sensor 153 may sense rotation of the multi display apparatus 100. The acceleration sensor 153 may sense the conversion between the length view mode where the first display 190*a* and the second display 190*b* are placed on the left or right side, as illustrated in FIG. 40, and a width view mode where the first display 190*a* and the second display 190*b* are placed on an upper or lower side, as illustrated in FIG. 39.

The length view mode may be applied to an application where different images need to be provided to two or more users, for example, conference call and multi video player etc.

Figure 41:
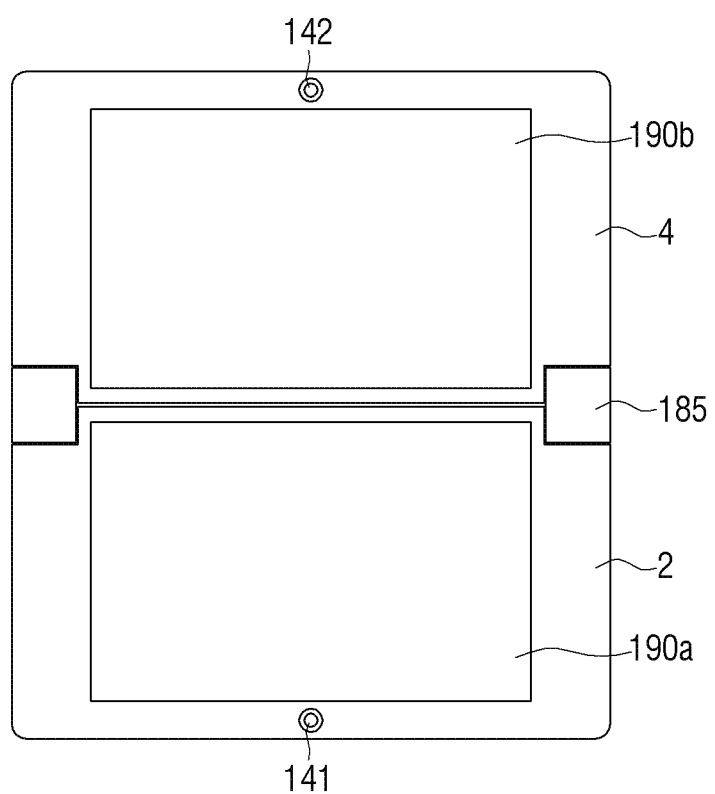
FIGS. 41 and 42 are views illustrating an arrangement of two cameras of a multi display apparatus according to an exemplary embodiment of the present general concept.
Figure 42:
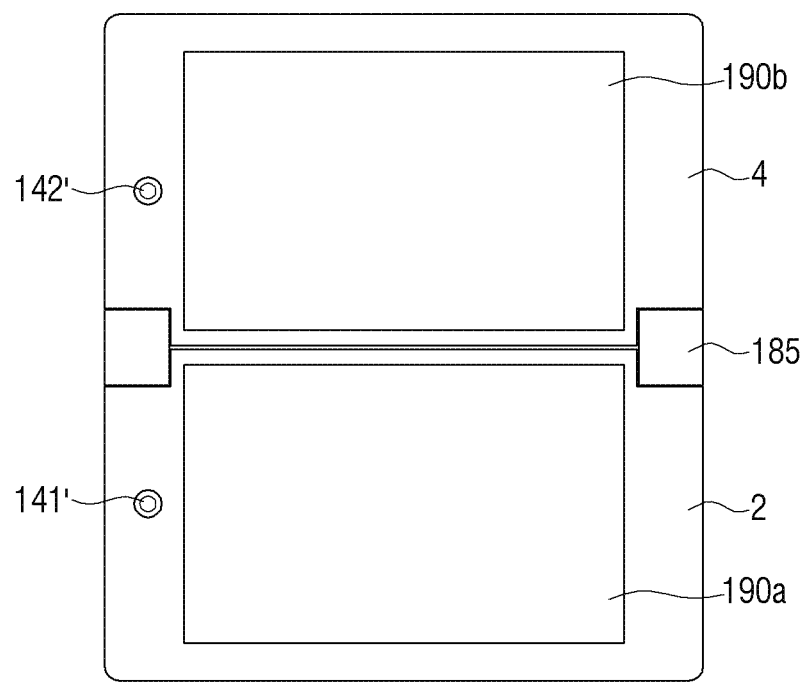

FIGS. 41 and 42 are views illustrating an arrangement of two cameras 141 and 142 of the multi display apparatus 100 according to an exemplary embodiment of the present general concept. FIGS. 41 and 42 are views of the multi display 100 apparatus seen from the direction of both displays 190*a* and 190*b* while in the expanding mode. These are views to illustrate the arrangement of the cameras 141 and 142, and thus other elements and configurations of the multi display apparatus 100 are omitted for convenience of explanation.

With reference to FIG. 41, the multi display apparatus 100 includes a first body 2 and second body 4, the first body 2 including the first display 190*a* and the second body 4 including the second display 190*b*. The first body 2 and second body 4 are connected by the hinge 185 so that they are moveable relative to one another. The first camera 141 may be arranged on the first body 2 in a central portion of an edge area opposite to the hinge 185. Similarly, the second camera 142 may be arranged on the second body 4 in a central portion of an edge area opposite to the hinge 185.

Next, an alternate arrangement of first camera 141' and second camera 142' is explained with reference to FIG. 42. Similarly to FIG. 41, the explanation is made with the multi display apparatus 100 in the expanding mode. The first camera 141' may be arranged on a central surface of the left edge area of the first body 2, and the second camera 142' may be arranged on a central surface of the left edge of the second body 4. In another exemplary embodiment of the present general concept, each of the first camera 141' and the second camera 142' may be arranged in a central surface of the right edge area of the first and second body 2, 4, respectively. In another exemplary embodiment of the present general concept, the first and second camera may be arranged in a corner area of the first body 2 and the second body 4, respectively. The multi display apparatus 100 with the first camera 141' and the second camera 142' arranged as in FIG. 42 may not only be used in the width view mode as aforementioned but also in the length view mode.

Hereinbelow is explanation on a multi display method according to various exemplary embodiments of the present general concept.

FIGS. 43 to 47 are flowcharts illustrating a multi display method according to various exemplary embodiments of the present general concept.

The operations of the multi display method already explained above will be omitted.

Figure 43:
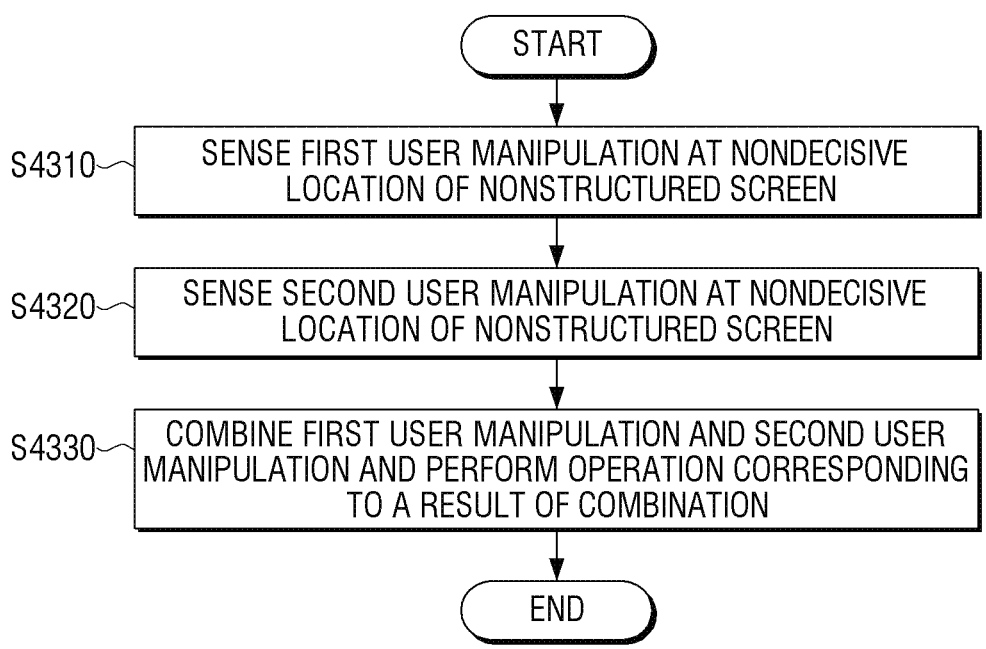
FIGS. 43 and 47 are flowcharts illustrating a multi display method according to various exemplary embodiments of the present general concept.

The multi display method as in FIG. 43 may be performed in a multi display apparatus 100 including a first body 2 where a first display 190a is arranged, a second body 4 where a second display 190b is arranged, and a hinge 185 which connects the first body 2 and the second body 4 and supports the first body 2 and the second body 4 so that they are rotatable relative to one another.

More specifically, with the multi display apparatus 100 displaying the unstructured first screen and second screen, through the first display 190a and the second display 190b, respectively, the user may perform user operations for each screen. Accordingly, when a first user manipulation regarding a nondecisive location of the first screen is sensed (operation S4310), and a second user manipulation regarding a nondecisive location of the second screen is sensed (operation S4320), the sensed first user manipulation and second user manipulation are combined, and an operation corresponding to that combination results if performed (operation S4330).

Figure 44:
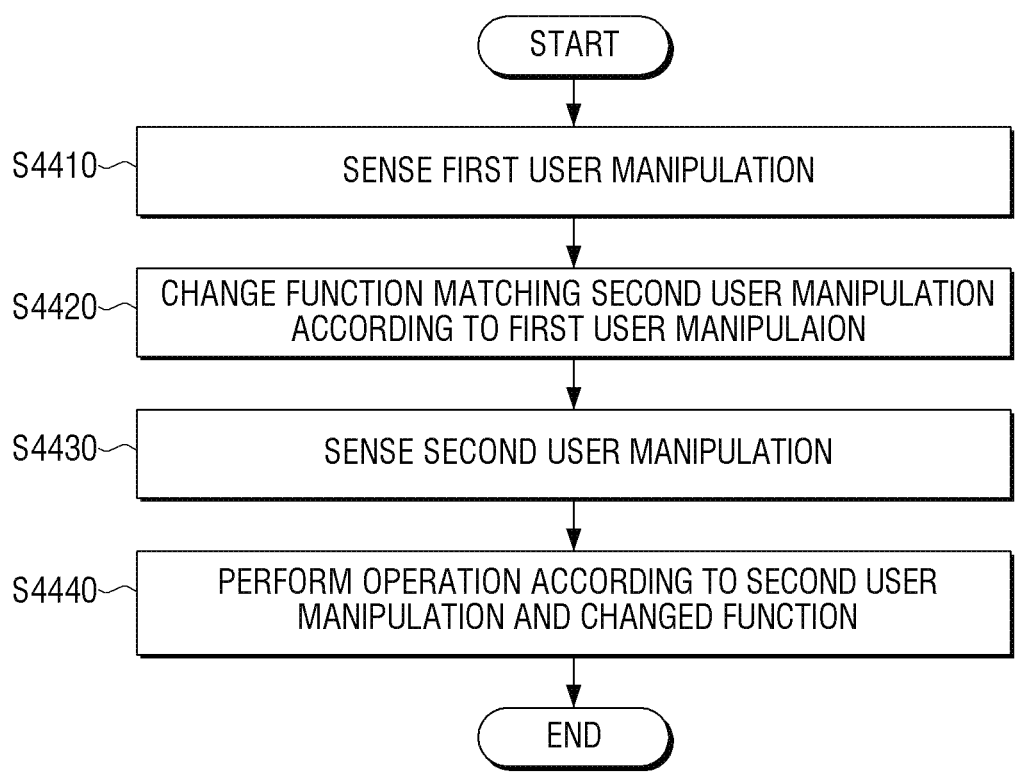

With reference to FIG. 44, the multi display apparatus 100 according to an exemplary embodiment of the present general concept may include sensing the first user manipulation (operation S4410), changing the functions matching the second user manipulation according to the first user manipulation (operation S4420), sensing a second user manipulation (operation S4430), and performing an operation according to the changed functions when the second user manipulation is sensed (operation S4440).

Herein, the second user manipulation may be a line input, and when the first user manipulation is a pinch out input, the changing the function (operation S4420) may increase the thickness of the input line, and when the first user manipulation is a pinch in input, the changing the function (operation S4420) may reduce the thickness of the input line, and when the first user manipulation is a touch & rotate input, the changing the function (operation S4420) may change the texture of the line.

In addition, in performing the aforementioned operations (operation S4330) in the exemplary embodiment illustrated in FIG. 43, if the first user manipulation is a touch & hold input, and when the second user manipulation by the touch input is sensed together with the first user manipulation, a menu corresponding to the second user manipulation may be displayed.

Figure 45:
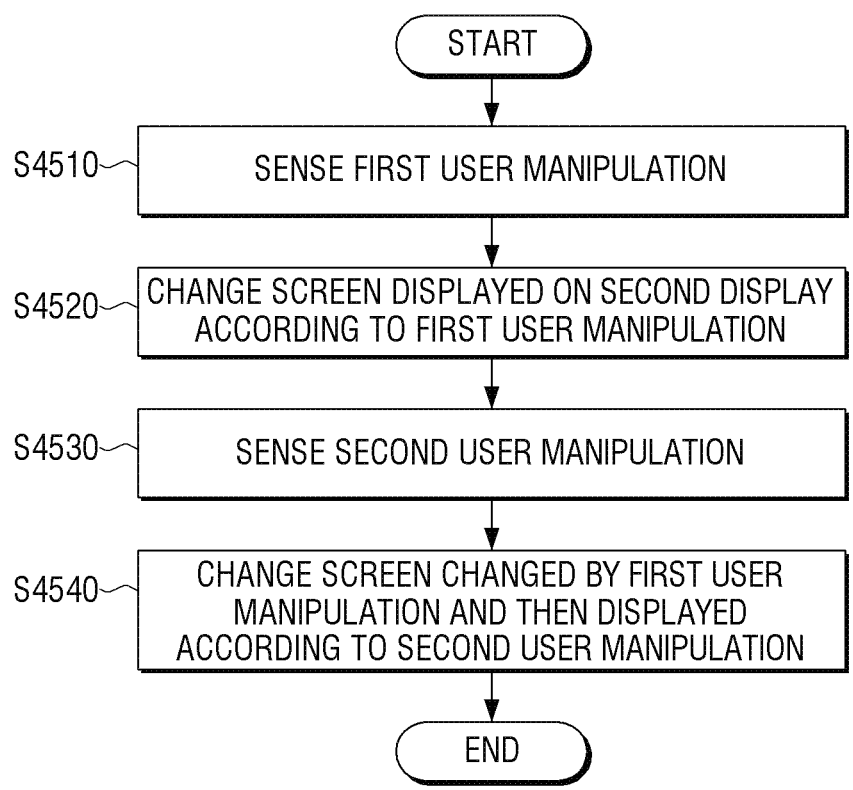

With reference to FIG. 45, the multi display method according to an exemplary embodiment of the present general concept includes sensing a first user manipulation (operation S4510), changing the screen displayed on the second display according to the first user manipulation when the first user manipulation is sensed (operation S4520), sensing a second user manipulation (operation S4530), and changing the screen which has been changed by the first manipulation and then displayed when the second user manipulation is sensed (operation S4540).

Herein, changing the screen (operation S4520) may expand the screen displayed on the second display when the first user manipulation is a pinch out input, reduce the screen displayed on the second display 190b when the first user manipulation is a pinch in input, and rotate the screen displayed on the second display when the first user manipulation is a touch & rotate input.

Figure 46:
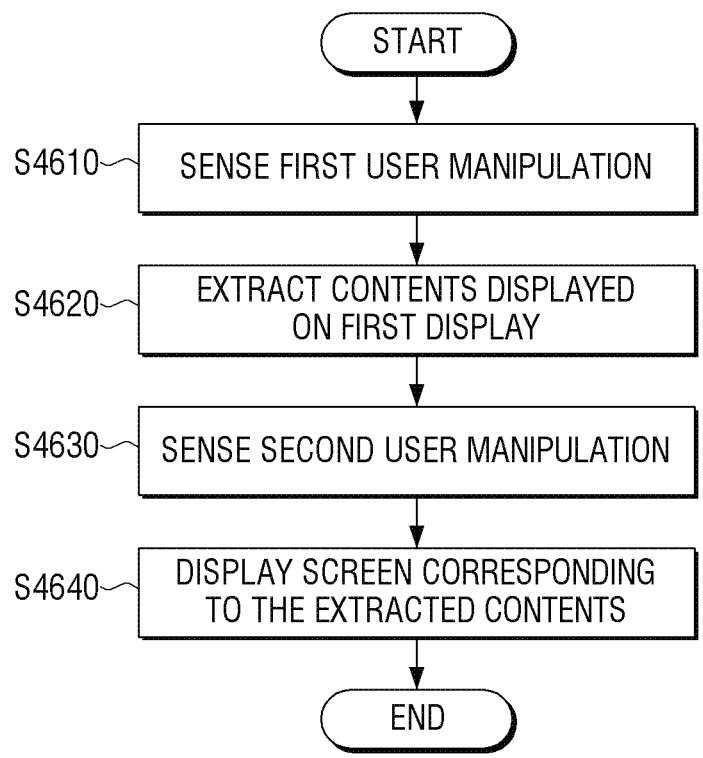

With reference to FIG. 46, the multi display method according to an exemplary embodiment of the present general concept may include sensing a first user manipulation (operation S4610), extracting contents displayed on the first display 190a when the first user manipulation is sensed (operation S4620), sensing a second user manipulation (operation S4630), and displaying a screen corresponding to the extracted contents on the second display 190b when the second user manipulation is sensed (operation S4640).

Herein, the extracting (operation S4620) may capture the screen displayed on the first display 190a according to the first user manipulation, and displaying the screen (operation S4640) may display the captured screen in the location where the second user manipulation is made on the second display 190b.

Figure 47:
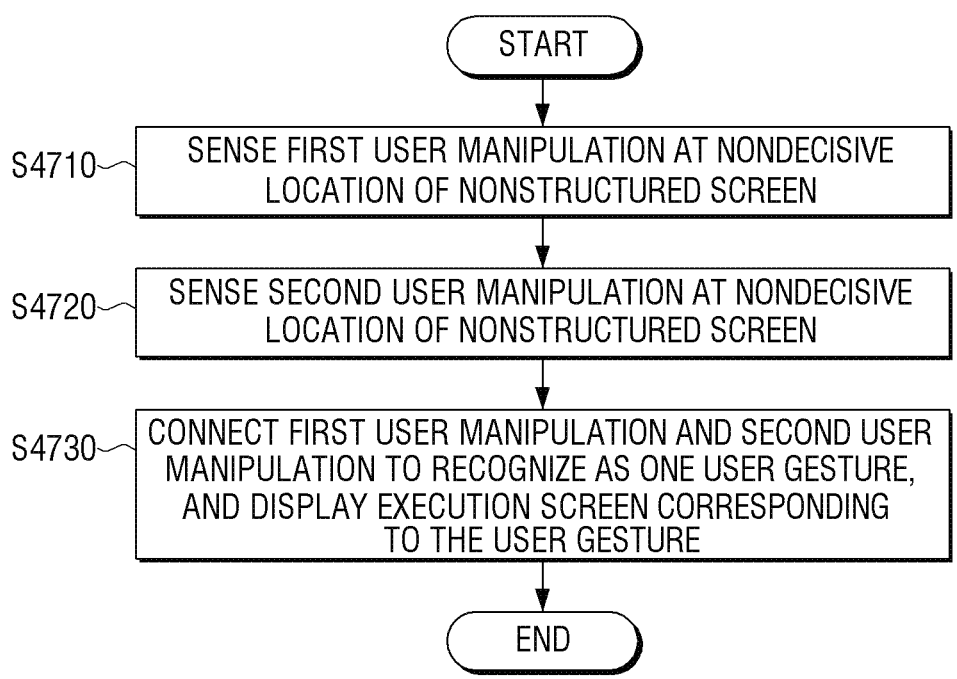

With reference to FIG. 47, the multi display method of the multi display apparatus 100 according to an exemplary embodiment of the present general concept includes sensing a first user manipulation regarding the nondecisive location of the first screen when each of the first display 190a and second display 190b displays the unstructured first screen and second screen, respectively (operation S4710), sensing the second user manipulation regarding the nondecisive location of the second screen (operation S4720), and connecting the sensed first user manipulation and second user manipulation to recognize as one user gesture, and displaying the execution screen corresponding to the user gesture at one of the first display 190a and the second display 190b (operation S4730).

In the aforementioned multi display method according to various exemplary embodiments of the present general concept, the first user manipulation may be a proximate input or touch input to the first display 190a using the user's body, and the second user manipulation may be a proximate or touch input to the second display 190b using an input pen 200.

Meanwhile, the aforementioned various multi display methods were explained to recognize the nonstructured user manipulation made for each of the plurality of displays in the multi display apparatus 100 and perform operations accordingly. However, the present general concept is not limited thereto, but rather, the nonstructured user manipulation made for each of the plurality of displays may be recognized as one user manipulation and an operation corresponding to the one user manipulation may be performed.

For example, when the user performs a drag operation from a point on the first display 190a to the second display 190b, a user manipulation is sensed in both the first display 190a and second display 190b, respectively. When the point where the user manipulation is sensed in the first display 190a and the second display 190b is within the predetermined time range and when the dragging track on the first display 190a is continuous with the dragging track on the second display 190b, the controller 130 recognizes those user manipulations as one dragging operation. Accordingly, an operation matching the dragging manipulation is performed. For example, the controller 130 may perform various operations such as for example an operation of expanding the first screen displayed on the first display 190a where the initial dragging began on the second display 190b, an operation of dividing one screen and displaying the divided screen on one or both of the first display 190a and the second display 190b, an operation of displaying one common screen on each of the first display 190a and the second display 190b, an operation of simultaneously activating or inactivating the first display 190a and the second display 190b, and an operation of turning on or off power of the multi display apparatus 100.

The aforementioned multi display method may be embodied as a program including an algorithm executable in a computer, and the program may be stored in and provided by means of a non-transitory computer readable medium.

The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general concept can be easily construed by programmers skilled in the art to which the present general concept pertains.

According to various exemplary embodiments of the present general concept, it is possible to perform unstructured independent inputting through each display of a multi display apparatus 100, and combine each input to perform an output corresponding thereto.

Although exemplary embodiments of the present general concept have been described above, it will be understood that the present general concept is not limited to these exemplary embodiments. For example, the multi display 190 of the multi display apparatus 100 does not necessarily include displays disposed on separate bodies which are physically connected to one another. For example, the first display 190a and the second display 190b may be disposed on opposite sides of a single body, similarly to the configuration illustrated in FIG. 36, but without the hinge 185, and with both displays active. This configuration would allow the multi display apparatus 100 to be made more compact. Furthermore, since user manipulations may be made in a nondecisive location on the first display 190a to affect operations of the second display 190b, the user does not need to see the first display 190a in order to control the second display 190b. For example, the first display 190a could be a touch pad that does not display a screen, and instead receives user manipulations which may modify the operation of user manipulations on the second display 190b, as described above. This configuration would allow a user to efficiently perform operations on the second display 190b without needing to hold a separate first display 190a.

Furthermore, the displays of the multi display 190 do not need to be physically connected, and may communicate wirelessly with each other through communication module 110, thereby allowing a greater degree of flexibility in the positioning of the displays. The controller 130 may determine a relative location of each display with the GPS module 115 or geomagnetic sensor 152 for example. This would allow a user of one display to perform user manipulations relative to another display. For example, a user may perform a drag operation on first display 190b in the direction of second display 190b, to perform an operation on second display 190b.

In the case of a plurality of displays, manipulations on one display can affect multiple other displays. For example, as illustrated in FIG. 48, a user of first display 190a in wireless communication (represented by the double arrow) with second display 190b and a third display 190c may perform a manipulation (a touch and hold operation) to capture content displayed on the first display 190a (see FIG. 48 view 1). Subsequently, user manipulations (for example, a double tap with an input pen 200) performed on second display 190b and third display 190c may insert the content into each corresponding display as a memo 2110 (see FIG. 48 view 2).

Figure 49:
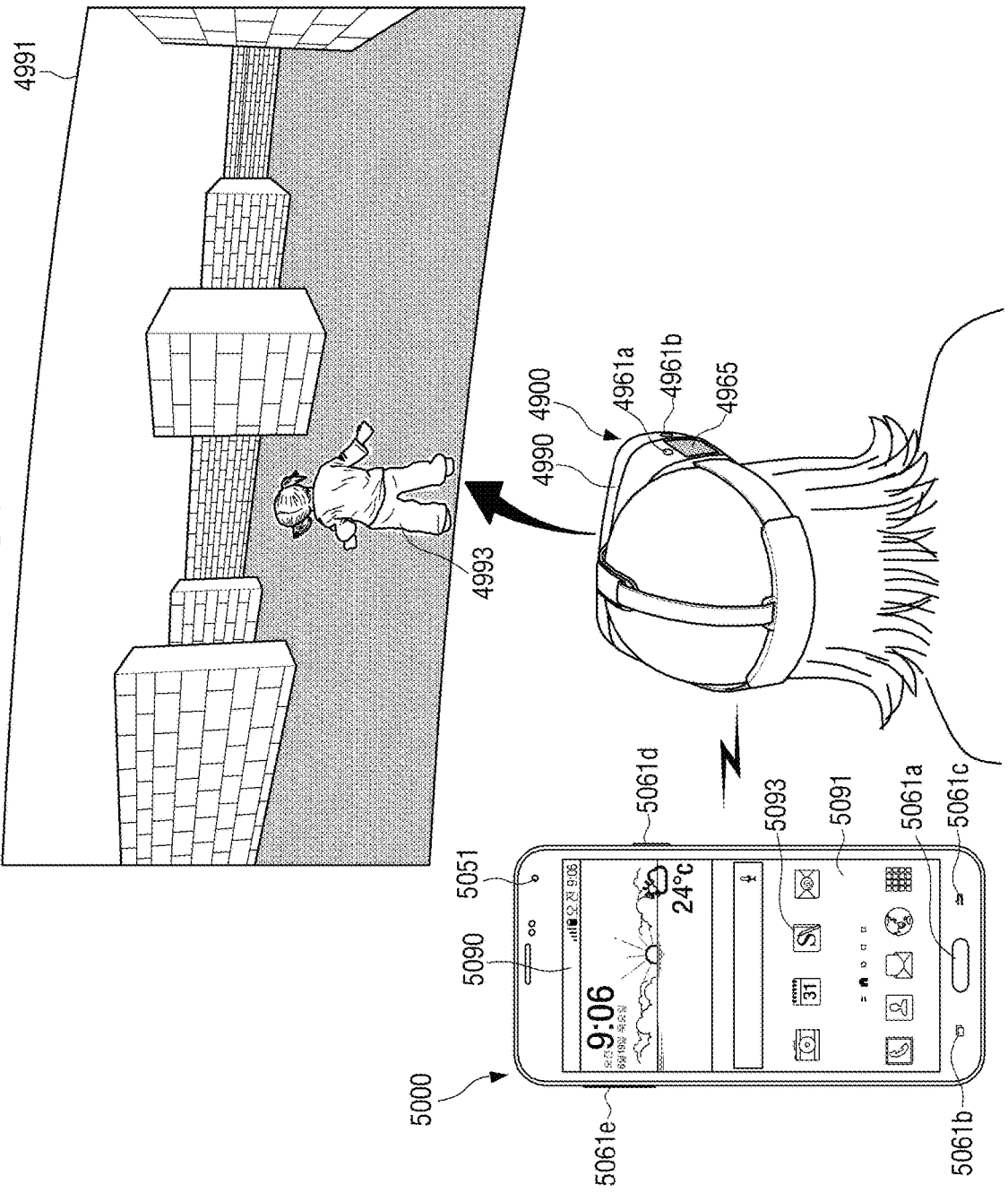
FIG. 49 is a schematic view illustrating a head mounted display apparatus and a portable apparatus according to an exemplary embodiment.

FIG. 49 is a schematic view illustrating a head mounted display apparatus and a portable apparatus, such as a cell phone, according to an exemplary embodiment.

Referring to FIG. 49, a display 4990 is located inside a front side of a housing 4900a (for example, an area which faces an eyeball of a user) of a head mounted display apparatus 4900. The display 4990 is not visible from the outside of the head mounted display apparatus 4900 (in other words, the display 4990 is not exposed to view from the outside).

The display 4990 may provided in one of an integrated form and a detachable form with respect to the head mounted display apparatus 4900. If the display 4990 is provided in a detachable form, an external apparatus with the display 4990 (for example, a portable apparatus) may be attached to or detached from the location of the display 4990. If an external apparatus with the display 4990 (for example, a portable apparatus) is mounted on the location of the display 4990, the external apparatus with the display 4990 (for example, a portable apparatus) may be connected via cable through a connector (see FIG. 50, 4964) of the head mounted display apparatus 4900 or may be connected wirelessly through a first communication unit.

FIG. 49 illustrates an example of an enlarged screen 4991 with an image displayed on the display 4990 of the head mounted display apparatus 4990. The screen displayed on the display 4990 may be one of the screens for images of a virtual reality computer game (for example, a game for solving mazes). Alternatively, the screen displayed on the display 4990 may be one of the screens of virtual reality cinema or 360° virtual reality experience.

At least one sensor of the head mounted display apparatus 4900 may detect a movement of a user head. The head mounted display apparatus 4900 may provides the user with an image corresponding to the detected head movement through the display 4990.

The head mounted display apparatus 4900 may be connected to a peripheral external apparatus (for example, a portable apparatus, 5000) with wire or wirelessly. The external apparatus 5000 may receive a user input (for example, a touch or a touch gesture) through a touch screen 5090. The external apparatus 5000 may generate a control command corresponding to the received user input and transmit the command to the head mounted display apparatus 4900. The head mounted display apparatus 4900 may control the screen 4991 displayed on the display 4990 or a virtual character (for example, an avatar, 4993) displayed on the screen 4991.

Figure 50:
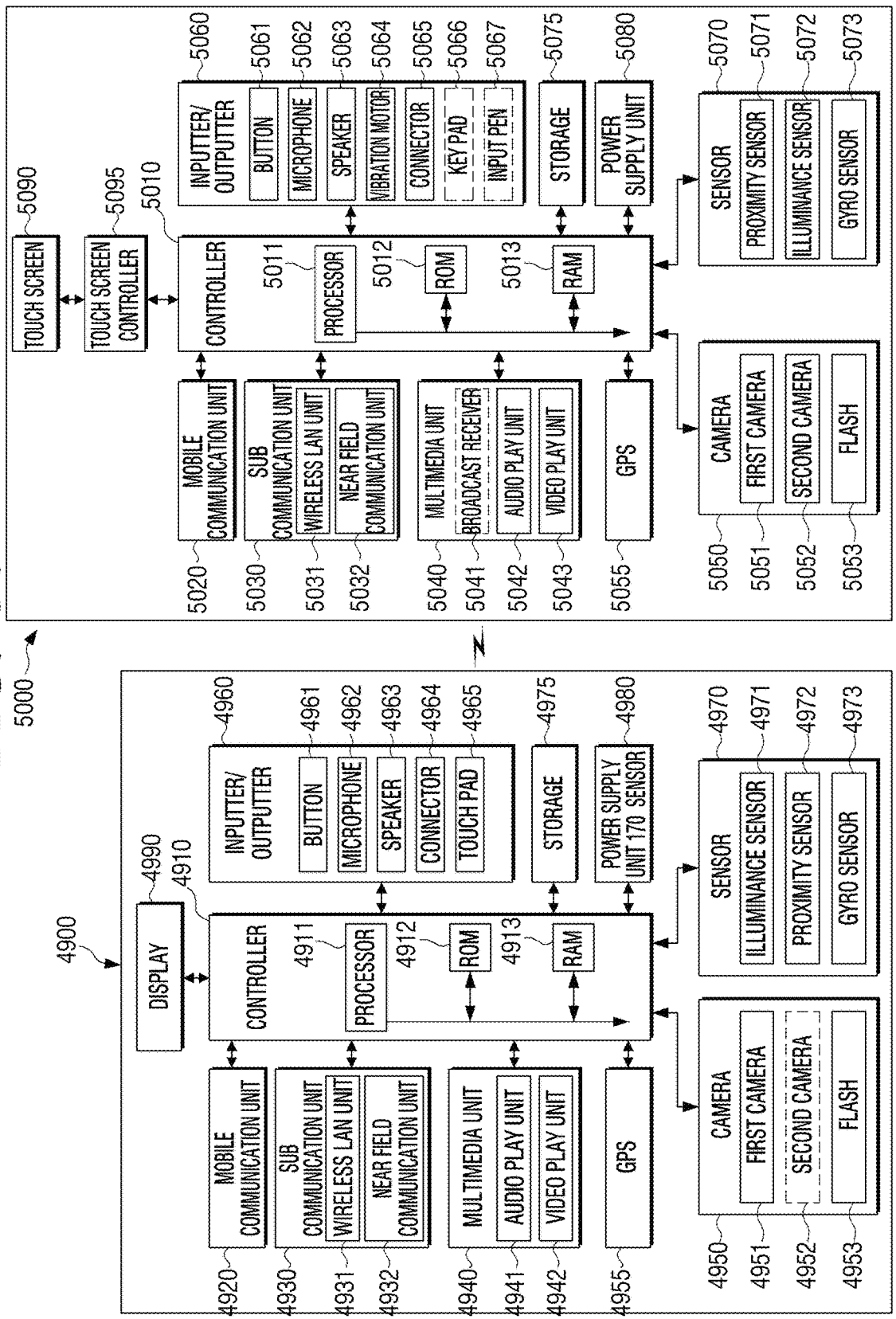
FIG. 50 is a schematic block diagram illustrating a head mounted display apparatus and a portable apparatus according to an exemplary embodiment.

FIG. 50 is a schematic block diagram illustrating a head mounted display apparatus and a portable apparatus according to an exemplary embodiment.

Referring to FIG. 50, the head mounted display apparatus 4900 may be connected to an external apparatus (not illustrated) with wire or wirelessly using a mobile communication unit 4920, a sub communication unit 4930, and a connector 4965. The external apparatus may include a mobile phone, a smart phone, a tablet PC, an MP3 player, a video player, a tablet apparatus, an electronic black board, a display apparatus, etc. The display apparatus may be realized as an analog TV, a digital TV, a 3D-TV, a smart TV, an LED TV, an OLED TV, a plasma TV, a monitor, a curved TV with a screen having fixed curvature, flexible TV with a screen having fixed curvature, bended TV with a screen having fixed curvature, and/or a TV with variable curvature of which curvature of the current screen is changeable according to a user input received. The external apparatus may include an electronic apparatus which is capable of receiving a user input (or a user interaction such as voice, motion, touch, or touch gesture). In addition, the external apparatus may include a portable apparatus which is capable of detecting another head mounted display apparatus (not illustrated) or a user input. Those skilled in the art may easily understand that the external apparatus is not limited to the above apparatuses.

The head mounted display apparatus 4900 may include an apparatus which is capable of transmitting/receiving data (for example, image, text, voice, video, etc.) which is input through another connectable external apparatus and the head mounted display apparatus 4900, respectively. In addition, the head mounted display apparatus 4900 may change an operation or action (image command) of a virtual character within content displayed on the display 4990 using a user input (or a user interaction such as voice, motion, touch, or touch gesture) which is input through another connectable external apparatus and the head mounted display apparatus 4900, respectively.

The head mounted display apparatus 4900 may include the display 4990. In addition, the head mounted display apparatus 4900 may have a detachable external apparatus (not illustrated) with a display (not illustrated). The head mounted display apparatus 400 where the external apparatus (not illustrated) with a display (not illustrated) may be attached/detached may not have the display 4990.

The head mounted display apparatus 4900 may include a controller 4910, a mobile communication unit 4920, a sub communication unit 4930, a multimedia unit 4940, a camera 4950, a GPS 4955, an inputter/outputter 4960, a sensor 4975, and a power unit 4980.

The sub communication unit 4930 may include at least one of a wireless LAN unit 4931 and a near field communication unit 4932, and the multimedia unit 4940 may include at least one of an audio play unit 4941 and a video play unit 4942. The camera 4950 may include at least one of a first camera 4941 and a second camera 4952, the inputter/outputter 4960 may include at least one of a button 4961, a microphone 4962, a speaker 4963, a connector 4963, and a touch pad 4965, and the sensor 4970 may include an illumination sensor 4971, a proximity sensor 4972, and a gyro sensor 4973.

The controller 4910 may include a processor 4911, a ROM 4912 storing a control program to control the head mounted display apparatus 4900, and a RAM 4913 storing a signal or data input from outside of the head mounted display apparatus 4900 as well as data of the head mounted display of various jobs performed in the head mounted display apparatus 4900.

The controller 4910 controls overall operations of the head mounted display apparatus 4900 and flow of signals between internal elements 4920 to 4995 of the head mounted display apparatus 4900 and processes data. The controller 4910 controls supply of power from the power unit 4980 to the internal elements 4920 to 4995. If there is a user input or if a predetermined condition is satisfied, the controller 4990 may execute an Operating System (OS) and various applications stored in the storage 4975.

The graphic processor 4911 may include a Graphic Processing Unit (GPU) (not illustrated) for graphic processing. In the processor 4911, a core (not illustrated) and GPU (not illustrated) may be realized as System On Chip (SoC). The processor 4911 may include a single core, a duel core, a triple core, a quad core, and other multiple cores. In addition, the processor 4911, the ROM 4912 and the RAM 4913 may be interconnected through an internal bus.

The controller 4910 may control the mobile communication unit 4920, the sub communication unit 4930, the multimedia unit 4940, the camera 4950, the GPS 4955, the inputter/outputter 4960, the sensor 4970, the storage 4975, the power unit 4980, and the display 4990.

The term "controller" in an exemplary embodiment may include the processor 4911, the ROM 4912, and the RAM 4913.

The controller according to an exemplary embodiment may control to execute of produce a content in a head mounted display apparatus and change an operation of a virtual character displayed in the content corresponding to combination of a first touch detected on a touch pad of the head mounted display apparatus and a second touch detected on a touch screen of the portable apparatus.

The controller may control to receive a control packet corresponding to the second touch (information) from the portable apparatus.

The controller may include a touch gesture in the first touch and a touch gesture in the second touch.

The controller may control to change a peripheral object of the virtual character corresponding to an operation of the virtual character.

The controller may control an operation of the virtual character corresponding to the combination of a plurality of touches to be one of intensification of an operation of the virtual character and weakening of an operation of the virtual character.

The controller may control an operation of the virtual character corresponding to combination of the first touch and the second touch to be distinguished or different from an operation of the virtual character corresponding to the first touch.

The controller may control a speed of moving of the virtual character to be changed corresponding to a speed of a continuous movement of the first touch.

The controller may control to move the virtual character corresponding to a distance of or traversed by a continuous movement of the first touch.

The controller may control to provide at least one of a visual feedback and an auditory feedback in response to change of an operation of the virtual character.

The controller may control to calculate at least one of a direction of a continuous movement, a distance of a continuous movement, and a speed of a continuous movement of the first touch.

The controller may control to change an operation of the virtual character corresponding to at least one of the calculated direction of a continuous movement, distance of a continuous movement, and speed of a continuous movement of the first touch.

The controller may control to move the virtual character in one of upper, lower, left, and right directions corresponding to a location of the first touch on the touch pad.

The mobile communication unit 4920 may be connected to an external apparatus wirelessly using one or more antennas under the control of the controller. The mobile communication unit 4920 may transceive a wireless signal for voice call, a video call, an SMS, an MMS, and a data communication with respect to a mobile phone (not illustrated) with a connectable telephone number, a smart phone (not illustrated), a tablet PC or other head mounted display apparatuses (not illustrated).

The sub communication unit 4930 may include at least one of the wireless LAN unit 4931 and the near field communication unit 4932. For example, the sub communication unit 4930 one of or both of the wireless LAN unit 4931 and the near field communication unit 4932.

The wireless LAN unit 4931 may be connected to an Access Point (AP) wirelessly at a place where the AP (not illustrated) is installed under the control of the controller. The wireless LAN unit 4931 supports IEEE802.11x of IEEE.

The near field communication unit 4932 may perform near field communication between the head mounted display apparatus 4900 and an external apparatus wirelessly within an AP under the control of the controller. The near field communication may include Bluetooth, Bluetooth low energy, Infrared communication (IrDA, infrared data association), W-Fi, Ultra Wideband (UWB), Near Field Communication (NFC), etc.

The head mounted display apparatus 4900 may include at least one of the mobile communication unit 4920, the wireless LAN unit 4931, and the near field communication unit 4932 depending on its performance. For example, the head mounted display apparatus 4900 may include one of the mobile communication unit 4920, the wireless LAN unit 4931, and the near field communication unit 4932 or combination of the mobile communication unit 4920, the wireless LAN unit 4931, and the near field communication unit 4932 depending on its performance.

The term "first communication unit" in an exemplary embodiment may include the mobile communication unit 4920 and the sub communication unit 4930.

A first communication unit according to an exemplary embodiment may connect the head mounted display apparatus 4900 to an external apparatus (for example, a portable apparatus) under the control of the controller. The first communication unit may transmit data or content to an external apparatus under the control of the controller. In addition, the first communication unit may transmit/receive data to/from an external apparatus under the control of the controller. Further, the first communication unit may receive illumination information from an external apparatus under the control of the controller.

The multimedia unit 4940 may include an audio play unit 4941 and a video play unit 4942.

The audio play unit 4942 may play an audio source pre-stored in the storage 4975 of the head mounted display apparatus 4900 or received from the outside (for example, an audio file included in a computer game or an audio file whose filename extension is mp3, wma, ogg or way) using an audio codec under the control of the controller.

The audio play unit 4942 according to an exemplary embodiment may play audio feedback (for example, output of an audio source stored in a storage, etc.) corresponding to change of an operation (or change of a location) of a virtual character using an audio codec under the control of the controller. The audio play unit 4942 according to an exemplary embodiment may play an audio feedback (for example, output of an audio source stored in a storage, etc.) corresponding to intensification or weakening of an operation of the virtual character 4993 using an audio codec under the control of the controller.

The video play unit 4943 may play a digital video source pre-stored in the storage 4975 of the head mounted display apparatus 4900 or received from outside (for example, a file included in a computer game or a file whose filename extension is mpeg, mpg, mp4, avi, mov, swf, fla, or mkv) using a video codec under the control of the controller. An application including computer games executable in the head mounted display apparatus 4900 may play an audio source or a video file using an audio codec unit or a video codec. In addition, most of applications executable in the head mounted display apparatus 4900 may play an audio source or a still image file.

The video play unit 4943 according to an exemplary embodiment may play visual feedback (for example, output of a video source stored in a storage, etc.) corresponding to change of an operation (or change of a location) of the virtual character 4993 using a video codec under the control of the controller. The video play unit 4943 according to an exemplary embodiment may play audio feedback (for example, output of an audio source stored in a storage, etc.) corresponding to intensification or weakening of an operation of the virtual character 4993 using an audio codec under the control of the controller. The video play unit 4943 according to an exemplary embodiment may play a visual feedback (for example, output of a video source stored in a storage, etc.) corresponding to intensification or weakening of an operation of the virtual character 4992 using a video codec under the control of the controller.

Those skilled in the art may easily understand that various types of video and audio codec have been produced and sold.

At least one of the audio play unit 4942 and the video play unit 4943 of the multimedia unit 4940 may be included in the controller. In an exemplary embodiment, the term "video codec" may include one or more video codecs. Likewise, in an exemplary embodiment, the term "audio codec" may include one or more audio codecs.

The camera 4950 may photograph a still image or a moving image in an eye-sight direction of a user under the control of the controller. The camera 4950 may be located at a front side (for example, in an eye-sight direction) of the housing 4900a of the head mounted display apparatus 4900. If the head mounted display apparatus 4900 includes one camera, the camera 4950 may include a first camera 4951. If the head mounted display apparatus 4900 includes two cameras, the camera 4950 may include the first camera 4951 and a second camera 4952.

If the first camera 4951 capable of photographing a subject or a scene in a user's eye-sight direction is adjacent to the second camera 4952 (for example, if the distance between the first camera 4951 and the second camera 4952 is wider than 2 cm and narrower than 8 cm), the first camera 4951 and the second camera 4952 may photograph a 3-dimensional still image or a 3-dimensional moving image under the control of the controller. In addition, one of the first camera 4951 and the second camera 4952 may perform wide angle, telephoto and close-up photography using a separate adaptor (not illustrated).

The camera 4950 according to an exemplary embodiment may photograph a surrounding still image or a moving image of the head mounted display apparatus 4900 and transmit the image to the controller. The controller may transmit the received still image or moving image to the outside through the first communication unit.

The controller may generate a control command for controlling the head mounted display apparatus 4900 using the received still image or moving image. The controller may control the head mounted display apparatus 4900 to correspond to the generated control command. In addition, the controller may calculate surrounding illumination of the head mounted display apparatus 4900 using the still image or moving image received from the camera 4950.

The GPS 4955 receives information (for example, exact spatial location information and time information of a GPS satellite from which the head mounted display apparatus 4900 can receive information) periodically from a plurality of GPS satellites (not illustrated). The head mounted display apparatus 4900 may find out the current location and speed or time of movement of the head mounted display apparatus 4900 using the information received from a plurality of GPS satellites.

The inputter/outputter 4960 may include one or more buttons 4961, one or more microphones 4962, one or more speakers 4963, one or more connectors 4964, or one or more touch pads 4965.

Referring to the head mounted display apparatus 4900 illustrated in FIGS. 49 and 50, the button 4961 may include a back button 4961*a* and a volume button 4961*b* in housing 4910*a*. The button 4961 may include a power button 4961*c* located at the housing 4900*a*. In addition, the button 4961 may be realized not only as a physical button but also as a touch button in the housing 4900*a* of the head mounted display apparatus 4900.

The microphone 4962 receives a voice or sound from the outside and generates an electrical signal under the control of the controller. The electrical signal generated in the microphone 4962 may be converted in an audio codec into audio data and stored in the storage 4975, which may be transmitted to the controller or output through the speaker 4963. The controller may recognize the received electrical signal. The controller may generate a control command for controlling the head mounted display apparatus 4900 using a recognized voice. The controller may control the head mounted display apparatus 4900 to correspond to the generated control command.

One or more microphones 4962 may be located at or in the housing 4900*a* of the head mounted display apparatus 4900.

The speaker 4963 may output sound corresponding to various content (for example, a wireless signal, a broadcast signal, an audio source, a video file photographing, a picture taking, game, etc.) of the first communication unit processed through an audio codec, the multimedia unit 4940, the camera 4950 or an application outside of the head mounted display apparatus 4900. The speaker 4963 may output sound corresponding to a function performed by the head mounted display apparatus 4900 (for example, a touch manipulation sound corresponding to an input of a telephone number, a back button manipulation sound, a volume button manipulation sound, or a photography manipulation sound).

At least one speaker 4963 may be located at or in the housing 4900*a* of the head mounted display apparatus 4900. Referring to the head mounted display apparatus 4900 illustrated in FIGS. 49 and 50, the speaker 4963 may be located at or in the housing 4900*a* of the head mounted display apparatus 4900, which is close to a user's ear. In addition, the speaker 4963 may include an air conduction speaker or a bone conduction speaker.

The speaker 4963 according to an exemplary embodiment may output audio feedback corresponding to change of an operation (or change of a location) of the virtual character 4993 under the control of the controller. The speaker 4963 according to an exemplary embodiment may output audio feedback corresponding to intensification of an operation of the virtual character 4993 under the control of the controller.

The connector 4964 may be an interface (for example, High-Definition Multimedia interface port, not illustrated) or an USB input jack (not illustrated) to connect the head mounted display apparatus 4900 to an external apparatus (not illustrated). In addition, the connector 4964 may provide an interface to connect the head mounted display apparatus 4900 to a power source (not illustrated). The head mounted display apparatus 4900 may transmit data stored in the storage 4975 to an external apparatus or receive data from an external apparatus through a cable connected to the connector 4964 under the control of the controller. The head mounted display apparatus 4900 may receive power from an external source (not illustrated) or recharge a battery (not illustrated) through a cable connected to the connector 4964.

The touch pad 4965 may receive a user input (for example, touch, touch gesture, etc.) to control the head mounted display apparatus 4900. The touch pad 4965 may include a built-in sensor capable of detecting a user input in a plate (for example, in the shape of polygon, oval or rounded rectangle). The touch pad 4965 is located at or on a side of the housing 4900*a* of the head mounted display apparatus 4900.

The user input is not limited to a contact input of a user's body part or a touchable input pen (for example, a stylus pen), and may include a non-contact input (for example, hovering where a detectable distance between a user's body part or an input pen and the touch pad 4965 may be less than about 20 mm). Those skilled in the art may easily understand that the detectable distance of a non-contact input in the touch pad 4965 may vary depending on the performance or structure of the head mounted display apparatus 4900.

The head mounted display apparatus 4900 may include one of a track ball (not illustrated) and a pointing stick (not illustrated), which is compatible with the touch pad 4965.

The sensor 4970 may include at least one sensor capable of detecting the state of the head mounted display apparatus 400 or the stage around the head mounted display apparatus 400. For example, the sensor 4970 may be located inside the housing (for example, an area which faces an eyeball), at a front side (for example, an area in a eye-sight direction) or on a side of the head mounted display apparatus 4900. The sensor 4970 may include an illumination sensor 4971 capable of detecting the amount of light around the head mounted display apparatus 4900, a proximity sensor 4972 capable of detecting an approach of another object (for example, a user's body part including a head) to the head mounted display apparatus 4900, a gyro sensor 4973 capable of detecting a gradient of the head mounted display apparatus 4900 using rotary inertia of the head mounted display apparatus 4900, an acceleration sensor (not illustrated) capable of detecting a movement state of three axes (for example, x axis, y axis, and z axis) of the head mounted display apparatus 4900, a gravity sensor (not illustrated) capable of detecting a direction of gravity, or an altimeter (not illustrated) capable of measuring a pressure of the atmosphere and detecting altitude.

The illumination sensor 4971 according to an exemplary embodiment detects surrounding illumination of the head mounted display apparatus 4900. The illumination sensor 4971 may transmit an illumination signal corresponding to the detected illumination to the controller under the control of the controller.

A plurality of sensors included in the sensor 4970 may be realized as a separate chip or a single chip (for example, a 6-axis sensor including a geomagnetic sensor and an acceleration sensor or a 9-axis sensor including a geomagnetic sensor, an acceleration sensor and a gyro sensor).

Those skilled in the art may easily understand that a sensor of the sensor 4970 may be added or removed depending on the performance of the head mounted display apparatus 4900.

The storage 4975 may store signals or data which are input/output in response to an operation of the first communication unit, the multimedia unit 4940, the camera 4950, the GPS 4955, the inputter/outputter 4960, the sensor 4970 or the display 4990. The storage 4975 may store control programs for controlling the head mounted display apparatus 4900 or the controller and applications and content provided by a manufacturer or from outside. In addition, the storage 4975 may store images, user information, documents, database or related data for providing a graphic user interface (GUI) corresponding to the control programs, applications or contents.

The term "storage" according to an exemplary embodiment may include a memory card (not illustrated) (for example, a micro SD card and a memory stick) mountable in the storage 4975, the ROM 4912 and the RAM 4913 within the controller or the head mounted display apparatus 4900. The storage may include non-volatile memory, volatile memory, hard disk drive (HDD) or sold state drive (SSD).

The storage according to an exemplary embodiment may store a command, a command list, a notification, text (for example, Yes or No), an icon, an object, an application screen, which are displayed on the display 4990, and content information (for example, for solving mazes, etc.) screen data, or various sub screens, which are displayed on an application screen, etc.

The storage may store apparatus information of the head mounted display apparatus 4900, first touch information or first touch gesture information.

The storage may store a control packet corresponding to portable apparatus information received from the portable apparatus 5000, touch pad application information, 11$^{th}$ touch information (or 11$^{th}$ gesture information).

The storage may store an example of an operation of a virtual character. For example, the storage may store an example of an operation or action of a virtual character corresponding to a touch (or a touch gesture) which can be input to a touch pad as illustrated in FIG. 53A. In addition, the storage may store an example of an operation or command of a virtual character corresponding to a touch (or a touch gesture) of a portable apparatus and a touch (or a touch gesture) which can be input to a touch pad of a head mounted display apparatus as illustrated in FIG. 53B.

The storage may store visual feedback (for example, a video source, etc.) and audio feedback (for example, a sound source, etc.) which is output from the speaker 4963 and recognizable by a user in response to a change of an operation (or a location) of a virtual character.

The power unit 4980 may supply power to elements 4920 to 4975 which are located within the head mounted display apparatus 100. The power unit 4890 may supply power and recharge one or more batteries (not illustrated) under the control of the controller. The power unit 4980 may supply power input from an external power source (not illustrated) to the head mounted display apparatus 4900 through a cable (not illustrated) which is connected to the connector 4965 under the control of the controller. The power unit 4980 may include a battery (not illustrated).

The power unit 4980 may supply power to the head mounted display apparatus 4900 through or via wireless recharging (for example, using a magnetic resonance method, an electromagnetic method, or a magnetic induction method) under the control of the controller.

The display 4990 may provide a user with various services (for example, a video call, a data transmission, still image photography, moving image photography, or screen of content executed or produced) and GUIs corresponding to services under the control of the controller. The display 4990 may provide a user with a GUI (graphical user interface) corresponding to a user input which is input through the button 4961, the microphone 4962, the touch pad 4965, and the sensor 4970.

The display 4990 may include a plurality of pixels and provide an image through the pixels. For example, the display 4990 may include a liquid-crystal display (LCD) method, an Organic LED method, a Light Emitting Diode (LED) method, etc.

Some of the elements illustrated in the head mounted display apparatus 4900 of FIGS. 49 and 50 may be removed or at least one element may be added depending on the performance of the head mounted display apparatus 4900. In addition, those skilled in the art may easily understand that the location of the elements may be changed depending on the performance and structure of the head mounted display apparatus 4900.

Referring to FIGS. 49 and 50, the head mounted display apparatus 4900 may be connected to the portable apparatus 5000 which may be one of plural external apparatuses with wire or wirelessly. The portable apparatus 5000 may be connected to the head mounted display apparatus 4900 using a mobile communication unit 5020, a sub communication unit 5030 and a connector 5065 with wire or wirelessly. The portable apparatus 5000 may include a mobile phone (not illustrated), a smart phone (not illustrated), an MP3 player, a video player, a tablet PC, a wearable apparatus, an electronic black board, a display apparatus (not illustrated), etc.

The portable apparatus 5000 refers to an electronic apparatus which may include a touch screen or user interface, and may transmit or receive data (or contents) to or from the outside through the communication unit 4920 or 4930. The portable apparatus 5000 refers to an electronic apparatus which may include an input pen or a touch screen, and may transmit or receive data (or contents) to or from the outside through the communication unit 4920 or 4930. The portable apparatus 5000 refers to an electronic apparatus which may include a display (not illustrated) (for example, a display having only a display panel, not a touch panel), and may transmit or receive data (or contents) to or from the outside through the communication unit 4920 or 4930. In addition, the portable apparatus 5000 may include an electronic apparatus capable of transmitting or receiving data (or contents) to or from an external apparatus using a user input which is input from the touch screen 4990. The portable apparatus 5000 may include one or more touch screens. In addition, the portable apparatus 5000 may include a touch screen which is divided into a plurality of portions or touch regions.

The portable apparatus 5000 may include a controller 5010, the mobile communication unit 5020, the sub communication unit 5030, a multimedia unit 5040, a camera 5050, a GPS 5055, an inputter/outputter 5060, a sensor 5070, a storage 5075, and a power unit 5080. The portable apparatus 5000 may include a touch screen and a touch screen controller 5095.

The controller 5010 may store signals or data input from the outside of a ROM 5012 and the portable apparatus 5000 where a control program for controlling a processor 5011 and the portable apparatus 5000 is stored, or may include a RAM 5013 which is used as a storage area with respect to various jobs performed in the portable apparatus 5000.

The controller 5010 controls overall operations of the portable apparatus 5000, controls flow of signals between internal elements 5020 to 5095 of the portable apparatus

5000, and processes data. The controller 5010 controls power supply to the internal elements 5020 to 5095 using the power unit 5080. In addition, if there is a user input or conditions which are set and stored are satisfied, the controller 5010 may execute an Operation System (OS) or an application stored in the storage 5075.

The processor 5011 may include a GPU (not illustrated) for graphic processing. The processor 5011 may be realized in the form of SoC which may include a core (not illustrated) and a GPU (not illustrated). The processor 5011 may include a single core, a duel core, a triple core, a quad core and a multiple core. In addition, the processor 5011, the ROM 5012 and the RAM may be interconnected through a bus.

The controller 5010 may control the mobile communication unit 5020, the sub communication unit 5030, the multimedia unit 5040, the camera 5050, the GPS 5055, the inputter/outputter 5060, the sensor 5070, the storage 5075, the power unit 5080, the touch screen 5090 and the touch screen controller 5095.

The controller 5010 according to an exemplary embodiment connects a peripheral head mounted display apparatus, executes a touch pad application, and transmits to the head mounted display apparatus a control packet corresponding to a touch received by the touch pad application through the communication unit.

If the head mounted display apparatus is connected to the portable apparatus, the controller 5010 may control to receive apparatus information and content information of the head mounted display apparatus.

If the head mounted display apparatus is connected to the portable apparatus, the controller 5010 may control to execute the touch pad application.

The controller 5010 may control to execute the touch pad application corresponding to the content information received from the head mounted display apparatus.

The term "controller" according to an exemplary embodiment may include the processor 5011, the ROM 5012, and the RAM 5013.

The mobile communication unit 5020 may be connected to the head mounted display apparatus 4900 through a mobile communication network using one or more antennas under the control of the controller 4900. The mobile communication unit 4920 may transceive a wireless signal for voice call, a video call, an SMS, an MMS, and a data communication with respect to an external apparatus including connectable telephone numbers, for example, a mobile phone (not illustrated), a smart phone (not illustrated), a tablet PC or other portable apparatuses (not illustrated).

The sub communication unit 5030 may include at least one of a wireless LAN unit 5031 and a near field communication unit 5032. For example, the sub communication unit 5030 may include only one of the wireless LAN unit 5031 and the near field communication unit 5032, or both of the wireless LAN unit 5031 and the near field communication unit 5032.

The wireless LAN unit 5031 may be connected to an AP wirelessly at a place where the AP is installed under the control of the controller. The wireless LAN unit 5031 supports IEEE802.11x of IEEE. The near field communication unit 5032 may perform near field communication between the portable apparatus 5000 and the head mounted display apparatus 4900 without an AP under the control of the controller. The near field communication may include Bluetooth, Bluetooth low energy, Infrared communication (IrDA, infrared data association), Ultra Wideband (UWB), Near Field Communication (NFC), etc.

The term "second communication unit" according to an exemplary embodiment may include the mobile communication unit 5020 and the sub communication unit 5030.

The multimedia unit 5040 may include a broadcast receiver 5041, an audio play unit 5042 or a video play unit 5043. The broadcast receiver 5041 may receive a broadcast signal (for example, TV broadcast signal, radio broadcast signal or data broadcast signal) and broadcast additional information (for example, an Electric Program Guide (EPS) or an Electric Service Guide (ESG)) transmitted from an external broadcasting station through an antenna (not illustrated) under the control of the controller. In addition, the controller may play the received broadcast signal and broadcast additional information using touch screen, video codec, and audio codec.

The audio play unit 5042 may play an audio source (for example, files having mp3, wma, ogg or way as file extensions) pre-stored in the storage 5075 of the portable apparatus 5000 or received from outside using an audio codec under the control of the controller.

The audio play unit 5042 according to an exemplary embodiment may play audio feedback (for example, output of an audio source stored in a storage, etc.) corresponding to a touch or a consecutive movement of a touch or a consecutive movement of a touch detected on the touch screen 5090 using an audio codec under the control of the controller.

The video play unit 5043 may play a digital video source (for example, files having mpeg, mpg, mp4, avi, mov, or mkv as file extensions) pre-stored in the storage 5075 of the portable apparatus 5000 or received from outside using a video codec under the control of the controller. A multimedia application installable in the portable apparatus 5000 may play an audio source or a video file using an audio codec and/or a video codec.

The video play unit 5043 according to an exemplary embodiment may play a visual feedback (for example, output of a video source stored in a storage, etc.) corresponding to a touch or a consecutive movement of a touch detected on the touch screen 5090 using a video codec under the control of the controller.

The camera 5050 may include at least one of a first camera (5051 of FIG. 49) on the front side and a second camera (5052 of FIG. 50) on the rear side, which photographs a still image or a moving image under the control of the controller. For example, the camera 5050 may include one of or both of the first camera 5051 and the second camera 5052. In addition, the first camera 5051 or the second camera 5052 may include an auxiliary light source (for example, a flash 5053) which provides amount of light required to perform photographing.

The GPS 5055 receives information (for example, exact spatial location information and time information of a GPS satellite from which the head mounted display apparatus 4900 can receive information) periodically from a plurality of GPS satellites (not illustrated) on the earth's orbit. The portable apparatus 5000 may check location, speed or time of movement of the portable apparatus 5000 using information received from a plurality of GPS satellites.

The inputter/outputter 5060 may include at least one of one or more buttons 5061, microphone 5062, speaker 5063, vibration motor 5064, connector 5065, keypad 5066, and input pen 5067.

Referring to FIGS. 49 and 50, the button 5061 may include a home button 5061a on the lower part of the front side, a menu button 5061b, and a return button 5061c. The button may include a power/lock button 5061d on the side 5000b and at least one volume button 5061e. In addition, the button 5061 of the portable apparatus 5000 may include only the home button 5061a. The button 5061 of the portable apparatus 5000 may be realized not only as a physical button but also as a touch button on a bezel outside of the touch screen 5090. In addition, the button 5061 of the portable apparatus 5000 may be displayed in the form of text, image or icon on the touch screen 5090.

The microphone 5062 receives voice or sound from the outside and generates an electric signal under the control of the controller. The electric signal generated in the microphone 5062 may be converted in an audio codec into audio data, and the converted signal may be stored in the storage 5075 or output through the speaker 5063. One or more microphones 5062 may be located on the front, side and rear of the portable apparatus 5000. In addition, one or more microphones 5062 may be located only at the side of the portable apparatus 5000.

The speaker 5063 may output sound corresponding to various signals (for example, a wireless signal, a broadcast signal, an audio source, a video file, photographs of pictures, etc.) of the second communication unit, the multimedia unit 5040 or the camera 5050 to the outside of the portable apparatus 5000 using an audio codec under the control of the controller.

The speaker 5063 according to an exemplary embodiment may output audio feedback corresponding to a user input which is received from the touch pad 5064 under the control of the controller.

The vibration motor 5064 may convert an electric signal to mechanical vibration under the control of the controller. The vibration motor 5064 may include a linear vibration motor, a bar-type vibration motor, a coin-type vibration motor or a piezoelectric element vibration motor. One or more vibration motors 5064 may be located at or in the portable apparatus 5000. In addition, the vibration motor 5064 may cause the entire part of the portable apparatus 5000 to vibrate or cause only part of the portable apparatus 5000 to vibrate.

The vibration motor 5064 according to an exemplary embodiment may output a tactile feedback corresponding to a user input (for example, a touch or a touch gesture) which is received from the touch screen 5090 under the control of the controller. In addition, the vibration motor 5064 may provide various tactile feedbacks which are pre-stored or received from an external apparatus based on a control command of the controller.

The connector 5065 may be used as interface to connect the portable apparatus 5000 with an external apparatus (not illustrated) or a power source (not illustrated). The portable apparatus 5000 may transmit data stored in the storage 5075 or receive data from an external apparatus (not illustrated) via a cable connected to the connector 5065 under the control of the controller. The portable apparatus 5000 may receive power from a power source (not illustrated) or recharge a battery (not illustrated) through a cable connected to the connector 5065.

The keypad 5066 may receive a key input from a user to control the portable apparatus 5000. The key pad 5066 may include a physical keypad (not illustrated) which may be formed on the front side 5000a of the portable apparatus 5000, a virtual keypad (not illustrated) displayed within the touch screen 5090, and a physical keypad (not illustrated) which is connectable with wire or wirelessly. Those skilled in the art may easily understand that the physical keypad (not illustrated) formed on the front side 5000a of the portable apparatus 5000 may be excluded depending on the performance or structure of the portable apparatus 5000.

The input pen 5067 may touch or select an object (for example, menu, text, image, video, figure, icon, and shortcut icon) displayed on (constituting) the home screen 5091 of the touch screen 5090 of the portable apparatus 5000 or a screen where a writing/drawing application is displayed (for example, memo screen, notepad screen, calendar screen, etc.). In addition, the input pen 5067 may perform handwriting, drawing, painting, or sketching on a screen of a handwriting application (for example, a memo screen, etc.) or a screen of drawing application which is displayed on the touch screen 5090 of the portable apparatus 5000.

The input pen 5067 may input a text, etc. by touching a touch screen according to a capacitive method, a resistive method, or electromagnetic resonance (EMR) method or by using a displayed virtual keypad. The input pen 5067 may include a stylus pen or a haptic pen (not illustrated) including a vibration element (for example, actuator or vibration motor).

The input pen 5067 may include or be a user's finger (for example, a thumb). For example, handwriting or drawing may be input by a user's finger in an application displayed on a capacitive-type touch screen or a resistive-type touch screen.

If handwriting or drawing is input by a user's finger in an application displayed on a capacitive-type touch screen or a resistive-type touch screen, the controller may detect a touch of fingers including a thumb using the touch screen 5090 and the touch screen controller 5095.

The sensor 5070 may include at least one sensor capable of detecting the state of the portable apparatus 5000. For example, the sensor 5070 may include an illumination sensor 5071 capable of detecting the amount of light around the portable apparatus 5000, a proximity sensor 5072 capable of detecting an approach to the portable apparatus 5000, and a gyro sensor 5073 capable of detecting a direction using rotary inertia of the portable apparatus 5000. In addition, the sensor 5070 may include an acceleration sensor (not illustrated) capable of detecting acceleration of three axes (for example, x axis, y axis, and z axis) applied to the portable apparatus 5000, a gravity sensor capable of detecting a direction of gravity, or an altimeter capable of measuring a pressure of the atmosphere and detecting altitude.

In addition, the sensor 5070 may further include a fingerprint sensor (not illustrated) capable of detecting a user's fingerprint or a heartbeat sensor (not illustrated) capable of detecting heartbeat of a user.

The at least one sensor included in the sensor 5070 may detect the state of the portable apparatus 5000, generate an electric signal corresponding to the detection, and transmit the signal to the controller. Those skilled in the art may easily understand that the sensor included in the sensor 5070 may be added or removed depending on the performance of the portable apparatus 5000.

The storage 5075 may store signals or data which are input/output corresponding to an operation of the second communication unit, the multimedia unit 5040, the camera 5050, the GPS 5055, the inputter/outputter 5060, the sensor 5070, and the touch screen 5090 under the control of the controller. The storage 5075 may store control programs to control the portable apparatus 5000 or the controller and applications which are provided by a manufacturer or downloaded from outside. In addition, the storage 5075 may store a GUI corresponding to control programs or applications, images for providing GUI, user information, documents, database, or related data.

The storage 5075 according to an exemplary embodiment may store portable apparatus information and touch pad application information.

The storage 5075 may store the $11^{th}$ touch information or the $11^{th}$ touch gesture information received through a touch pad application.

The storage 5075 may store the head mounted display apparatus information and content information received from the head mounted display apparatus.

The term "storage" may include the storage 5075, the ROM within the controller 5012, the RAM 5013 or a memory card (not shown) (for example, a micro SD card and a memory stick) which is mounted on the portable apparatus 5000. The storage may include non-volatile memory, volatile memory, HDD or SDD.

The power unit 5080 may provide power to the elements 5020 to 5075 which are located inside the portable apparatus 5000 under the control of the controller. The power unit 5080 may provide power input from an external power source (not illustrated) to the portable apparatus 5000 through a cable (not illustrated) connected to the connector 5065 under the control of the controller. In addition, the power unit 5080 may provide power and recharge one or more batteries (not illustrated) under the control of the controller. One or more batteries (not illustrated) may be located between the touch screen 5090 located at the front side 5000a and the rear side 5000c. The power unit 5080 may include a battery (not illustrated).

The power unit 5080 may recharge one or more batteries (not illustrated) wirelessly (for example, according to a magnetic resonance method, an electromagnetic wave method, or a magnetic induction method) under the control of the controller.

The touch screen 5090 may include a touch panel (not illustrated) for receiving a touch input and a display panel (not illustrated) for displaying a screen. The touch screen 5090 may provide a user with a GUI corresponding to various services (for example, voice call, video call, data transmission, reception of broadcasting, picture taking, video watching or execution of application). The touch screen 5090 may transmit an analog signal corresponding to a single touch or a multi touch which is input through the home screen 5091 or GUI to the touch screen controller 5095. The touch screen 5090 may receive a single touch or a multi touch through a user's body part (for example, fingers including a thumb) or an input pen 267.

The display panel (not illustrated) may include a plurality of pixels, and displays an image using the pixels. For example, the display panel (not illustrated) may include an LCD, an Organic LED, an LED, etc. The display panel (not illustrated) may display various operation states of the portable apparatus 5000, various images according to the execution of applications or services, and a plurality of objects.

A touch according to an exemplary embodiment is not limited to a contact input of a user's body part or the input pen 5067, and may include a non-contact input. For example, a non-contact input may include hovering where a distance between the touch screen 5090 and a user's body part or the input pen 5067 may be less than about 50 mm). Those skilled may easily understand that a non-contact distance detectable by the touch screen 5090 may vary depending on the performance or structure of the portable apparatus 5000.

The touch screen 5090 may be realized using, for example, a resistive method, a capacitive method, an infra-red method or an acoustic wave method.

The touch screen 5090 may include electromagnetic resonance (EMR) capability. The touch screen using an electromagnetic resonance method further may include a separate touch panel (not illustrated) using the electromagnetic resonance method to receive an input of an input pen (not illustrated) with a resonance circuit which resonates in a loop coil of the electromagnetic method.

The touch screen controller 5095 may convert an analog signal corresponding to a single touch or a multi touch received from the touch screen 5090 to a digital signal, and transmit the digital signal to the controller. The controller may calculate X and Y coordinates corresponding to the location of a touch on the touch screen 5090 using the digital signal received from the touch screen controller 5095.

The controller may control the touch screen 5090 using the digital signal received from the touch screen controller 5095. For example, the controller may display an application screen on the touch screen 5090 by displaying a shortcut icon (for example, 5093 of FIG. 49) displayed on the touch screen 5090 distinctively or differently from other shortcut icons or executing an application (for example, S note) corresponding to a selected shortcut icon (5093 of FIG. 49) in response to a touch input.

The touch screen controller 5095 may be realized as one or a plurality of touch screen controllers (not illustrated). Depending on the performance or structure of the portable apparatus 5000, the touch screen controller 5095 may be included in the controller.

The touch screen controller 5095 may convert an analog signal corresponding to a touch received from a touch screen of an electromagnetic resonance method to a digital signal, separately from an analog signal corresponding to a single touch or a multi touch received from the touch screen 5090, and transmit the digital signal to the controller. The controller may calculate X and Y coordinates corresponding to the location of a touch on the touch screen of the electromagnetic resonance method using the digital signal received from the touch screen controller 5095. In addition, in the case of a touch screen of an electromagnetic resonance method, a touch screen controller (not illustrated) of the electromagnetic resonance method may be used.

The portable apparatus 5000 in FIGS. 49 and 50 may include a single touch screen, but the portable apparatus 5000 may include a plurality of touch screens. Each of the touch screens may be located at or on a housing (not illustrated), respectively, and each housing (not illustrated) may be interconnected by a hinge (not illustrated) or a plurality of touch screens may be located at or on a single flexible housing. Each of the plurality of touch screens may include a plurality of display panels (not illustrated) and a plurality of touch panels (not illustrated).

Those skilled in the art may easily understand that at least one of the elements of the portable apparatus 5000 illustrated in FIG. 50 may be added or removed depending on the performance of the portable apparatus 5000.

Figure 51:
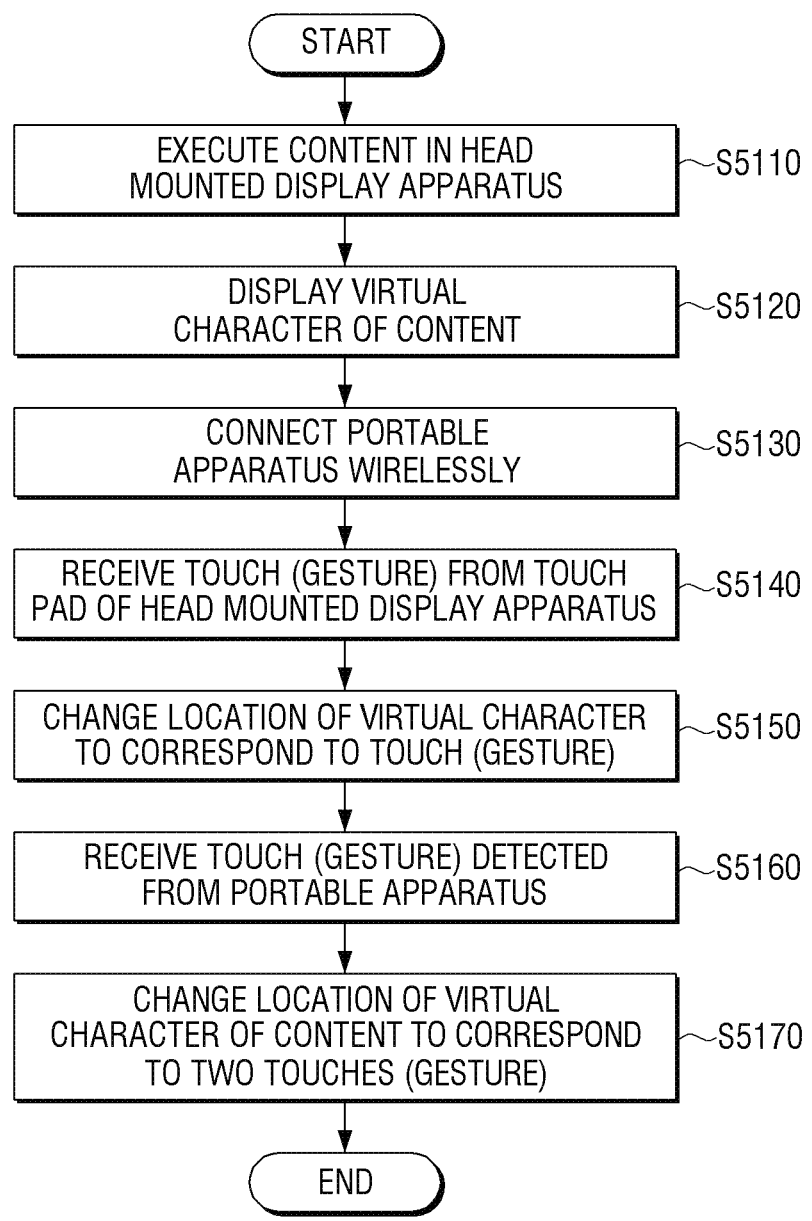
FIG. 51 is a sequence view illustrating a method of displaying a content of a head mounted display apparatus according to an exemplary embodiment.

FIG. 51 is a schematic sequence view illustrating a method of displaying a content of a head mounted display apparatus according to an exemplary embodiment.

FIGS. 52A to 52E are views illustrating examples of a screen of a head mounted display apparatus and a portable apparatus according to an exemplary embodiment.

In S5110 of FIG. 51, a content is executed or produced in a head mounted display apparatus.

Figure 52A:
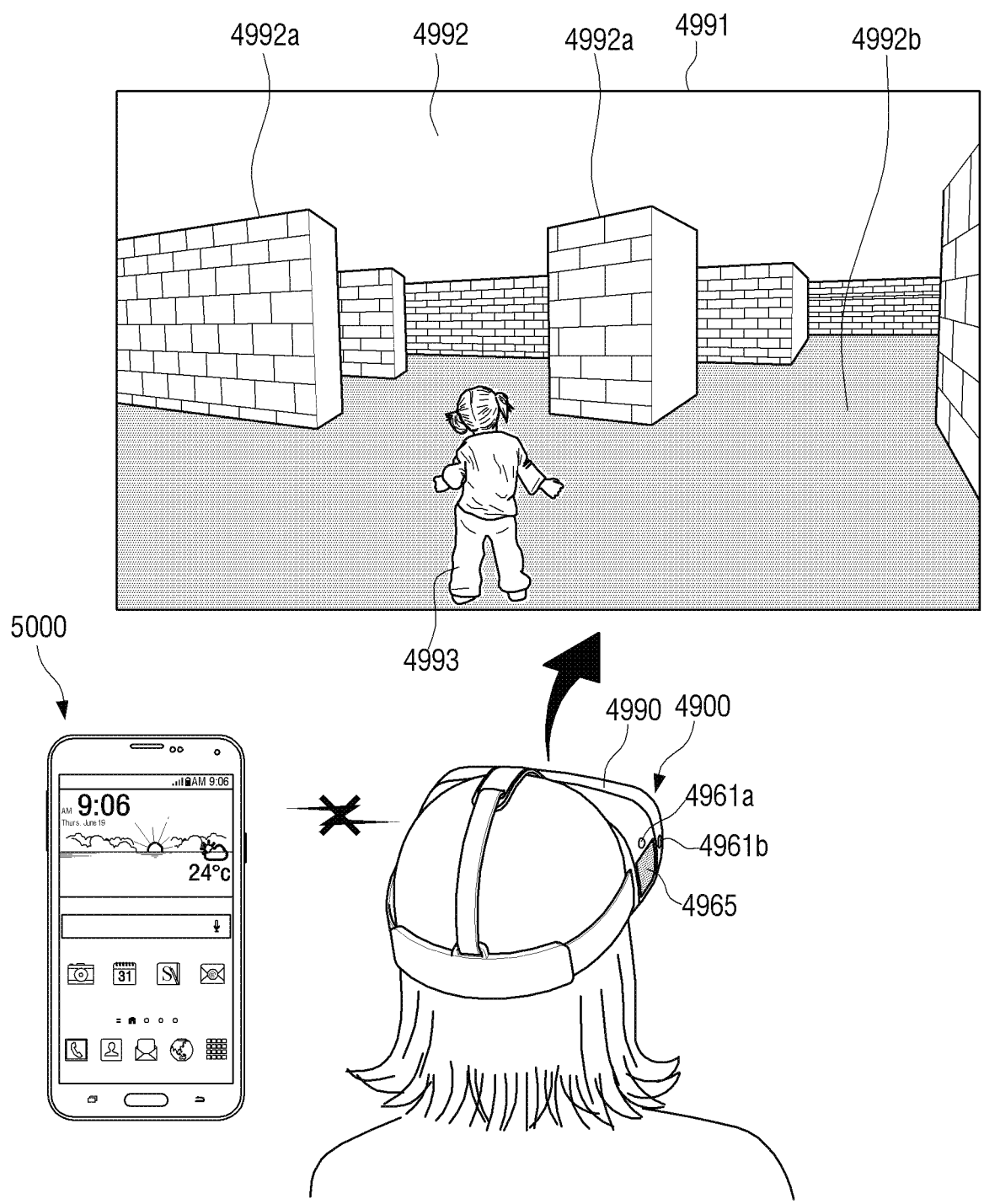
FIGS. 52A to 52E are views illustrating examples of a screen of a head mounted display apparatus and a portable apparatus according to an exemplary embodiment.

Referring to FIG. 52A, a content may be executed or produced in the head mounted display apparatus 4900. The controller may execute or produce a content (for example, producing a solving mazes game images) stored in the storage 4975 by a user input and display the content on the display 4990. The executed or produced content may be a content executable or producible on the head mounted display apparatus 4900, such as virtual reality computer game (for example, by the solving mazes game), virtual reality cinema or 360° virtual reality experience.

In addition, the controller may display a content (for example, solving mazes game images) received from outside through the connector 4964 by a user input on the display 4990. In addition, if a separate external apparatus with the display 4990 (for example, a portable apparatus) is mounted on the location of the display 4990, a content (for example, solving mazes) which is pre-stored or downloaded in the external apparatus may be selected and executed based on a user input.

The head mounted display apparatus 4900 may not be connected to the portable apparatus at this time.

In operation S5102 of FIG. 51, a virtual character of a content is displayed.

Referring to FIG. 52A, if a content (for example, solving mazes) is executed or produced, the controller may display the virtual character 4993 on a maze 4991b displayed on the display 4990. The maze 4992 may be a wall 4992a and a path 4992b which is distinguished by the wall 4992a. The controller may change the direction of the virtual character 4993 or move the virtual character 4993 in accordance with a detected movement of the head mounted display apparatus 4900. The controller may change the direction of the virtual character 4993 or move the virtual character 4993 rapidly or slowly in accordance with a detected movement of the head mounted display apparatus 4900. In addition, the controller may change the direction of the virtual character 4993 or move the virtual character 4993 in accordance with a user input detected from the touch pad 4965 at the side of the head mounted display apparatus 4900. The controller may change the direction of the virtual character 4993 or move the virtual character 4993 in accordance with a user input (for example, a speed of double tap or a speed of movement of a flick which is a touch gesture) detected from the touch pad 4965 at the side of the head mounted display apparatus 4900. The virtual character 4993 may move along the path 4992b between the wall 4992a and the wall 4992a in accordance with one of a movement of the head mounted display apparatus 4900 and a user input from the touch pad 4965.

The head mounted display apparatus 4900 may not be not connected to the portable apparatus 5000 at this time.

In operation S5130 of FIG. 51, a portable apparatus is connected wirelessly.

Figure 52B:
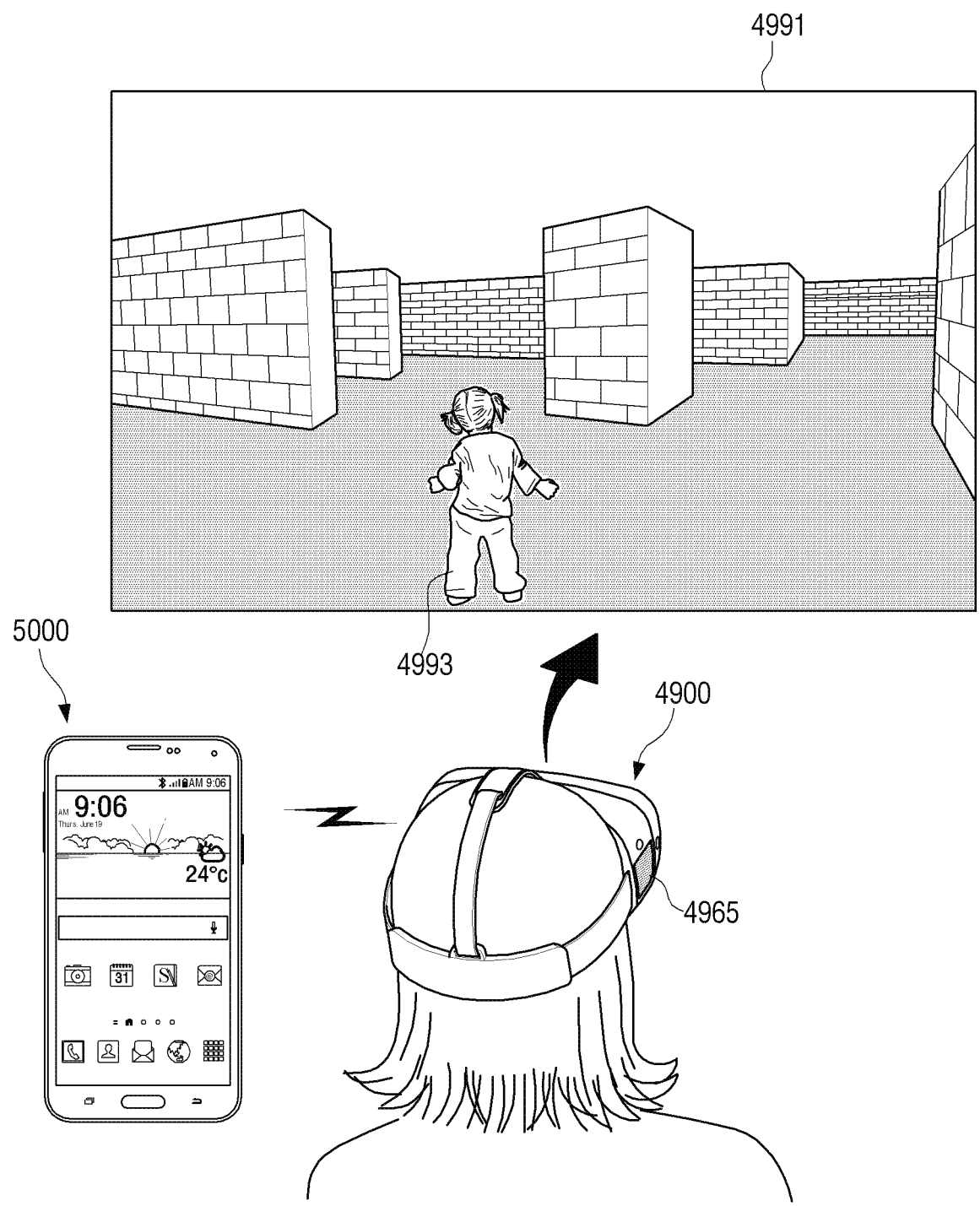

Referring to FIG. 52B, the head mounted display apparatus 4900 is connected to the portable apparatus 5000 wirelessly.

If a content is executed in the head mounted display apparatus 4900, the controller of the head mounted display apparatus 4900 may search for a peripheral portable apparatus using the first communication unit. The portable apparatus 5000 which may be connected may be selected by a user in a search list (not illustrated) corresponding to a search result displayed on a screen of the display 4990 of the head mounted display apparatus 4900. The controller of the head mounted display apparatus 4900 may be connected to the second communication unit of the portable apparatus 5000 wirelessly using the first communication unit in accordance with a user selection.

When the head mounted display apparatus 4900 is connected to the portable apparatus 5000, the controller may transmit apparatus information of the head mounted display apparatus 4900 and information regarding a content (for example, for the solving mazes game) executed or produced in the head mounted display apparatus 4900 to the portable apparatus 5000 through the first communication unit.

In response to the connection of the portable apparatus 5000, the controller of the head mounted display apparatus 4900 may store the received apparatus information of the portable apparatus 5000 in the storage 4980. The stored apparatus information of the portable apparatus may include wireless connection information (for example, an SSID, an IP address, a MAC address, a channel number or security key, etc.), a product name of the portable apparatus 5000, an identifier (ID) of the portable apparatus 5000, a MAC address of the portable apparatus 5000, a type of the portable apparatus 5000, a profile of the portable apparatus 5000 or communication method of the portable apparatus 5000, etc. The stored content information may include a content ID, a content name, a type of content (for example, computer game, etc.), a touch pad application execution command, etc.

Similarly, the controller 5010 of the portable apparatus 5000 may search for the peripheral head mounted display apparatus 4900 using the second communication unit. The head mounted display apparatus 4900 may be selected by a user in a search list (not illustrated) corresponding to a search result displayed on a screen of the touch screen 5090 of the portable apparatus 5000. The controller 5010 of the portable apparatus 5000 may be connected to the first communication unit of the head mounted display apparatus 4900 wirelessly using the second communication unit in accordance with a user selection.

When the head mounted display apparatus 4900 is connected to the portable apparatus 5000, the controller 5010 of the portable apparatus 5000 may store in the storage 5080 received apparatus information of the head mounted display apparatus 4900 and information regarding an executed content (for example, solving mazes). The stored apparatus information of the head mounted display apparatus 4900 may include wireless connection information (for example, an SSID, an IP address, a MAC address, a channel number or security key, etc.), a product name of the head mounted display apparatus 4900, an identifier (ID) of the head mounted display apparatus 4900, a MAC address of the head mounted display apparatus 4900, a type of the head mounted display apparatus 4900, a profile of the head mounted display apparatus 4900 or a communication method of the head mounted display apparatus 4900, etc.

When the head mounted display apparatus 4900 is connected to the portable apparatus 5000, the controller 5010 of the portable apparatus 5000 may transmit information regarding an application to be executed (for example, the touch pad application 5096) to the head mounted display apparatus 4900 using the second communication unit.

When the head mounted display apparatus 4900 is connected to the portable apparatus 5000, the controller 5010 of the portable apparatus 5000 may transmit application information corresponding to the touch pad application 5096 which is an application to be executed in the head mounted display apparatus 4900 using the second communication unit in accordance with a user selection (for example, a user selection to transmit information on the touch pad application to the head mounted display apparatus).

The transmitted application information may include, for example, identification information (for example, a name, an ID, a classification code, etc.) to distinguish applications (for example, the touch pad application 5096), information on the state of an application (for example, whether an application is being executed, in a standby or suspended) at a time when information on the corresponding application is transmitted, etc.

When the head mounted display apparatus 4900 is connected to the portable apparatus 5000, the controller 5010 of the portable apparatus 5000 may execute the touch pad application 5096 (see FIG. 52D) and display the application on the touch screen 5090. A user may touch the touch pad application 5096 or perform a touch gesture with respect to the touch pad application 5096. In addition, when the head mounted display apparatus 4900 is connected to the portable apparatus 5000, the controller 5010 of the portable apparatus 5000 may execute the touch pad application 5096 (see FIG. 52D) in accordance with a touch pad application execution command within the received content information and display the application on the touch screen 5090.

The controller 5010 of the portable apparatus 5000 may transmit touch information (or touch gesture information) corresponding to the detected touch (or touch gesture) to the head mounted display apparatus 4900 through the second communication unit. In addition, the controller 5010 of the portable apparatus 5000 may store touch information (or touch gesture information) corresponding to the detected touch (or touch gesture) in the storage 5075.

The head mounted display apparatus 4900 is connected to the portable apparatus 5000 at this time.

In S5140 of FIG. 51, a touch pad of a head mounted display apparatus receives a touch gesture.

Figure 52C:
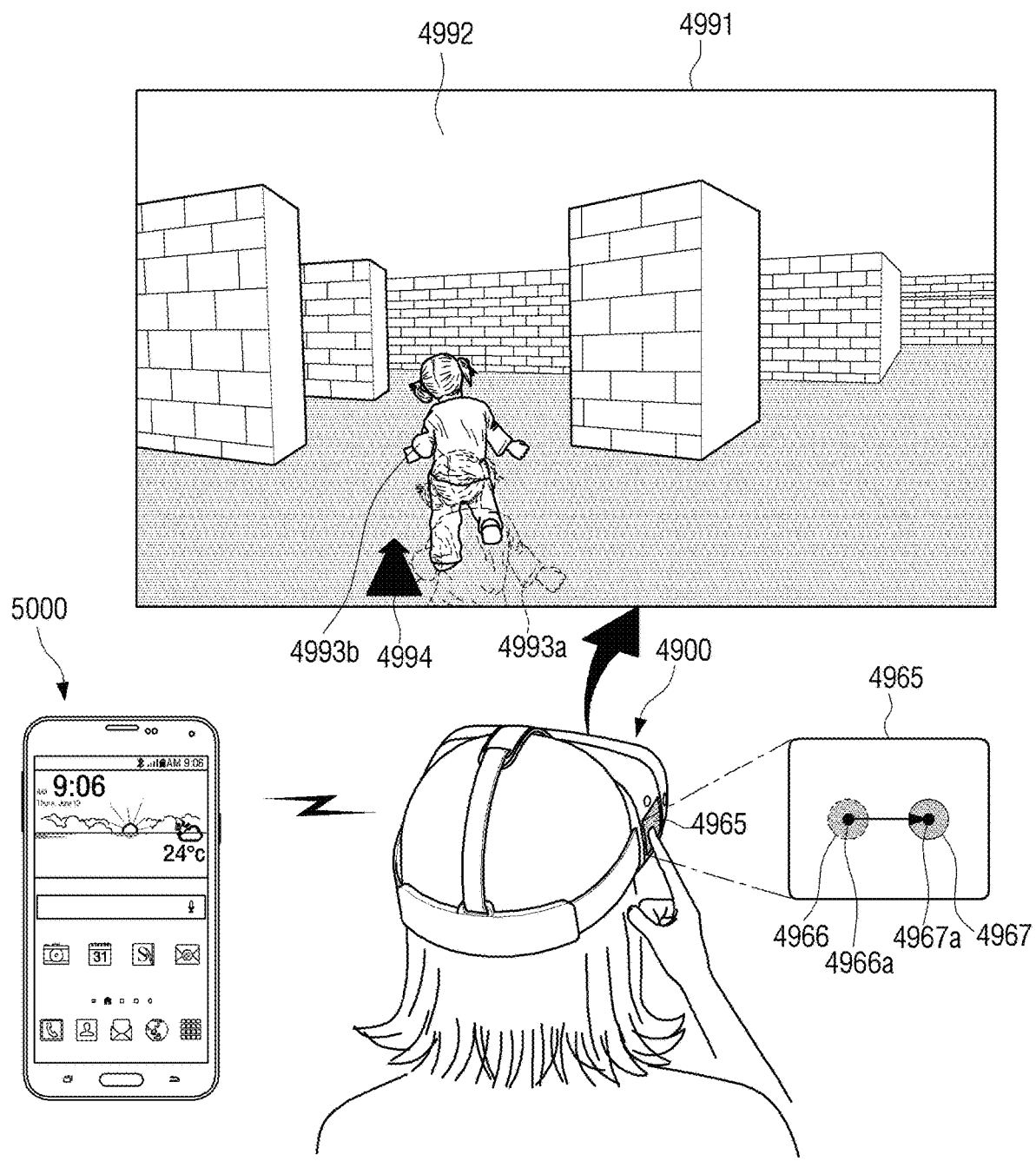

Referring to FIG. 52C, the touch pad 4965 of the head mounted display apparatus 4900 may receive a touch or a touch gesture. A user may perform a first touch 4966 with respect to the touch pad 4965 of the head mounted display apparatus 4900. The controller may detect the first touch 4966 using the touch pad 4965. The controller may calculate the location 4966*a* (for example, coordinates of X1 and Y1) of the first touch corresponding to the first touch 4966 using an electric signal received from the touch pad 4965.

The controller may store the first touch information corresponding to the first touch location 4966*a* in the storage 4975. The stored first touch information may include a touch ID for history management, a touch location, a touch detection time or touch information (for example, a touch pressure, a touch direction, a touch duration time, etc.). The first touch 4966 may be performed by one of the fingers including a thumb or an input pen (for example, a stylus pen) which may touch the touch pad 4965.

In an exemplary embodiment, a touch means that one of a finger and an input pen contacts the touch pad 4965 first and maintains the contact at a touch point, and releases the contact with the touch pad 4965 at the touch point. A touch gesture means that one of a finger and an input pen contacts the touch pad 4965 first, and moves to another location of the touch pad 4965 while maintaining the contact or releases the contact with the touch pad 4965 while moving from the first touch point to another location. Those skilled in the art may easily understand that the touch gesture may include not only dragging, swiping, flicking, pinching, spreading, rotating, pressing, pressing and tapping, and pressing and dragging but also other various touch gestures. In an exemplary embodiment, the term "touch" may include a touch gesture.

A user performs a first touch gesture (for example, a consecutive or continuous movement of the first touch 4966) by maintaining a contact between the first touch 4966 and the touch pad 4965. The controller may detect a consecutive or continuous movement of the first touch 4966 (for example, a plurality of X and Y coordinates corresponding to a consecutive movement positions of a touch) using the touch pad 4965. The controller may store in the storage 4975 location information on a plurality of touches corresponding to the locations of a plurality of touches corresponding to a consecutive movement of the first touch. The consecutive movement of the first touch 4966 means that the contact between the first touch 4966 and the touch pad 4965 is maintained consecutively or continuously.

The consecutive or continuous movement of the first touch 4966 refers to a consecutive touch gesture of one touch (for example, dragging or flicking moving from 4966*a* to 4967*a*) from the initial first touch 4966 to the final first touch 4967.

If the contact between the first touch 4966 and the touch pad 4965 is maintained (touch-on), the controller may move the virtual character 4993 in a direction corresponding to the detected location of the first touch 4966. For example, if the first touch 4966 is located at upper, lower, left, or right side with reference to the center of the touch pad 4965, the controller may move the virtual character 4993 in a direction (for example, upper, lower, left, or right side) corresponding to the detected location of the first touch 4966.

If the contact between the first touch 4966 and the touch pad 4965 is released (touch-release), the controller may stop the movement of the virtual character 4993 In accordance with the detected touch release location. If the contact between the first touch 4966 and the touch pad 4965 is released, it may mean that the movement of the virtual character 4993 is completed.

The head mounted display apparatus 4900 is connected to the portable apparatus 5000 at this time.

In S5150 of FIG. 51, the location of a virtual character changes in accordance with a touch gesture.

Referring to FIG. 52C, the location of the virtual character 4993 changes in accordance with a touch gesture (a consecutive or continuous movement of the first touch 4966). The controller may calculate a distance of movement of a detected touch gesture on the touch pad 4965 (for example, a distance from 4966*a* to 4967*a*). The controller may calculate a distance of movement of the virtual character 4993 corresponding to the calculated distance of movement of the touch gesture. The controller may move the location of the virtual character 4993 consecutively or continuously on the maze image 4992 in accordance with the calculated distance of movement of the virtual character 4993. For example, if the distance of movement of a touch gesture on the touch pad 4965 is 14 mm, the controller may move the virtual character 4993 (for example, as far as 1, 400 mm in the virtual display space) in accordance with the calculated distance of movement of the touch gesture. The distance of movement of the virtual character 4993 may refer to the change of location of the virtual character 4993 (from 4993*a* to 4993*b*).

The controller may calculate the speed of movement (for example, the speed of movement from 4966*a* to 4967*a*) of a detected touch gesture on the touch pad 4965. The controller may calculate the speed of movement of the virtual character 4993 in accordance with the calculated speed of movement of the touch gesture. The controller may move the virtual character 4993 on the solving mazes image 4992 in accordance with the calculated speed of movement of the virtual character. For example, if the speed of movement of a touch gesture on the touch pad 4965 is 14 mm/s, the controller may move the virtual character 4993 (for example, as fast as 14 m/s in the virtual display space) in accordance with the calculated speed of movement of the touch gesture. The speed of the movement of the virtual character 4993 may refer to the time which is required to change the location of the virtual character 4993 (from 4993*a* to 4993*b*).

The controller may move the virtual character 4993 on the solving mazes image 4992 in accordance with the calculated distance and speed of a touch. The controller may display a separate image 4994 (for example, an arrow the size of which changes according to the speed of movement) corresponding to the direction and speed of movement of the virtual character 4993.

FIGS. 53A and 53B are views illustrating examples of a touch gesture of a head mounted display apparatus and a touch gesture of a portable apparatus according to an exemplary embodiment.

FIG. 53A illustrates an example of various touch gestures (5301 to 5305) on a table 5300. A user may input various touch gestures to the touch pad 4965. For example, if a drag 5301 in a rightward direction is received from the touch pad 4965, the controller may move the virtual character 4965 in a rightward direction. If a touch gesture received from the touch pad 4965 moves in an eye-sight direction, the controller may move the virtual character 4965 forward. If a drag 5302 in a leftward direction is received from the touch pad 4965, the controller may move the virtual character 4965 in a leftward direction. In addition, if a touch gesture received from the touch pad 4965 moves in a direction opposite to the eye-sight direction, the controller may move the virtual character 4965 backward.

If a multi tap 5303 (a tap using two fingers) is received from the touch pad 4965, the controller may jump the virtual character 4965 (or move the virtual character up and down in the virtual display space). If a "finger" spread 5304 is received from the touch pad 4965, the controller may leave the virtual character 4965 as it is, and enlarge (or zoom-in) the screen 4991 gradually. If a "finger" pinch 5305 is received from the touch pad 4965, the controller may leave the virtual character 4965 as it is, and reduce (or zoom-out) the screen 4991 gradually. Those skilled in the art may easily understand that there are other various touch gestures which are not illustrated on the table 5300.

The head mounted display apparatus 4900 is connected to the portable apparatus 5000 at this time.

In S5160 of FIG. 51, a detected touch gesture is received from a portable apparatus.

Figure 52D:
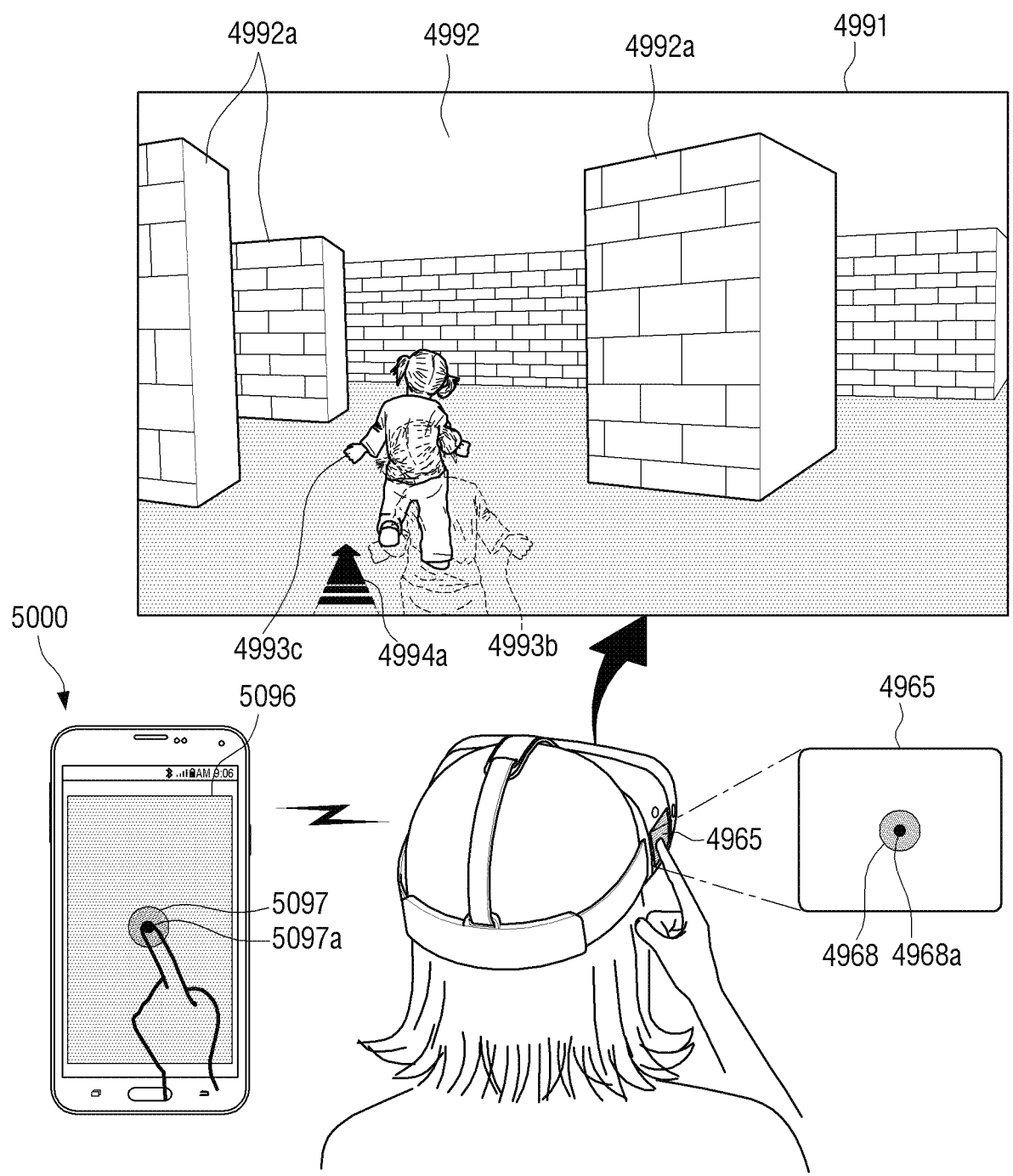

Referring to FIG. 52D, a user may perform a second touch on the touch pad 4965 of the head mounted display apparatus 4900. In addition, the user or another user may perform a $11^{th}$ touch on the touch pad application 5096 which is executed on the touch screen 5090 of the portable apparatus 5000 which is connected to the head mounted display apparatus 4900 wirelessly. The controller 5010 of the portable apparatus 5000 may detect the $11^{th}$ touch 5097 using the touch screen 5090 and the touch screen controller 5095. The controller 5010 of the portable apparatus 5000 may calculate the location of the $11^{th}$ touch 5097*a* (for example, coordinates of X11 and Y11) corresponding to the $11^{th}$ touch 5097 using an electric signal received from the touch screen 5090 and the touch screen controller 5095.

The controller 5010 of the portable 5000 may store the $11^{th}$ touch information corresponding to the location of the $11^{th}$ touch 5097*a* in the storage 5075. The stored information regarding the $11^{th}$ touch may include a touch ID for history management, a touch location on the portable apparatus 5000, a touch detection time on the portable apparatus 5000 or touch information of the portable apparatus 5000 (for example, a touch pressure, a touch direction, a touch duration time, etc.). The $11^{th}$ touch 5097*a* may be performed by one of the fingers including a thumb or an input pen (for example, a stylus pen) which may touch the touch screen 5090.

The controller 5010 of the portable apparatus 5000 may transmit the stored $11^{th}$ touch information to the head mounted display apparatus 4900. The controller 5010 of the portable apparatus 5000 may transmit the stored $11^{th}$ touch information in the form of a control packet to the head mounted display apparatus 4900. In addition, the controller 5010 of the portable apparatus may transmit a control packet corresponding to the detected $11^{th}$ touch to the head mounted display apparatus 4900.

In addition, a user may perform the $11^{th}$ touch gesture (for example, a consecutive or continuous movement of the $11^{th}$ touch 5097) by maintaining a contact between the $11^{th}$ touch 5097 and the touch pad application 5096. The controller 5010 may detect a consecutive movement of the $11^{th}$ touch 5097 (for example, a plurality of X and Y coordinates corresponding to a consecutive movement of a touch) using the touch screen 5090 and the touch screen controller 5095. The controller 5010 may store in the storage information of a plurality of touches corresponding to the location of a plurality of touches corresponding to a consecutive movement of the 11th touch. The consecutive movement of the $11^{th}$ touch 5097 means that the contact between the $11^{th}$ touch 5097 and the touch pad 5065 is maintained consecutively or continuously.

FIGS. 53A and 53B are views illustrating examples of a touch gesture of a head mounted display apparatus and a touch gesture of a portable apparatus according to an exemplary embodiment.

FIG. 53B illustrates an example of various touches or touch gestures (5311 to 5316) in a table 5310. A user may input various touch gestures to the touch pad 5096. For example, if a press 5311, which is a touch gesture to strengthen an operation of the virtual character 4993, is received from the touch pad application 5096, the controller may store in the storage 5075 the $11^{th}$ touch gesture information (for example, press information) corresponding to the received press 5311. The controller 5010 may transmit the stored $11^{th}$ touch gesture information to the head mounted display apparatus 4900 and herein, the $11^{th}$ touch gesture information may be provided in the form of a control packet. If a drag 5312 in a right to upper left direction, a double tap 5313, a clockwise rotation 5314, a drag 5315 in a right to a lower left direction, a counter-clockwise rotation 5316 are received, the controller 5010 may store in the storage 5075 $12^{th}$ to $16^{th}$ touch gesture information corresponding to the received touch gestures 5312 to 5316. The controller 5010 may transmit stored touch gesture information regarding one of the $12^{th}$ to $16^{th}$ tough gestures to the head mounted display apparatus 4900 and herein, the touch gesture information may be provided in the form of a control packet.

A touch (or a touch gesture) received from the touch pad application 5096 of the portable apparatus 5000 may change an operation of the virtual character 4993 of the head mounted display apparatus 4900. For example, if the head mounted display apparatus 4900 receives a control packet corresponding to a touch (or a touch gesture) from the portable apparatus 5000 while the virtual character 4993 moves forward, the controller may strengthen (for example, increase the forward speed by 20%) or weaken (for example, reduce the forward speed by 20%) an operation of the virtual character 4993. The intensification or weakening of an operation of the virtual character 4993 in accordance with a touch (or a touch gesture) received from the touch pad application 5096 of the portable apparatus 5000 is only an example, and the change in the operation of the virtual character 4993 is not limited thereto.

Those skilled in the art may easily understand that an operation of the virtual character 4993 or an operation of objects 4992a and 4992b of the solving mazes game 4992 which is a content may be changed in various ways in accordance with combination of a touch (or a touch gesture) received from the touch pad application 5096 of the portable apparatus 5000 and a touch (or a touch gesture) received from the touch pad 4965 of the head mounted display apparatus 4900.

The controller may display a separate image (for example, an arrow 4994a a size of which changes according to the speed of movement) corresponding to the direction and speed of movement of the virtual character 4993.

Those skilled in the art may easily understand that an operation of a virtual character (not illustrated) of a computer game (not illustrated) which is another content may be changed in various ways in accordance with combination of a touch (or a touch gesture) received from the touch pad application 5096 of the portable apparatus 5000 and a touch (or a touch gesture) received from the touch pad 4965 of the head mounted display apparatus 4900.

In S5170 of FIG. 51, the location of a virtual character of a content is changed in accordance with two touch gestures.

Figure 52E:
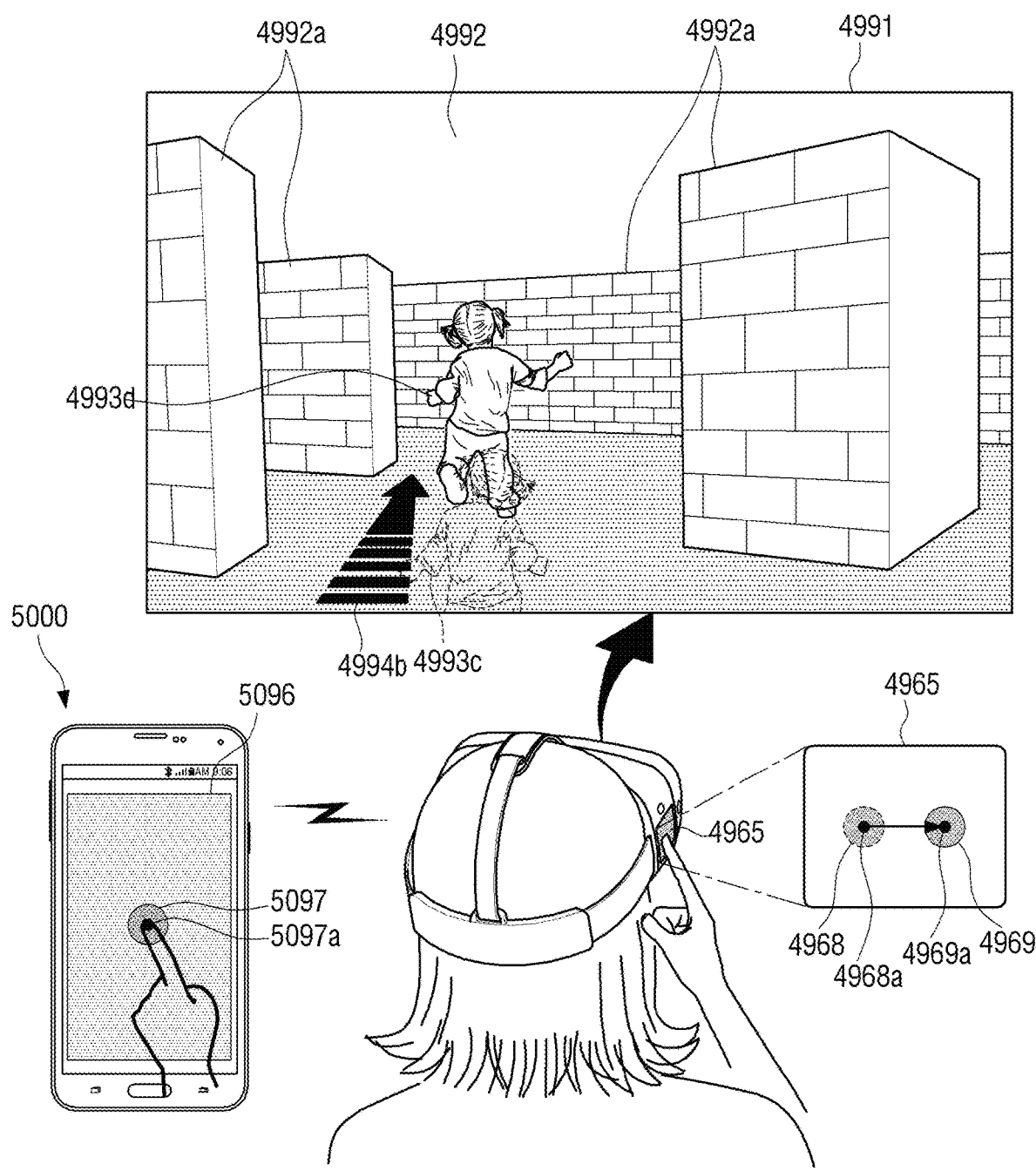

Referring to FIG. 52E, the controller may move the virtual character 4993 fast in accordance with two touches (or touch gestures). For example, the controller may move the virtual character 4993 20% faster when a touch (or a touch gesture) is received from the touch pad 4965 of the head mounted display apparatus 4900. The wall 4992a and the path 4992b, which are peripheral objects of the virtual character 4993, may move fast in accordance with the fast movement of the virtual character 4993.

An operation (or a location) of the virtual character 4993 of the head mounted display apparatus 4900 may be changed in accordance with a touch (or a touch gesture) which is the second touch (or touch gesture) received from the touch pad application 5096 of the portable apparatus 5000.

The controller may move the virtual character 4993 on the solving mazes image 4992 by changing the distance (4993c to 4993d) and speed of movement of the virtual character 4993 in accordance with the two touch gestures. The controller may display a separate image (for example, an arrow 4994b of which the size changes according to the speed of movement) corresponding to the direction and speed of movement of the virtual character 4993.

If two touches (or touch gestures) are received, regardless of their order, an operation (or location) of the virtual character 4993 may be changed. If two touches (or touch gestures) are received, regardless of their order, the operation of the virtual character 4993 may be strengthened or weakened.

Those skilled in the art may easily understand that a 20% difference in the speed of movement between one touch gesture (for example, a touch (or touch gesture) of the head mounted display apparatus 4900) and two touch gestures (for example, a touch (or touch gesture) of the head mounted display apparatus 4900 and a touch (or touch gesture) of the portable apparatus 5000) is just an example, and that the change of operations may vary depending on the performance and setting of the head mounted display apparatus 4900.

The controller may provide a user with feedback corresponding to the intensification of the operation of the virtual character 4993. The feedback may be one of a visual feedback, an audio feedback, and a tactile feedback. The controller may provide a user with one of a visual feedback, an audio feedback, and a tactile feedback or combination of a visual feedback, an audio feedback, and a tactile feedback.

The visual feedback may be provided by displaying a visual effect (for example, a separate image or an animation effect, such as fading, which is applied to a separate image) corresponding to change in an operation (or change in a location) of the virtual character 4993 distinctively or differently from the screen of the solving mazes 4992. The audio feedback may be output from the speaker 4963 in the form of sound corresponding to the change in an operation (or change in a location) of the virtual character 4993.

If the head mounted display apparatus 4900 includes a vibration motor (not illustrated), a tactile feedback may be output from the vibration motor (not illustrated) in accordance with change in an operation (or change in a location) of the virtual character 4993.

The visual feedback may be provided by displaying a visual effect (for example, a separate image or an animation effect, such as fading, which is applied to a separate image) corresponding to the intensification of an operation of the virtual character 4993 distinctively or differently from the screen of the solving mazes 4992. The auditory feedback may be output from the speaker 4963 in the form of sound corresponding to the intensification of an operation of the virtual character 4993.

If the head mounted display apparatus 4900 includes a vibration motor (not illustrated), a tactile feedback may be output from the vibration motor (not illustrated) in accordance with the intensification of an operation of the virtual character 4993.

A feedback (for example, at least one of a visual feedback, an audio feedback, and a tactile feedback) corresponding to the intensification of an operation of the virtual character 4993 may be selected and/or changed in an environment setting (not illustrated) of the head mounted display apparatus 4900.

The time for providing the at least one feedback to a user (for example, 500 msec) may be input and/or changed by a user.

In S5150 of FIG. 51, if a location of a virtual character of a content is changed in accordance with two touch gestures, the method of displaying a content in a head mounted display apparatus is terminated.

The methods according to an exemplary embodiment may be realized as a program which is executable through various computer means and stored in a computer readable recording medium. The computer readable recording medium may include a program command, a data file, a data structure, etc. alone or in combination. For example, the computer readable recording medium may be stored in a storage medium which may record information regardless of removal or re-recording of data such as a volatile or non-volatile storage device including ROM, a memory such as RAM, memory chip, apparatus, and integrated circuit, or a storage medium which may store data optically or magnetically and read the data mechanically (for example, a computer) simultaneously such as CD, DVD, magnetic disk and magnetic tape. A memory which may be included in a mobile terminal is an example of a storage medium which is readable by programs or machine appropriate for storing the programs which include commands to realize an exemplary embodiment. The program commands stored in the medium are designed specifically for an exemplary embodiment or may be known to and thus usable by those skilled in the field of software.

Although a few embodiments of the present general concept have been shown and described, it will be appreciated by those skilled in the art that changes may be made in these exemplary embodiments without departing from the principles and spirit of the invention, the scope of which is defined in the appended claims and their equivalents.

The invention claimed is:

1. A method of displaying a virtual character at a head mounted display apparatus wearable on a head of a user, comprising:
   connecting, through a wireless communication unit of the head mounted display apparatus, with another apparatus;
   obtaining, through a user interface of the head mounted display apparatus that is on a lateral side of the head mounted display apparatus, a first input by the user at a nondecisive location on the user interface;
   displaying, based on the obtained first input, a first action of the virtual character being performed on a display of the head mounted display apparatus that is on a front side of the head mounted display apparatus;
   receiving, through the wireless communication unit from the another apparatus, a signal corresponding to a second input by the user to the another apparatus at a nondecisive location on the another apparatus while the first input is performed; and
   displaying a second action of the virtual character being performed on the display based on a combination of the obtained first input and the second input to which the received signal corresponds,
   wherein the second action is displayed by changing the first action based on the combination of the obtained first input and the second input to which the received signal corresponds,
   wherein the first action is moving the virtual character forward at a first speed,
   wherein the second action is moving the virtual character forward at a second speed different than the first speed, wherein the method further comprising:
      displaying an arrow image, on the display of the head mounted display apparatus, of which a size changes according to speed of movement of the virtual character.

2. The method as claimed in claim 1, wherein
   the received signal includes a control packet corresponding to the second input, and
   the displaying displays the virtual character based on the control packet included in the received signal.

3. The method as claimed in claim 1, wherein the first input includes a touch gesture and the second input includes a touch gesture.

4. The method as claimed in claim 1,
   wherein the displaying the second action of the virtual character being performed comprises displaying the virtual character as changing an action of the virtual character based on the combination of the obtained first input and the second input to which the received signal corresponds,
   wherein a peripheral virtual character to the virtual character is changed based on the action of the virtual character being changed.

5. The method as claimed in claim 1, wherein
   the displaying the second action of the virtual character being perform comprises displaying the virtual character as changing an action of the virtual character based on the combination of the obtained first input and the second input to which the received signal corresponds, and
   wherein the changing the action includes at least one of intensification of the action of the virtual character and weakening of the action of the virtual character.

6. The method as claimed in claim 1,
   wherein the displaying the second action of the virtual character being performed comprises displaying the virtual character as changing an action of the virtual character based on the combination of the obtained first input and the second input to which the received signal corresponds, and
   wherein the action of the virtual character that is changed based on the combination of the obtained first input and the second input to which the received signal corresponds is distinguished from the first action.

7. The method as claimed in claim 1, wherein the displaying the second action of the virtual character being performed comprises displaying the virtual character as moving in correspondence to a distance of a continuous movement of the first input.

8. The method as claimed in claim 1,
   wherein the displaying the second action of the virtual character being performed comprises displaying the virtual character as changing an action of the virtual character based on the combination of the obtained first input and the second input to which the received signal corresponds, and
   wherein the changing the action of the virtual character based on the combination of the obtained first input and the second input to which the received signal corresponds includes providing at least one of a visual feedback, an auditory feedback, and a tactile feedback.

9. A head mounted display apparatus wearable on a head of a user, comprising:
   a display on a front side of the head mounted display apparatus;
   a touch pad on a lateral side of the head mounted display apparatus;
   a wireless communication unit to wirelessly connect with another apparatus; and
   at least one processor configured to:
      obtain, through the touch pad, a first input by the user at a nondecisive location on the touch pad,
      control the display to display a first action of a virtual character being performed based on the obtained first input,
      receive, from the another apparatus through the wireless communication unit, a signal corresponding to a second input by the user at a nondecisive location on a user interface of the another apparatus while the first input is performed, and
      control the display to display a second action of the virtual character being performed based on a combination of the obtained first input and the second input to which the received signal corresponds,
   wherein the second action is displayed by changing the first action based on the combination of the obtained first input and the second input to which the received signal corresponds,
   wherein the first action is moving the virtual character forward at a first speed,
   wherein the second action is moving the virtual character forward at a second speed different than the first speed, and wherein the at least one processor further configured to:
control the display to display an arrow image of which a size changes according to speed of movement of the virtual character.

10. The apparatus as claimed in claim 9, wherein
the received signal includes a control packet corresponding to the second input, and
the at least one processor is further configured to control the display to display the virtual character corresponding to the control packet included in the received signal.

11. The apparatus as claimed in claim 9, wherein the at least one processor is further configured to calculate at least one of a direction of continuous movement, a distance of continuous movement, and a speed of continuous movement of the first input on the touch pad.

12. The apparatus as claimed in claim 11, wherein the at least one processor further configured to:
control the display to display the virtual character as changing an action of the virtual character based on the combination of the obtained first input and the second input to which the received signal corresponds, and
change the action of the virtual character corresponding to the calculated at least one of the direction of continuous movement, the distance of continuous movement, and the speed of continuous movement.

13. The apparatus as claimed in claim 9, wherein the at least one processor is further configured to control the display to display the virtual character as moving in one of upper, lower, left, and right directions corresponding to a location of the first input on the touch pad.

14. The apparatus as claimed in claim 9, wherein the display is provided in one of an integrated form and a detachable form.

15. A method of displaying a virtual character at a head mounted display apparatus wearable on a head of a user, comprising:
connecting, through a wireless communication unit of the head mounted display apparatus, with a handheld device;
obtaining a first input signal from a head mounted touch interface on a lateral side of the head mounted display apparatus, wherein the first input signal corresponds to a first input by the user at a nondecisive location on the head mounted touch interface;
displaying, based on the obtained first input signal, a first action of the virtual character being performed on a display of the head mounted display apparatus and that is on a front side of the head mounted display apparatus;
receiving, through the wireless communication unit, a second input signal from a handheld interface of the handheld device via a wireless signal, wherein the second input signal corresponds to a second input by the user at a nondecisive location on the handheld interface while the first input is performed;
combining the first input signal obtained from the head mounted touch interface and the second input signal received from the handheld device as a combination; and
displaying a second action of the virtual character being performed on the display of the head mounted display apparatus based on a result of the combination,
wherein the second action is displayed by changing the first action based on the result of the combination,
wherein the first action is moving the virtual character forward at a first speed,
wherein the second action is moving the virtual character forward at a second speed different than the first speed, and
wherein the method further comprising:
displaying an arrow image, on the display of the head mounted display apparatus, of which a size changes according to speed of movement of the virtual character.

16. The method as claimed in claim 15, wherein the first input signal selects an action of the virtual character, and the second input signal controls the action of the virtual character.

17. The method as claimed in claim 15, wherein the first input signal selects a control command of the head mounted display apparatus, and the second input signal selects an image command of the head mounted display apparatus.

18. The method as claimed in claim 15, wherein the method further comprises:
displaying a search list including at least one handheld device, and
based on a handheld device of the at least one handheld device being selected in the search list by a user selection through a selection interface, connecting the head mounted display apparatus and the selected handheld device.

19. A method of displaying a virtual character at a head mounted display apparatus wearable on a head of a user, comprising:
connecting, through a wireless communication unit of the head mounted display apparatus, with a handheld device;
sensing a first input by the user at a nondecisive location on a head mounted display interface that is on a lateral side of the head mounted display apparatus, and producing a first input signal;
receiving, through the wireless communication unit, a second input signal from the handheld device via wireless signal, wherein the second input signal corresponds to a second input by the user at a nondecisive location on a user interface of the handheld device while the first input is performed;
displaying, based on the produced first input signal, a first action of the virtual character being performed on a display of the head mounted display apparatus that is on a front side of the head mounted display apparatus;
combining the produced first input signal and the received second input signal as a combination; and
displaying a second action of the virtual character being performed on the display of the head mounted display apparatus based on a result of the combination,
wherein the second action is displayed by changing the first action based on the result of the combination,
wherein the first action is moving the virtual character forward at a first speed,
wherein the second action is moving the virtual character forward at a second speed different than the first speed, and
wherein the method further comprising:
displaying an arrow image, on the display of the head mounted display apparatus, of which a size changes according to speed of movement of the virtual character.

20. A system comprising:
a head mounted display apparatus wearable on a head of a user, comprising:
a display on a front side of the head mounted display apparatus;

a touch pad on a lateral side of the head mounted display apparatus;

a first wireless communication unit to wirelessly connect with a portable apparatus; and at least one processor configured to:

obtain, through the touch pad, a first input by the user at a nondecisive location on the touch pad, control the display to display a first action of a virtual character being performed based on the obtained first input, receive, from the portable apparatus through the first communication unit, a second signal corresponding to a second input by the user at a nondecisive location on a touch screen of the portable apparatus while the first input is performed, and control the display to display a second action of the virtual character being performed based on a combination of the obtained first input and the second input to which the received second signal corresponds, wherein the second action is displayed by changing the first action based on the combination of the obtained first input and the second input to which the received second signal corresponds; and the portable apparatus, comprising:

the touch screen, a second wireless communication unit to wirelessly connect with the head mounted display apparatus, and at least one processor configured to:

receive the second input from the touch screen, and transmit the second input received from the touch screen to the head mounted display apparatus through the second wireless communication unit of the portable apparatus, wherein the first action is moving the virtual character forward at a first speed, wherein the second action is moving the virtual character forward at a second speed different than the first speed, and wherein the at least one processor of the head mounted display apparatus further configured to:

control the display of the head mounted display apparatus to display an arrow image of which a size changes according to speed of movement of the virtual character.

\* \* \* \* \*